United States Patent
Wang et al.

(10) Patent No.: US 11,635,775 B2
(45) Date of Patent: Apr. 25, 2023

(54) SYSTEMS AND METHODS FOR UAV INTERACTIVE INSTRUCTIONS AND CONTROL

(71) Applicant: SZ DJI TECHNOLOGY CO., LTD., Shenzhen (CN)

(72) Inventors: Mingyu Wang, Shenzhen (CN); Tao Zhao, Shenzhen (CN); Yun Yu, Shenzhen (CN); Guyue Zhou, Shenzhen (CN); Ketan Tang, Shenzhen (CN); Cong Zhao, Shenzhen (CN); Ang Liu, Shenzhen (CN); You Zhou, Shenzhen (CN); Minjian Pang, Shenzhen (CN); Xiao Hu, Shenzhen (CN); Litian Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 2 days.

(21) Appl. No.: 16/991,739

(22) Filed: Aug. 12, 2020

(65) Prior Publication Data

US 2021/0116943 A1    Apr. 22, 2021

Related U.S. Application Data

(63) Continuation of application No. 16/067,577, filed as application No. PCT/CN2015/093459 on Oct. 30, 2015, now abandoned.

(30) Foreign Application Priority Data

Sep. 15, 2015    (WO) ................ PCT/CN2015/089594

(51) Int. Cl.
    G05D 1/00    (2006.01)
    B64C 39/00   (2006.01)
    (Continued)

(52) U.S. Cl.
    CPC .......... *G05D 1/106* (2019.05); *B64C 39/024* (2013.01); *G01S 3/7864* (2013.01);
    (Continued)

(58) Field of Classification Search
    None
    See application file for complete search history.

(56) References Cited

U.S. PATENT DOCUMENTS

| 5,155,683 A | 10/1992 | Rahim |
| 6,510,388 B1 | 1/2003 | Sporrong et al. |

(Continued)

FOREIGN PATENT DOCUMENTS

| CN | 1617170 A | 5/2005 |
| CN | 101252687 A | 8/2008 |

(Continued)

OTHER PUBLICATIONS

Tingzhi Shen, et al., Digital Image Processing and Pattern Recognition, Second Edition, Jul. 2007, p. 255, Beijing Institute of Technology Press, China.
(Continued)

*Primary Examiner* — Adam D Tissot
(74) *Attorney, Agent, or Firm* — Anova Law Group, PLLC

(57) ABSTRACT

A method for controlling an unmanned aerial vehicle (UAV) includes receiving, by a processor of the UAV, a plurality of images captured by an imaging device coupled to the UAV, identifying, by the processor, a target in at least one image of the plurality of images, determining, by the processor, whether the target is a stationary target or a moving target based on analyzing the plurality of images, and automatically effecting, by the processor, movement of the UAV based on determining the target is the stationary target or the moving target.

20 Claims, 32 Drawing Sheets

(51) Int. Cl.

| | | |
|---|---|---|
| *G06F 3/01* | (2006.01) | |
| *G05D 1/10* | (2006.01) | |
| *G01S 3/786* | (2006.01) | |
| *G06T 7/246* | (2017.01) | |
| *H04N 5/232* | (2006.01) | |
| *G06V 20/10* | (2022.01) | |
| *G06V 20/13* | (2022.01) | |
| *G06T 7/70* | (2017.01) | |
| *B64C 39/02* | (2023.01) | |
| *G05D 1/12* | (2006.01) | |
| *G06T 7/20* | (2017.01) | |

(52) U.S. Cl.
CPC ......... *G05D 1/0011* (2013.01); *G05D 1/0094* (2013.01); *G05D 1/12* (2013.01); *G06T 7/20* (2013.01); *G06T 7/246* (2017.01); *G06T 7/248* (2017.01); *G06T 7/70* (2017.01); *G06V 20/10* (2022.01); *G06V 20/13* (2022.01); *H04N 5/2328* (2013.01); *H04N 5/23299* (2018.08); *B64C 2201/127* (2013.01); *B64C 2201/141* (2013.01); *B64C 2201/145* (2013.01); *G06T 2207/10028* (2013.01); *G06T 2207/10032* (2013.01); *G06T 2210/12* (2013.01); *H04N 5/232* (2013.01)

(56) References Cited

U.S. PATENT DOCUMENTS

| | | | |
|---|---|---|---|
| 8,448,858 | B1 | 5/2013 | Kundu et al. |
| 8,699,748 | B2 * | 4/2014 | Huang .................... G06T 7/277 |
| | | | 375/240 |
| 8,902,233 | B1 | 12/2014 | Shen et al. |
| 9,164,506 | B1 | 10/2015 | Zang |
| 9,165,361 | B1 | 10/2015 | Ely |
| 9,367,067 | B2 | 6/2016 | Gilmore et al. |
| 9,373,036 | B1 | 6/2016 | Mei et al. |
| 10,012,982 | B2 | 7/2018 | Kratz et al. |
| 10,409,276 | B2 * | 9/2019 | Wang .................. G06F 3/04883 |
| 10,429,487 | B1 | 10/2019 | Fowe |
| 2002/0140814 | A1 | 10/2002 | Cohen-Solal et al. |
| 2004/0054473 | A1 | 3/2004 | Shimomura |
| 2005/0004723 | A1 | 1/2005 | Duggan et al. |
| 2007/0070190 | A1 | 3/2007 | Yin et al. |
| 2007/0093945 | A1 | 4/2007 | Grzywna et al. |
| 2008/0002190 | A1 | 1/2008 | Romain et al. |
| 2008/0054158 | A1 | 3/2008 | Ariyur et al. |
| 2008/0055413 | A1 | 3/2008 | Hayashi |
| 2009/0080701 | A1 | 3/2009 | Meuter et al. |
| 2010/0017046 | A1 | 1/2010 | Cheung et al. |
| 2010/0094460 | A1 | 4/2010 | Choi et al. |
| 2010/0179691 | A1 | 7/2010 | Gal et al. |
| 2010/0179760 | A1 | 7/2010 | Petrini |
| 2010/0202660 | A1 | 8/2010 | Lin et al. |
| 2010/0228406 | A1 | 9/2010 | Hamke et al. |
| 2011/0046817 | A1 | 2/2011 | Hamke et al. |
| 2011/0142286 | A1 | 6/2011 | Morriyama |
| 2011/0279682 | A1 | 11/2011 | Li et al. |
| 2011/0304736 | A1 | 12/2011 | Evans et al. |
| 2012/0189162 | A1 | 7/2012 | Sawada |
| 2012/0229651 | A1 | 9/2012 | Takizawa |
| 2012/0288152 | A1 | 11/2012 | Yano |
| 2012/0316680 | A1 * | 12/2012 | Olivier, III ........... G05D 1/0246 |
| | | | 901/1 |
| 2013/0101230 | A1 | 4/2013 | Holeva et al. |
| 2013/0118528 | A1 | 5/2013 | Kim et al. |
| 2013/0208948 | A1 | 8/2013 | Berkovich et al. |
| 2013/0345920 | A1 * | 12/2013 | Duggan ............... G05D 1/0061 |
| | | | 701/23 |
| 2014/0163775 | A1 | 6/2014 | Metzler |
| 2014/0320702 | A1 | 10/2014 | Tsubusaki |
| 2015/0009214 | A1 | 1/2015 | Lee et al. |
| 2015/0029347 | A1 | 1/2015 | Tsubusaki |
| 2015/0117716 | A1 | 4/2015 | Ursin et al. |
| 2015/0142211 | A1 | 5/2015 | Shehata et al. |
| 2015/0146011 | A1 | 5/2015 | Tsubusaki |
| 2015/0326968 | A1 | 11/2015 | Shigenaga et al. |
| 2015/0341603 | A1 | 11/2015 | Kasmir et al. |
| 2016/0054733 | A1 | 2/2016 | Hollida et al. |
| 2016/0078610 | A1 | 3/2016 | Rudd et al. |
| 2016/0125249 | A1 | 5/2016 | Mei et al. |
| 2016/0127641 | A1 | 5/2016 | Gove |
| 2016/0304198 | A1 | 10/2016 | Jourdan |
| 2016/0327956 | A1 | 11/2016 | Zhang et al. |
| 2017/0070674 | A1 | 3/2017 | Thurow et al. |
| 2017/0106537 | A1 | 4/2017 | Chizeck et al. |
| 2017/0225680 | A1 | 8/2017 | Huang et al. |
| 2018/0129212 | A1 | 5/2018 | Lee et al. |
| 2018/0162446 | A1 | 6/2018 | Mikuriya et al. |
| 2018/0165815 | A1 | 6/2018 | Okada et al. |
| 2019/0025858 | A1 | 1/2019 | Bar-Nahum et al. |
| 2019/0156086 | A1 | 5/2019 | Plummer et al. |
| 2019/0265733 | A1 | 8/2019 | Zhou et al. |
| 2019/0277645 | A1 | 9/2019 | Li et al. |

FOREIGN PATENT DOCUMENTS

| | | |
|---|---|---|
| CN | 101489147 A | 7/2009 |
| CN | 101614816 A | 12/2009 |
| CN | 101769754 A | 7/2010 |
| CN | 101860732 A | 10/2010 |
| CN | 102087530 A | 6/2011 |
| CN | 102629385 A | 8/2012 |
| CN | 102902282 A | 1/2013 |
| CN | 202758243 U | 2/2013 |
| CN | 102955478 A | 3/2013 |
| CN | 102967305 A | 3/2013 |
| CN | 103149939 A | 6/2013 |
| CN | 103455797 A | 12/2013 |
| CN | 103530894 A | 1/2014 |
| CN | 103576692 A | 2/2014 |
| CN | 103611324 A | 3/2014 |
| CN | 103822615 A | 5/2014 |
| CN | 103871075 A | 6/2014 |
| CN | 103914068 A | 7/2014 |
| CN | 104035446 A | 9/2014 |
| CN | 104197928 A | 12/2014 |
| CN | 104217417 A | 12/2014 |
| CN | 104299244 A | 1/2015 |
| CN | 104361770 A | 2/2015 |
| CN | 104537898 A | 4/2015 |
| CN | 104656665 A | 5/2015 |
| CN | 204360218 U | 5/2015 |
| CN | 104714556 A | 6/2015 |
| CN | 104781781 A | 7/2015 |
| CN | 104786226 A | 7/2015 |
| CN | 104796611 A | 7/2015 |
| CN | 104820428 A | 8/2015 |
| CN | 104828256 A | 8/2015 |
| CN | 104834307 A | 8/2015 |
| CN | 104850134 A | 8/2015 |
| CN | 104853104 A | 8/2015 |
| CN | 104899554 A | 9/2015 |
| CN | 105371818 A | 3/2016 |
| CN | 107102647 A | 8/2017 |
| JP | H10105712 A | 4/1998 |
| JP | H10141891 A | 5/1998 |
| JP | 2001306144 A | 11/2001 |
| JP | 2004042884 A | 2/2004 |
| JP | 2004112144 A | 4/2004 |
| JP | 2004355105 A | 12/2004 |
| JP | 2008136171 A | 6/2008 |
| JP | 2010202178 A | 9/2010 |
| JP | 2011233149 A | 11/2011 |
| JP | 2012144250 A | 8/2012 |
| JP | 2013177120 A | 9/2013 |
| JP | 2014063411 A | 4/2014 |
| JP | 2014516816 A | 7/2014 |
| JP | 2014212479 A | 11/2014 |
| JP | 2014215196 A | 11/2014 |
| TW | 201235808 A | 9/2012 |
| WO | 2013051046 A1 | 4/2013 |

(56) References Cited

FOREIGN PATENT DOCUMENTS

| WO | 2013139509 A1 | 9/2013 |
|---|---|---|
| WO | 2014118299 A1 | 8/2014 |
| WO | 2014200604 A2 | 12/2014 |
| WO | 2014200604 A3 | 3/2015 |
| WO | 2015105597 A2 | 7/2015 |
| WO | 2015105597 A3 | 10/2015 |
| WO | 2015105597 A4 | 12/2015 |

OTHER PUBLICATIONS

Zhenming Peng, et al., Photoelectric Image Processing and Application, Apr. 2013, pp. 264-265, University of Electronic Science and Technology Press, China.

Zhiming Zhang, et al., Tracking Algorithm Based on Space Correlation of Background Characteristics, Video Application & Project, Video Engineering, Dec. 2012, pp. 172-175, vol. 36, No. 21.

Yu-Fei Zha, et al., Fast Visual Tracking with Spatial Phase Correlation, ACTA Photonica Sinica, vol. 44, No. 7, Jul. 2015.

Yaskawanews, Yaskawa Electric Corporation, Japan, Nov. 20, 2008, 14 pages, Winter 2008, No. 285, https://www.yaskawa.co.jp/wp-content/uploads/2015/01/285.pdf.

Motoman Operation Education Manual YRC / DX / NX Common, Motoman Engineer, Japan, Ring Co., Ltd., Dec. 2017, pp. 2-1, 2-4, 7-5, 13-11, 13-12.

The World Intellectual Property Organization (WIPO) International Search Report for PCT/CN2015/093459 dated Jun. 22, 2016.

The World Intellectual Property Organization (WIPO) International Search Report for PCT/CN2016/074830 dated Aug. 4, 2016.

The World Intellectual Property Organization (WIPO) International Search Report for PCT/CN2015/100257 dated May 30, 2016 6 Pages (Including Translation).

"CN 103149939A Translation". Jun. 2013.

The World Intellectual Property Organization (WIPO) International Search Report for PCT/CN2015/089594 dated Jun. 3, 2016.

Syaril Azrad et al., Visual Servoing of an Autonomous Micro Air Vehicle for Ground Object Tracking, The 2009 IEEE/RSJ International Conference on Intelligent Robots and Systems, Oct. 2009, pp. 5321-5326.

Panagiotis Theodorakopoulos et al., A Strategy for Tracking a Ground Target with a UAV, 2008 IEEE/RSJ International Conference on Intelligent Robots and Systems, IEEE, 2008. (Year 2008).

Xiangjun Wang, et al., Ground Targets Location of UAV Using Vision Location Method, Infrared and Laser Engineering, Feb. 2014, pp. 615-619, vol. 43, No. 2, China Academic Journal Electronic Publishing House, China.

Masone et al."Semi-autonomous Trajectory Generation for Mobile Robots with Integral Haptic Shared Control" Jun. 2014. (Year:2014).

\* cited by examiner

Part A

Part B

Part C

Part D

Part A

Part B

Part C

Part D

Part A

Part B

Part C

Part A

Part B

Part C

Part A

Part B

Part A

Part B

Part C

Part A

Part B

Part C

SYSTEMS AND METHODS FOR UAV INTERACTIVE INSTRUCTIONS AND CONTROL

CROSS-REFERENCE TO RELATED APPLICATIONS

This application is a continuation of application Ser. No. 16/067,577, filed on Jun. 29, 2018, which is a National Phase Entry under 35 U.S.C. § 371 of International Application No. PCT/CN2015/093459, filed on Oct. 30, 2015, which claims priority to International Application No. PCT/CN2015/089594, entitled "SYSTEM AND METHOD FOR SUPPORTING SMOOTH TARGET FOLLOWING," filed on Sep. 15, 2015, the entire contents of all of which are incorporated herein by reference.

BACKGROUND

In some surveillance, reconnaissance, and exploration tasks for real-world applications, one or more objects may need to be detected and tracked. An aerial vehicle carrying a payload (e.g., a camera) can be used to track objects, or controlled to move in a certain direction. Tracking and flight navigation methods may be based on global positioning system (GPS) data or camera vision. However, the development of practical applications for tracking/navigation has been hindered by an absence of an easy-to-use interactive control and guidance system. Presently, one or more operators may have to manually select a target object, and manually control the aerial vehicle/camera to move to the target object or follow the target object. The operators may also have to manually control the aerial vehicle such that it flies in a desired direction and/or avoid obstacles along the way. Presently known flight control systems generally require the operators to have some level of aviation experience or manual skill to operate the aerial vehicle, and offer limited real-time automatic control capability. The lack of an easy-to-use interactive control and guidance system may reduce the usefulness of aerial vehicles in certain applications.

SUMMARY

A need exists for flight control and tracking systems that are intuitive and easy to use, and that allows a human to manage and operate an aerial vehicle through interaction with a human-system interface. The burden of manually piloting the aerial vehicle on the user can be significantly reduced, thus allowing the user to more readily focus on payload or mission operation, such as visually monitoring and/or taking aerial imagery of a stationary target or a moving target.

Improved flight control and tracking capabilities may allow a movable object to automatically detect one or more stationary/moving target objects and to autonomously track the target objects, without requiring manual input and/or operation by a user. The improved flight control and tracking capabilities may be particularly useful when the movable object is used to track a target object, move towards a target object, and/or move in a selected direction. The improved tracking capabilities can be incorporated into an aerial vehicle, such as an unmanned aerial vehicle (UAV).

In vision-based tracking methods, a target object may be tracked using an imaging device located on an aerial vehicle. Vision-based tracking methods can be manual or automatic. For example, in a vision-based manual tracking method, an image may be first captured using the imaging device, and an operator may manually select a target object to be tracked from the image. The manual selection may be performed using an input device, for example, a tablet, a mobile device, or a personal computer (PC). In some instances, the aerial vehicle may be configured to automatically track the target object after it has been manually selected by the operator using the input device. In other instances, the operator may continue to manually control the aerial vehicle to track the target object even after it has been selected.

Conversely, in a vision-based automatic tracking method, automatic tracking may be implemented using tracking algorithms that can automatically detect a particular type of object, or an object carrying a marker. The type of object may be based on different object classes (e.g., people, buildings, landscape, etc.). The marker may include one or more optical markers comprising unique patterns.

In vision-based tracking methods, a target object may be defined based on predetermined features (e.g., color, structure, salient features, etc.) and/or by modeling (e.g., object class). After the target object has been defined, movement of the features and/or model may be detected and calculated in real-time as the target object moves. In these methods, a high-level consistency in the features and/or model may be typically required for precise tracking of the target object. In particular, the level of tracking precision may depend on the spatial relations between the features and/or an error in the model.

Although vision-based tracking methods can be used to track an object, they may be inadequate for tracking the object when obstacles appear in the flight path of the aerial vehicle. The obstacles may be stationary or capable of movement. In some cases, the obstacles may be a fast-moving group of objects, whereby the size and/or shape of the group may be amorphous and change over time as the objects move. Examples of such groups of objects may include, but are not limited to, groups of moving animals (e.g., a herd of horses running on the plains, or a flock of birds flying in different formations), groups of people (e.g., a large crowd of people moving in a parade), groups of vehicles (e.g., a squadron of airplanes performing aerial acrobatics), or groups comprising different objects moving in different formations (e.g., a group comprising of moving animals, people, and vehicles to be tracked). When the obstacles visually obstruct the target object from the field-of-view of a camera on the aerial vehicle, the tracking of the target object may be lost since vision-based tracking methods generally require a clear line-of-sight between the camera and the target object.

In a global positioning system (GPS)-based tracking method, an imaging device and a target object may each be provided with GPS apparatus (e.g., a GPS receiver). A spatial relation between the imaging device and the target object may be calculated based on estimates of their real-time locations. The imaging device may be configured to track the target object based on their spatial relation. However, this method may be limited by GPS signal quality and availability of GPS signals. For example, global positioning system (GPS)-based tracking methods may not work indoors, or when GPS signal reception is blocked by buildings and/or natural terrain features such as valleys, mountains, etc. Furthermore, these methods are predicated on GPS tracking, and thus cannot be used when the target object(s) (e.g., a group of animals) do not carry GPS apparatus. In addition, GPS-based tracking methods are unable to account for obstacles in the path of the movable object.

Accordingly, a need exists to improve the tracking capabilities and robustness of an aerial vehicle under different conditions for a variety of applications. The conditions may include both indoor and outdoor environments, places without GPS signals or places that have poor GPS signal reception, a variety of different terrain, stationary obstacles, dynamically appearing obstacles, etc. The applications may include tracking of a stationary object, a moving target object or a group of moving target objects, or moving in a selected direction. The target objects may include target objects that do not carry GPS apparatus, and target objects that do not have well-defined features or that do not fall into known object classes. The obstacles may collectively form a group whereby the size and/or shape of the group may be amorphous and change over time (such as a flock of birds), different obstacles moving in different formations (other aerial vehicles), or any combination of the above. Systems, methods, and devices are provided herein to address at least the above needs.

For instance, in some aspects of the disclosure, a method for controlling a movable object is provided. The method may comprise: receiving an input indicative of a selected mode, wherein the selected mode is selected from a plurality of modes; and effecting movement of the movable object based on the selected mode.

According to an aspect of the disclosure, an apparatus for controlling a movable object is provided. The apparatus may comprise one or more processors that are, individually or collectively, configured to: receive an input indicative of a selected mode, wherein the selected mode is selected from a plurality of modes; and effect movement of the movable object based on the selected mode.

According to another aspect of the disclosure, a non-transitory computer-readable medium storing instructions that, when executed, causes a computer to perform a method for controlling a movable object, is provided. The method may comprise: receiving an input indicative of a selected mode, wherein the selected mode is selected from a plurality of modes; and effecting movement of the movable object based on the selected mode.

An unmanned aerial vehicle (UAV) system may be provided in accordance with an additional aspect of the disclosure. The system may comprise a flight control module for controlling the UAV. The flight control module may comprise one or more processors that are, individually or collectively, configured to: receive an input indicative of a selected mode, wherein the selected mode is selected from a plurality of modes; and effect movement of the UAV based on the selected mode.

Further aspects of the disclosure may be directed to a method for controlling a movable object. The method may comprise: obtaining target information for the movable object while the movable object is at a first location, wherein said target information is indicative of a second location different from the first location; and generating a path for the movable object from the first location to the second location.

According to an aspect of the disclosure, an apparatus for controlling a movable object is provided. The apparatus may comprise one or more processors that are, individually or collectively, configured to: obtain target information for the movable object while the movable object is at a first location, wherein said target information is indicative of a second location different from the first location; and generate a path for the movable object from the first location to the second location.

According to another aspect of the disclosure, a non-transitory computer-readable medium storing instructions that, when executed, causes a computer to perform a method for controlling a movable object, is provided. The method may comprise: obtaining target information for the movable object while the movable object is at a first location, wherein said target information is indicative of a second location different from the first location; and generating a path for the movable object from the first location to the second location.

An unmanned aerial vehicle (UAV) system may be provided in accordance with an additional aspect of the disclosure. The system may comprise a flight control module for controlling the UAV. The flight control module may comprise one or more processors that are, individually or collectively, configured to: obtain target information for the UAV while the UAV is at a first location, wherein said target information is indicative of a second location different from the first location; and generate a path for the UAV from the first location to the second location.

Further aspects of the disclosure may be directed to a method for controlling a movable object. The method may comprise: acquiring, when the movable object is at a first location, a target from one or more images captured by an imaging device that is carried by the movable object; and controlling the movable object to track the acquired target.

According to an aspect of the disclosure, an apparatus for controlling a movable object is provided. The apparatus may comprise one or more processors that are, individually or collectively, configured to: acquire, when the movable object is at a first location, a target from one or more images captured by an imaging device that is carried by the movable object; and control the movable object to track the acquired target.

According to another aspect of the disclosure, a non-transitory computer-readable medium storing instructions that, when executed, causes a computer to perform a method for controlling a movable object is provided. The method may comprise: acquiring, when the movable object is at a first location, a target from one or more images captured by an imaging device that is carried by the movable object; and controlling the movable object to track the acquired target.

An unmanned aerial vehicle (UAV) system may be provided in accordance with an additional aspect of the disclosure. The system may comprise a flight control module for controlling the UAV. The flight control module may comprise one or more processors that are, individually or collectively, configured to: acquire, when the UAV is at a first location, a target from one or more images captured by an imaging device that is carried by the UAV; and control the UAV to track the acquired target.

Further aspects of the disclosure may be directed to a method for controlling a movable object. The method may comprise: obtaining target information for the movable object while the movable object is at a first location, wherein said target information is indicative of a second location different from the first location; and directing the movable object to move from the first location along a target direction toward the second location.

According to an aspect of the disclosure, an apparatus for controlling a movable object is provided. The apparatus may comprise one or more processors that are, individually or collectively, configured to: obtain target information for the movable object while the movable object is at a first location, wherein said target information is indicative of a second location different from the first location; and direct the movable object to move from the first location along a target direction toward the second location.

According to another aspect of the disclosure, a non-transitory computer-readable medium storing instructions that, when executed, causes a computer to perform a method for controlling a movable object is provided. The method may comprise: obtaining target information for the movable object while the movable object is at a first location, wherein said target information is indicative of a second location different from the first location; and directing the movable object to move from the first location along a target direction toward the second location.

An unmanned aerial vehicle (UAV) system may be provided in accordance with an additional aspect of the disclosure. The system may comprise a flight control module for controlling the UAV. The flight control module may comprise one or more processors that are, individually or collectively, configured to: obtain target information for the movable object while the movable object is at a first location, wherein said target information is indicative of a second location different from the first location; and direct the movable object to move from the first location along a target direction toward the second location.

Further aspects of the disclosure may be directed to a method for controlling a movable object using a computer-implemented graphical display. The method may comprise: receiving an input when a user selects a point that is visually depicted within an image on the graphical display, wherein the movable object is positioned at a first location, and wherein the point corresponds to: (1) a second location different from the first location and/or (2) a direction from the first location; and processing the input to generate: (1) a path for the movable object to move from the first location toward the second location, and/or (2) the direction in which the movable object moves from the first location.

According to an aspect of the disclosure, an apparatus for controlling a movable object using a computer-implemented graphical display is provided. The apparatus may comprise one or more processors that are, individually or collectively, configured to: receive an input when a user selects a point that is visually depicted within an image on the graphical display, wherein the movable object is positioned at a first location, and wherein the point corresponds to: (1) a second location different from the first location and/or (2) a direction from the first location; and process the input to generate: (1) a path for the movable object to move from the first location toward the second location, and/or (2) the direction in which the movable object moves from the first location.

According to another aspect of the disclosure, a non-transitory computer-readable medium storing instructions that, when executed, causes a computer to perform a method for controlling a movable object using a computer-implemented graphical display is provided. The method may comprise: receiving an input when a user selects a point that is visually depicted within an image on the graphical display, wherein the movable object is positioned at a first location, and wherein the point corresponds to: (1) a second location different from the first location and/or (2) a direction from the first location; and processing the input to generate: (1) a path for the movable object to move from the first location toward the second location, and/or (2) the direction in which the movable object moves from the first location.

An unmanned aerial vehicle (UAV) system may be provided in accordance with an additional aspect of the disclosure. The system may comprise a computer-implemented graphical display and a flight control module for controlling the UAV. The flight control module may comprise one or more processors that are, individually or collectively, configured to: receive an input when a user selects a point that is visually depicted within an image on the graphical display, wherein the UAV is positioned at a first location, and wherein the point corresponds to: (1) a second location different from the first location and/or (2) a direction from the first location; and process the input to generate: (1) a path for the movable object to move from the first location toward the second location, and/or (2) the direction in which the movable object moves from the first location.

It shall be understood that different aspects of the disclosure can be appreciated individually, collectively, or in combination with each other. Various aspects of the disclosure described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Systems, methods, and devices provided herein can be used to improve the ease of operation of movable objects such as unmanned aerial vehicles (UAVs). The flight control and tracking systems provided herein are intuitive and easy to use, and allows a human to manage and operate a UAV through interaction with a graphical human-system interface. The burden of manually piloting the UAV on the user can be significantly reduced, thus allowing the user to more readily focus on payload or mission operation, such as visually monitoring and/or taking aerial imagery of a stationary target or a moving target. The burden of manually piloting the UAV on the user may also be significantly reduced by controlling the aerial vehicle to automatically fly in any desired direction via the graphical human-system interface.

The improved flight control and tracking capabilities may further allow a UAV to automatically detect one or more stationary/moving target objects and to autonomously track the target objects, without requiring manual input and/or operation by a user. The improved flight control and tracking capabilities may be particularly useful when the UAV is used to track a target object, move towards a target object, and/or move in a selected direction. The improved tracking capabilities can be incorporated into any type of aerial vehicle.

It shall be understood that different aspects of the disclosure can be appreciated individually, collectively, or in combination with each other. Various aspects of the disclosure described herein may be applied to any of the particular applications set forth below or for any other types of remotely controlled vehicles or movable objects.

Figure 1:
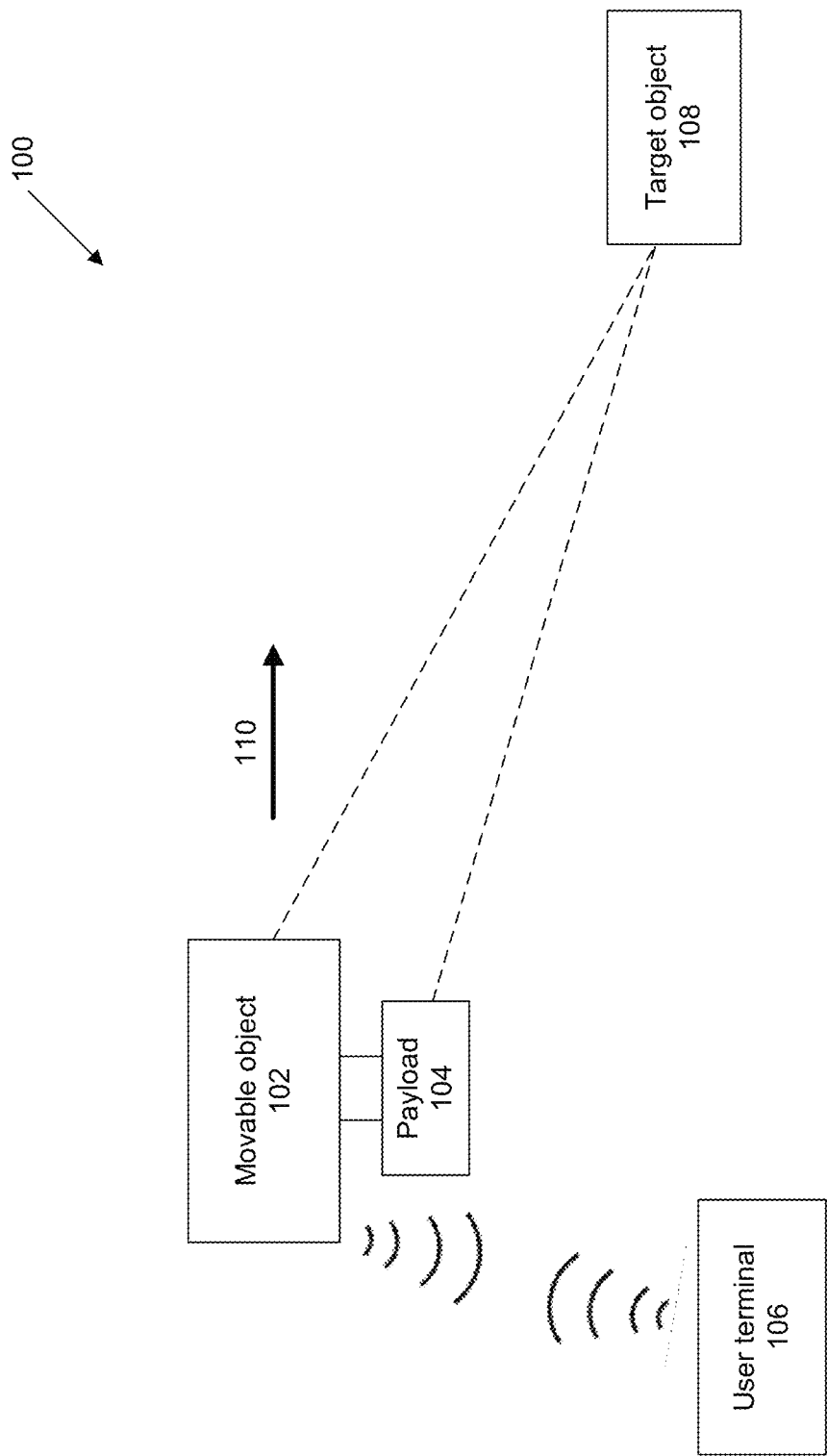
FIG. 1 shows an example of a system used in visual interactive navigation, in accordance with some embodiments.

FIG. 1 shows an example of a system used in visual navigation. The visual navigation system 100 may include a movable object 102 and a user terminal 106 capable of communicating with the movable object. The movable object may be configured to carry a payload 104. The user terminal can be used to control one or more motion characteristics of the movable object and/or the payload. For example, the user terminal can be used to control the movable object such that the movable object is able to navigate towards a target object 108 within an environment. The user terminal can also be used to control the movable object such that the movable object is able to track or follow the target object within the environment. Additionally, the user terminal can be used to control the movable object such that the movable object is able to navigate in a specified direction 110 within the environment.

The movable object 102 may be any object capable of traversing an environment. The movable object may be capable of traversing air, water, land, and/or space. The environment may include objects that are incapable of motion (stationary objects) and objects that are capable of motion. Examples of stationary objects may include geographic features, plants, landmarks, buildings, monolithic structures, or any fixed structures. Examples of objects that are capable of motion include people, vehicles, animals, projectiles, etc.

In some cases, the environment may be an inertial reference frame. The inertial reference frame may be used to describe time and space homogeneously, isotropically, and in a time-independent manner. The inertial reference frame may be established relative to the movable object, and move in accordance with the movable object. Measurements in the inertial reference frame can be converted to measurements in another reference frame (e.g., a global reference frame) by a transformation (e.g., Galilean transformation in Newtonian physics).

The movable object 102 may be a vehicle. The vehicle may be a self-propelled vehicle. The vehicle may traverse an environment with aid of one or more propulsion units. The vehicle may be an aerial vehicle, a land-based vehicle, a water-based vehicle, or a space-based vehicle. The vehicle may be an unmanned vehicle. The vehicle may be capable of traversing an environment without a human passenger onboard. Alternatively, the vehicle may carry a human passenger. In some embodiments, the movable object may be an unmanned aerial vehicle (UAV).

Any description herein of a UAV or any other type of movable object may apply to any other type of movable object or various categories of movable objects in general, or vice versa. For instance, any description herein of a UAV may apply to any unmanned land-bound, water-based, or space-based vehicle. Further examples of movable objects are provided in greater detail elsewhere herein.

As mentioned above, the movable object may be capable of traversing an environment. The movable object may be capable of flight within three dimensions. The movable object may be capable of spatial translation along one, two, or three axes. The one, two or three axes may be orthogonal to one another. The axes may be along a pitch, yaw, and/or roll axis. The movable object may be capable of rotation about one, two, or three axes. The one, two, or three axes may be orthogonal to one another. The axes may be a pitch, yaw, and/or roll axis. The movable object may be capable of movement along up to 6 degrees of freedom. The movable object may include one or more propulsion units that may aid the movable object in movement. For instance, the movable object may be a UAV with one, two or more propulsion units. The propulsion units may be configured to generate lift for the UAV. The propulsion units may include rotors. The movable object may be a multi-rotor UAV.

The movable object may have any physical configuration. For instance, the movable object may have a central body with one or arms or branches extending from the central body. The arms may extend laterally or radially from the central body. The arms may be movable relative to the central body or may be stationary relative to the central body. The arms may support one or more propulsion units. For instance, each arm may support one, two or more propulsion units.

The movable object may have a housing. The housing may be formed from a single integral piece, two integral pieces, or multiple pieces. The housing may include a cavity within where one or more components are disposed. The components may be electrical components, such as a flight controller, one or more processors, one or more memory storage units, one or more sensors (e.g., one or more inertial sensors or any other type of sensor described elsewhere herein), one or more navigational units (e.g., a global positioning system (GPS) unit), one or communication units, or any other type of component. The housing may have a single cavity or multiple cavities. In some instances, a flight controller may in communication with one or more propulsion units and/or may control operation of the one or more propulsion units. The flight controller may communicate and/or control operation of the one or more propulsion units with aid of one or more electronic speed control (ESC) modules. The flight controller may communicate with the ESC modules to control operation of the propulsion units.

The movable object may support an on-board payload 104. The payload may have a fixed position relative to the movable object, or may be movable relative to the movable object.

The payload may spatially translate relative to the movable object. For instance, the payload may move along one, two or three axes relative to the movable object. The payload may rotate relative to the movable object. For instance, the payload may rotate about one, two or three axes relative to the movable object. The axes may be orthogonal to on another. The axes may be a pitch, yaw, and/or roll axis. Alternatively, the payload may be fixed or integrated into the movable object.

The payload may be movable relative to the movable object with aid of a carrier. The carrier may include one or more gimbal stages that may permit movement of the carrier relative to the movable object. For instance, the carrier may include a first gimbal stage that may permit rotation of the carrier relative to the movable object about a first axis, a second gimbal stage that may permit rotation of the carrier relative to the movable object about a second axis, and/or a third gimbal stage that may permit rotation of the carrier relative to the movable object about a third axis. Any descriptions and/or characteristics of carriers as described elsewhere herein may apply.

The payload may include a device capable of sensing the environment about the movable object, a device capable of emitting a signal into the environment, and/or a device capable of interacting with the environment.

One or more sensors may be provided as a payload, and may be capable of sensing the environment. The one or more sensors may include an imaging device. An imaging device may be a physical imaging device. An imaging device can be configured to detect electromagnetic radiation (e.g., visible, infrared, and/or ultraviolet light) and generate image data based on the detected electromagnetic radiation. An imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like. The camera may be a thermal imaging device when it is configured to capture infrared images.

In some embodiments, the payload may include multiple imaging devices, or an imaging device with multiple lenses and/or image sensors. The payload may be capable of taking multiple images substantially simultaneously. The multiple images may aid in the creation of a 3D scene, a 3D virtual environment, a 3D map, or a 3D model. For instance, a right image and a left image may be taken and used for stereomapping. A depth map may be calculated from a calibrated binocular image. Any number of images (e.g., 2 or more, 3 or more, 4 or more, 5 or more, 6 or more, 7 or more, 8 or more, 9 or more) may be taken simultaneously to aid in the creation of a 3D scene/virtual environment/model, and/or for depth mapping. The images may be directed in substantially the same direction or may be directed in slightly different directions. In some instances, data from other sensors (e.g., ultrasonic data, LIDAR data, data from any other sensors as described elsewhere herein, or data from external devices) may aid in the creation of a 2D or 3D image or map.

The imaging device may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution.

The imaging device may capture a sequence of images at a specific capture rate. In some embodiments, the sequence of images may be captured standard video frame rates such as about 24 p, 25 p, 30 p, 48 p, 50 p, 60 p, 72 p, 90 p, 100 p, 120 p, 300 p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

In some alternative embodiments, an imaging device may extend beyond a physical imaging device. For example, an imaging device may include any technique that is capable of capturing and/or generating images or video frames. In some embodiments, the imaging device may refer to an algorithm that is capable of processing images obtained from another physical device.

A payload may include one or more types of sensors. Some examples of types of sensors may include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, and/or gravity detection sensors, which may form inertial measurement units (IMUs)), altitude sensors, attitude sensors (e.g., compasses), pressure sensors (e.g., barometers), temperature sensors, humidity sensors, vibration sensors, audio sensors (e.g., microphones), and/or field sensors (e.g., magnetometers, electromagnetic sensors, radio sensors).

The payload may include one or more devices capable of emitting a signal into an environment. For instance, the payload may include an emitter along an electromagnetic spectrum (e.g., visible light emitter, ultraviolet emitter, infrared emitter). The payload may include a laser or any other type of electromagnetic emitter. The payload may emit one or more vibrations, such as ultrasonic signals. The payload may emit audible sounds (e.g., from a speaker). The payload may emit wireless signals, such as radio signals or other types of signals.

The payload may be capable of interacting with the environment. For instance, the payload may include a robotic arm. The payload may include an item for delivery, such as a liquid, gas, and/or solid component. For example, the payload may include pesticides, water, fertilizer, fire-repellant materials, food, packages, or any other item.

Any examples herein of payloads may apply to devices that may be carried by the movable object or that may be part of the movable object. For instance, one or more sensors may be part of the movable object. The one or more sensors may or may be provided in addition to the payload. This may apply for any type of payload, such as those described herein.

The movable object may be capable of communicating with the user terminal 106. The user terminal may communicate with the movable object itself, with a payload of the movable object, and/or with a carrier of the movable object, wherein the carrier is used to support the payload. Any description herein of communications with the movable object may also apply to communications with the payload of the movable object, the carrier of the movable object, and/or one or more individual components of the movable object (e.g., communication unit, navigation unit, propulsion units, power source, processors, memory storage units, and/or actuators).

The communications between the movable object and the user terminal may be wireless communications. Direct communications may be provided between the movable object and the user terminal. The direct communications may occur without requiring any intermediary device or network. Indirect communications may be provided between the movable object and the user terminal. The indirect communications may occur with aid of one or more intermediary device or network. For instance, indirect communications may utilize a telecommunications network. Indirect communications may be performed with aid of one or more router, communication tower, satellite, or any other intermediary device or network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, or Long Term Evolution (LTE) protocols, Infra-Red (IR) communication technologies, and/or Wi-Fi, and may be wireless, wired, or a combination thereof.

The user terminal may be any type of external device. Examples of user terminals may include, but are not limited to, smartphones/cellphones, tablets, personal digital assistants (PDAs), laptop computers, desktop computers, media content players, video gaming station/system, virtual reality systems, augmented reality systems, wearable devices (e.g., watches, glasses, gloves, headgear (such as hats, helmets, virtual reality headsets, augmented reality headsets, head-mounted devices (HIVID), headbands), pendants, armbands, leg bands, shoes, vests), gesture-recognition devices, microphones, any electronic device capable of providing or rendering image data, or any other type of device. The user terminal may be a handheld object. The user terminal may be portable. The user terminal may be carried by a human user. In some cases, the user terminal may be located remotely from a human user, and the user can control the user terminal using wireless and/or wired communications. Various examples, and/or characteristics of user terminals are provided in greater detail elsewhere herein.

The user terminals may include one or more processors that may be capable of executing non-transitory computer readable media that may provide instructions for one or more actions. The user terminals may include one or more memory storage devices comprising non-transitory computer readable media including code, logic, or instructions for performing the one or more actions. The user terminal may include software applications that allow the user terminal to communicate with and receive imaging data from a movable object. The user terminals may include a communication unit, which may permit the communications with the movable object. In some instances, the communication unit may include a single communication module, or multiple communication modules. In some instances, the user terminal may be capable of interacting with the movable object using a single communication link or multiple different types of communication links.

The user terminal may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a graphical user interface (GUI). The GUI may show an image that may permit a user to control actions of the UAV. For instance, the user may select a target from the image. The target may be a stationary target or a moving target. The user may select a direction of travel from the image. The user may select a portion of the image (e.g., point, region, and/or object) to define the target and/or direction. The user may select the target and/or direction by directly touching the screen (e.g., touchscreen). The user may touch a portion of the screen. The user may touch the portion of the screen by touching a point on the screen. Alternatively, the user may select a region on a screen from a pre-existing set of regions, or may draw a boundary for a region, a diameter of a region, or specify a portion of the screen in any other way. The user may select the target and/or direction by selecting the portion of the image with aid of a user interactive device (e.g., mouse, joystick, keyboard, trackball, touchpad, button, verbal commands, gesture-recognition, attitude sensor, thermal sensor, touch-capacitive sensors, or any other device). A touchscreen may be configured to detect location of the user's touch, length of touch, pressure of touch, and/or touch motion, whereby each of the aforementioned manner of touch may be indicative of a specific input command from the user.

The image on the display may show a view collected with aid of a payload of the movable object. For instance, an image collected by the imaging device may be shown on the display. This may be considered a first person view (FPV). In some instances, a single imaging device may be provided and a single FPV may be provided. Alternatively, multiple imaging devices having different fields of view may be provided. The views may be toggled between the multiple FPVs, or the multiple FPVs may be shown simultaneously. The multiple FPVs may correspond to (or generated by) different imaging devices, which may have different field of views. A user at a user terminal may select a portion of the image collected by the imaging device to specify a target and/or direction of motion by the movable object.

In another example, the image on the display may show a map that may be generated with aid of information from a payload of the movable object. The map may optionally be generated with aid of multiple imaging devices (e.g., right camera, left camera, or more cameras), which may utilize stereo-mapping techniques. In some instances, the map may be generated based on positional information about the UAV relative to the environment, the imaging device relative to the environment, and/or the UAV relative to the imaging device. Positional information may include posture information, spatial location information, angular velocity, linear velocity, angular acceleration, and/or linear acceleration. The map may be optionally generated with aid of one or more additional sensors, as described in greater detail elsewhere herein. The map may be a two-dimensional map or a three-dimensional map. The views may be toggled between a two-dimensional and a three-dimensional map view, or the two-dimensional and three-dimensional map views may be shown simultaneously. A user at a user terminal may select a portion of the map to specify a target and/or direction of motion by the movable object. The views may be toggled between one or more FPV and one or more map view, or the one or more FPV and one or more map view may be shown simultaneously. The user may make a selection of a target or direction using any of the views. The portion selected by the user may include the target and/or direction. The user may select the portion using any of the selection techniques as described.

In some embodiments, the image may be provided in a 3D virtual environment that is displayed on the user terminal (e.g., virtual reality system or augmented reality system). The 3D virtual environment may optionally correspond to a 3D map. The virtual environment may comprise a plurality of points or objects that can be manipulated by a user. The user can manipulate the points or objects through a variety of different actions in the virtual environment. Examples of those actions may include selecting one or more points or objects, drag-and-drop, translate, rotate, spin, push, pull, zoom-in, zoom-out, etc. Any type of movement action of the points or objects in a three-dimensional virtual space may be contemplated. A user at a user terminal can manipulate the points or objects in the virtual environment to control a flight path of the UAV and/or motion characteristic(s) of the UAV.

The user terminal may optionally be used to control the movement of the movable object, such as the flight of an UAV. The user terminal may permit a user to manually directly control flight of the movable object. Alternatively, a separate device may be provided that may allow a user to manually directly control flight of the movable object. The separate device may or may not be in communication with the user terminal. The flight of the movable object may optionally be fully autonomous or semi-autonomous. The user terminal may optionally be used to control any component of the movable object (e.g., operation of the payload, operation of the carrier, one or more sensors, communications, navigation, landing stand, actuation of one or more components, power supply control, or any other function). Alternatively, a separate device may be used to control one or more components of the movable object. The separate device may or may not be in communication with the user terminal. One or more components may be controlled automatically with aid of one or more processors.

A target object 108 may be selected by a user. The movable object 102 may travel toward the target object and/or visually track the target object. The target object may be a stationary target or a moving target. In some instances, the user may specify whether the target is a stationary or moving target. A user may specify by selecting a mode of targeting (e.g., select a fly-to mode or a tracking mode). Alternatively, the user may provide any other type of indicator of whether the target is a stationary or moving target. Alternatively, no indication may be provided, and a determination may be automatically made with aid of one or more processors, optionally without requiring user input whether the target is a stationary target or a moving target, and selecting a mode of targeting (e.g., select a fly-to mode or a tracking mode). A target object may be classified as a stationary target or a moving target depending on its state of motion. In some cases, a target object may be moving or stationary at any given point in time. When the target object is moving, the target object may be classified as a moving target. Conversely, when the same target object is stationary, the target object may be classified as a stationary target.

A stationary target may remain substantially stationary within an environment. Examples of stationary targets may include, but are not limited to landscape features (e.g., trees, plants, mountains, hills, rivers, streams, creeks, valleys, boulders, rocks, etc.) or manmade features (e.g., structures, buildings, roads, bridges, poles, fences, unmoving vehicles, signs, lights, etc.). Stationary targets may include large targets or small targets. A user may select a stationary target. The stationary target may be recognized. Optionally, the stationary target may be mapped. The movable object may travel to the stationary target. A path (e.g., flight path) may be planned for the movable object to travel to the stationary target. Alternatively, the movable object may travel to the stationary target without requiring a planned path. In some instances, the stationary target may correspond to a selected portion of a structure or object. For example, the stationary target may correspond to a particular section (e.g., top floor) of a skyscraper.

A moving target may be capable of moving within the environment. The moving target may always be in motion, or may be at motions for portions of a time. The moving target may move in a fairly steady direction or may change direction. The moving target may move in the air, on land, underground, on or in the water, and/or in space. The moving target may be a living moving target (e.g., human, animal) or a non-living moving target (e.g., moving vehicle, moving machinery, object blowing in wind or carried by water, object carried by living target). The moving target may include a single moving object or a group of moving objects. For instance, the moving target may include a single human or a group of moving humans. Moving targets may be large targets or small targets. A user may select a moving target. The moving target may be recognized. Optionally, the moving target may be mapped. The movable object may travel to the moving target and/or visually track the moving object. A path (e.g., flight path) may be planned for the movable object to travel to the moving object. The path may be changed or updated as the moving object moves. Alternatively, the movable object may travel to the stationary object and/or visually track the moving object without requiring a planned path.

A moving target may be any object configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments.

A moving target may be capable of moving freely within the environment with respect to six degrees of freedom (e.g., three degrees of freedom in translation and three degrees of freedom in rotation). Alternatively, the movement of the moving target can be constrained with respect to one or more degrees of freedom, such as by a predetermined path, track, or orientation. The movement can be actuated by any suitable actuation mechanism, such as an engine or a motor. The actuation mechanism of the moving target can be powered by any suitable energy source, such as electrical energy, magnetic energy, solar energy, wind energy, gravitational energy, chemical energy, nuclear energy, or any suitable combination thereof. The moving target may be self-propelled via a propulsion system, such as described further below. The propulsion system may optionally run on an energy source, such as electrical energy, magnetic energy, solar energy, wind energy, gravitational energy, chemical energy, nuclear energy, or any suitable combination thereof.

In some instances, the moving target can be a vehicle, such as a remotely controlled vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

A direction 110 may be selected by the user. The movable object 102 may travel in the direction selected by the user. The direction may be selected by a user selecting a portion of an image (e.g., in FPV or map view). The movable object may travel in the selected direction until a countermanding instruction is received or when a countermanding condition is realized. For instance, the movable object may automatically travel in the selected direction until a new direction is input, or a new target is input. The movable object may travel in the selected direction until a different flight mode is selected. For instance, the user may take manual control over the flight of the movable object.

Restrictions may be provided for the travel of the movable object. In another instance, a condition may be detected in which a flight restriction may apply. As described in greater detail below, obstacle avoidance may occur when undergoing target or direction tracking. Additional limitations such as flight ceilings, flight floors, limited range, or other types of flight restrictions may apply.

Figure 2:
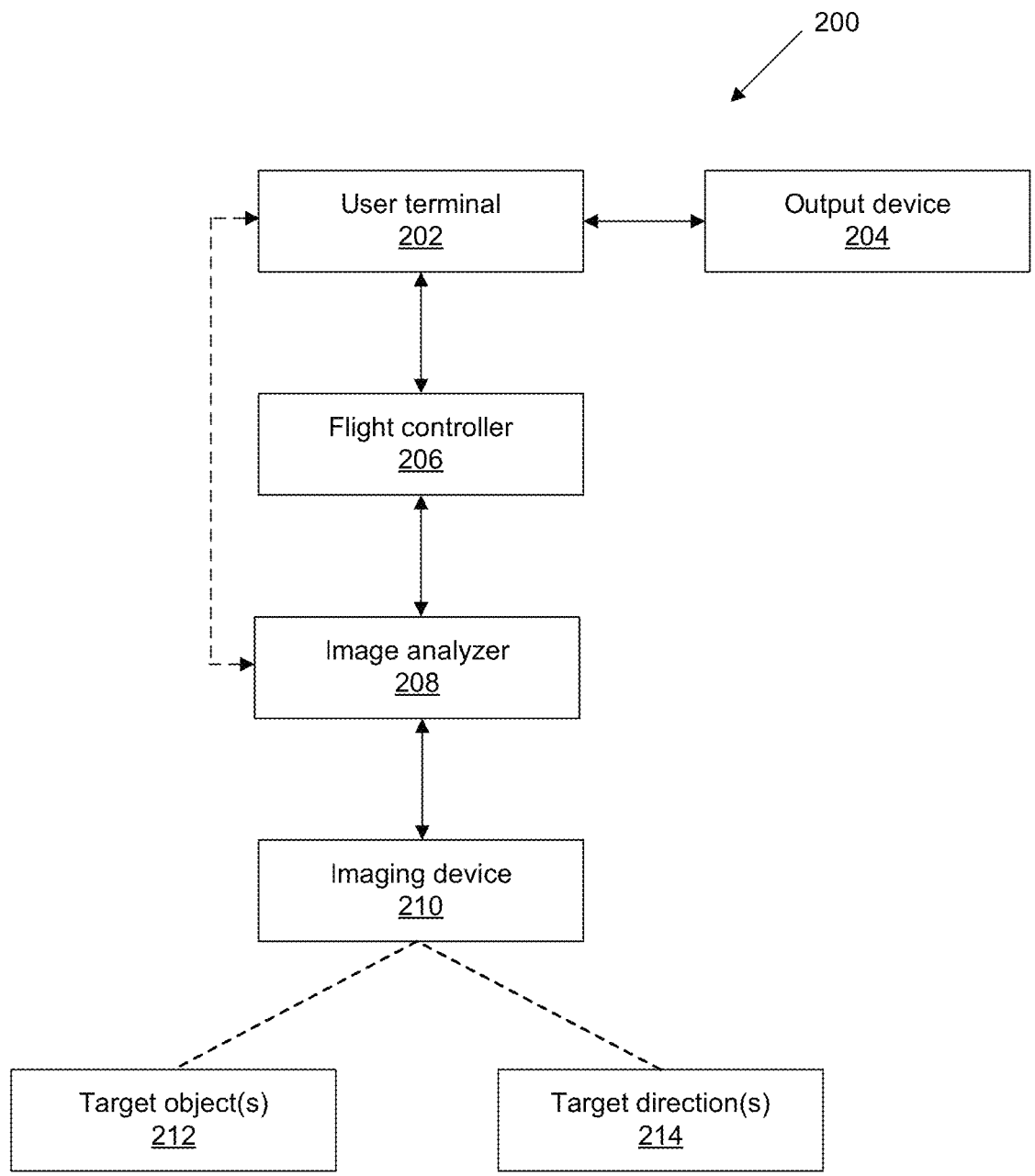
FIG. 2 shows an example of communications that may occur within a visual interactive navigation system, in accordance with some embodiments.

FIG. 2 shows an example of communications that may occur within a visual navigation system. Within a visual navigation system 200, a user terminal 202 may be provided that may accept an input from a user. The user terminal may include an output device 204. The user terminal may also communicate with a flight controller 206, which may communicate with an image analyzer 208. The image analyzer may communicate with an imaging device 210. The imaging device may capture images which may include portions indicative of one or more target objects 212 and/or one or more target direction(s) 214.

A user terminal 202 may include an output device 204 of the user terminal. The output device may be a display, such as a screen. A user may interact with the user terminal via the output screen. For example, when the output device is a touchscreen, a user may manipulate visual objects in a GUI on the touchscreen by selecting (touching) the visual objects through a variety of actions. Examples of those actions may include selecting one or more points or objects, draw a shape, drag-and-drop, translate, rotate, spin, push, pull, zoom-in, zoom-out, etc. Any type of user action in the GUI may be contemplated. A user at a user terminal can manipulate the visual objects in the GUI to control flight path, flight direction, tracking function, and/or motion characteristic(s) of the UAV.

The display may have any characteristics as described elsewhere herein. The display may be incorporated into the user device or may be provided separately from the rest of the user terminal. If provided separately from the rest of the user terminal, the display device may communicate with the user terminal. Two-way communications may optionally be provided between the output device and the rest of the user terminal.

The user terminal may be configured to display, on the output device, one or more images through which a user may select a target and/or direction. As previously described, the images may include FPVs and/or map views. The image may include a live-image or visual representation of a target and/or direction. A target object and/or direction may be identified by a user that may make a selection in the image. For example, a portion of the image selected by the user may become a target object. A portion of the image selected by the user may become a target direction.

One or more imaging devices 210 may be provided. The one or more imaging devices may have substantially the same field of view or different fields of view. One or more imaging devices may be movable relative to the movable object while one or more imaging devices may be stationary relative to the movable object. In one example, one or more of the imaging devices may be supported by a carrier that may permit movement of the imaging device relative to the movable object. One or more of the imaging devices may be directly on the movable object, move in the same direction and speed as the movable object, and/or may not move relative to the movable object.

One or more imaging devices may capture images of an environment. The environment may include one or more target objects 212 and/or target directions 214. The target objects and/or directions may be defined or determined by the user who may make a selection within the image. The image data captured by the one or more imaging devices may correspond to, for example, still images or video frames of one or more objects. The objects may include any physical object or structure that can be optically identified and/or tracked in real-time by the movable object. Optical tracking has several advantages. For example, optical tracking allows for wireless 'sensors', is less susceptible to noise, and allows for many objects (e.g., different types of objects) to be tracked simultaneously. The objects can be depicted in still images and/or video frames in a 2D or 3D format, can be real-life and/or animated, can be in color, black/white, or grayscale, can be in any color space, or can be in a wireframe model.

Images from the one or more imaging devices may optionally be received by an image analyzer 208. The image analyzer may be on-board the imaging device, on-board a carrier, on-board a movable object, or an external device (e.g., user terminal, server, etc.). In some embodiments, the image analyzer may be located remotely from the imaging device. For example, the image analyzer may be disposed in a remote server that is in communication with the imaging device. The image analyzer may be provided at any other type of external device (e.g., a remote controller for a tracking device, an object carried by the target object, a reference location such as a base station, or another tracking device), or may be distributed on a cloud computing infrastructure. In some embodiments, the image analyzer and the flight controller may be located on a same device. In other embodiments, the image analyzer and the flight controller may be located on different devices. The image analyzer and the flight controller may communicate either via wired or wireless connections. In some embodiments, the image analyzer may be located on a movable object. For example, the image analyzer may be disposed in a housing of the movable object. In some further embodiments, the image analyzer may be disposed at a base station that is in communication with the movable object. The image analyzer may be located anywhere, as long as the image analyzer is capable of: (i) receiving a plurality of image frames captured at different times using an imaging device, and (ii) analyzing the plurality of image frames.

In some embodiments, the image data captured by the imaging device may be stored in a media storage (not shown) before the image data is provided to the image analyzer. The image analyzer may be configured to receive the image data directly from the media storage. In some embodiments, the image analyzer may be configured to receive image data concurrently from both the imaging device and the media storage. The media storage can be any type of storage medium capable of storing image data of a plurality of objects. As previously described, the image data may include video or still images. The video or still images may be processed and analyzed by the image analyzer, as described later in the specification. The media storage can be provided as a CD, DVD, Blu-ray disc, hard disk, magnetic tape, flash memory card/drive, solid state drive, volatile or non-volatile memory, holographic data storage, and any other type of storage medium. In some embodiments, the media storage can also be a computer capable of providing image data to the image analyzer.

As another example, the media storage can be a web server, an enterprise server, or any other type of computer server. The media storage can be computer programmed to accept requests (e.g., HTTP, or other protocols that can initiate data transmission) from the image analyzer and to serve the image analyzer with requested image data. In addition, the media storage can be a broadcasting facility, such as free-to-air, cable, satellite, and other broadcasting facility, for distributing image data. The media storage may also be a server in a data network (e.g., a cloud computing network).

In some embodiments, the media storage may be located on-board the imaging device. In some other embodiments, the media storage may be located on-board the movable object but off-board the imaging device. In some further embodiments, the media storage may be located on one or more external devices off-board the movable object and/or the imaging device. In those further embodiments, the media storage may be located on a remote controller, a ground station, a server, etc. Any arrange or combination of the above components may be contemplated. In some embodiments, the media storage may communicate with the imaging device and the tracking device via a peer-to-peer network architecture. In some embodiments, the media storage may be implemented using a cloud computing architecture.

The image data may be provided (e.g., in the form of image signals) to the image analyzer for image processing/analysis. In some examples, the image analyzer can be implemented as a software program executing in a processor and/or as hardware that analyzes the plurality of image frames to identify a target object and/or direction. For example, the image analyzer may be configured to analyze the image frames to identify a target object, such a stationary target or a moving target. This may include detecting the object based on an input from the user, such as a portion of the image that is selected. For instance, even if a single point is selected, an object corresponding to the point may be determined. The image analyzer may be configured to analyze the image frames to identify a target direction.

The image analyzer may be configured to determine the relative positions between the movable object and the target object or direction. In some instances, the image analyzer may determine a position of the imaging device and/or movable object with respect to the environment (e.g., an inertial reference frame) and/or one another. The image analyzer may determine a position of the target object with respect to the environment (e.g., an inertial reference frame) and/or with respect to the movable object (which may include an imaging device supported by the movable object). Optionally, data from one or more additional sensors and/or external devices may be used to aid in determination of positional information by the image analyzer (for example, IMU data or data from any other sensors as described elsewhere herein). As previously described, positional information may include spatial location (e.g., in reference to one, two or three axes), attitude (e.g., relative to one, two or three axes), linear velocity, angular velocity, linear acceleration, and/or angular acceleration.

The resulting analysis of the image frames may be provided (in the form of analyzed signals) to be displayed on an output device of a user terminal. For example, a map may be generated indicative of the environment and/or positions of various objects and/or the movable object within the environment. The map may be a 2D or a 3D map. The map may be displayed on the output device. Optionally, data from the image analyzer may be provided directly to a user terminal which may display it on its output device without requiring any intermediary analysis or processing. For instance, the data from the image analyzer may optionally be transmitted to be displayed on an output device of the user terminal without going through a flight controller.

Optionally, data from the image analyzer may be provided to a flight controller 206. The flight controller may be provided on-board the movable object, on-board the carrier, on-board the imaging device, and/or on an external device or network. The flight controller may be provided using any exemplary devices or configurations provided elsewhere herein for other components, such as the image analyzer or memory storage.

The flight controller may control flight of the movable object. Optionally, the flight controller may generate one or more flight instructions to be provided to one or more propulsion units of the movable object. The flight controller may optionally generate a flight path for the movable object. The flight path may be substantially fixed, or may be variable or dynamic. The flight path may be toward a target object. In some embodiments, a flight path may be toward a stationary object. The flight path may optionally be heading towards a moving object, but the heading and/or path may be altered as the object is moving. Alternatively, no flight path is generated for the moving object. The flight path may include a heading in a target direction. The flight path may remain heading in the target direction until a countermanding condition is detected (e.g., a further input is detected or a flight restriction applies). The flight controller may be in communication with one or more propulsion units of the movable object (not pictured).

Optionally, information from one or more sensors may be provided to the flight controller. For example, information from one or more sets of IMUs may be provided to the flight controller. The one or more sets of IMUs may be on-board the movable object, on-board a carrier and/or on-board a payload. The data from the IMUs may be indicative of positional information of the movable object, the carrier, and/or the payload. The flight controller may optionally use the information from the one or more sensors in controlling flight of the UAV. Optionally the information from the one or more sensors may be used to control position of the imaging device relative to the UAV and/or its environment.

The flight controller may receive information from the user terminal. The flight controller may receive information indicative of the user selection of a target and/or direction. The flight controller may generate a flight path and/or control flight of the UAV in response to the selection of the target and/or direction.

Information from the flight controller may optionally be provided to the user terminal. For instance, a user terminal may receive information about a flight path. The flight path and/or heading may optionally be displayed on the output device.

While shown in FIG. 2 as separate components that are operatively connected, it is understood that the as-shown configuration is for illustrative purposes only. Certain components or devices may be removed or combined, and other components or devices may be added.

A method for controlling a movable object (such as a UAV) may be implemented using the system of FIG. 2. The method may include obtaining target information for the movable object while the movable object is at a first location. The target information may be indicative of a second location different from the first location. The method may further include generating a path for the movable object from the first location to the second location. The target information may be obtained using one or more imaging devices. The path for the movable object may be a flight path, and may be generated by the flight controller and/or the user terminal.

The second location may be based on one or more selected points in at least one image captured by the movable object at the first location. The image may be captured using at least one imaging device located on the movable object. The imaging device may be a payload carried by the movable object. The image may be displayed on the output device of the user terminal. The one or more selected points may be associated with a target. When a user selects one or more points in the image on the display, at least a portion of the target that is displayed in the image may be selected. In some cases, selecting the one or more points may cause the entire target that is displayed in the image to be selected.

The position of the target in the real world (i.e., the world coordinates) may be determined using a single imaging device, or a plurality of imaging devices.

When the position of the target is determined using a single imaging device, the position of the target may be determined using a triangulation method. First, the imaging device may be translated (by moving the movable object) in a lateral manner relative to the target, and perpendicular to a direction from the imaging device to the target. During the lateral translation, the imaging device may capture a plurality of images. The plurality of images may be provided to the image analyzer, which then calculates a distance from the target to the movable object based on: (1) a change in position of the target in the plurality of images, and (2) distances traveled by the movable object during the lateral translation. The distances covered during the lateral translation may be recorded by an IMU on the imaging device and/or the movable object. Alternatively, the distances covered during the lateral translation may be obtained from one or more global navigation satellite systems (GNSS). For example, GNSS receivers on the imaging device and/or the movable object can determine estimated position, velocity, and precise time (PVT) by processing signals broadcasted by the satellites. The PVT information can be used to calculate the distances covered during the lateral translation.

The IMU may be an electronic device that is configured to measure and report the UAV's velocity, orientation, and gravitational forces, using a combination of accelerometers and gyroscopes. Magnetometers may be optionally included. The IMU may detect current rate of acceleration using one or more accelerometers, and detect changes in rotational attributes like pitch, roll and yaw using one or more gyroscopes. A magnetometer may be included to assist calibration against orientation drift.

In some embodiments, the position of the target may be determined using a single imaging device that is a time-of-flight (TOF) camera. In those embodiments, the position of the target may be determined without moving the TOF camera. A time-of-flight camera (TOF camera) may be a range imaging camera system that can resolve distances based on the known speed of light, by measuring the time-of-flight of a light signal between the camera and the subject for each point of the image. In some cases, tracking accuracy may be improved using a TOF camera.

Figure 3:
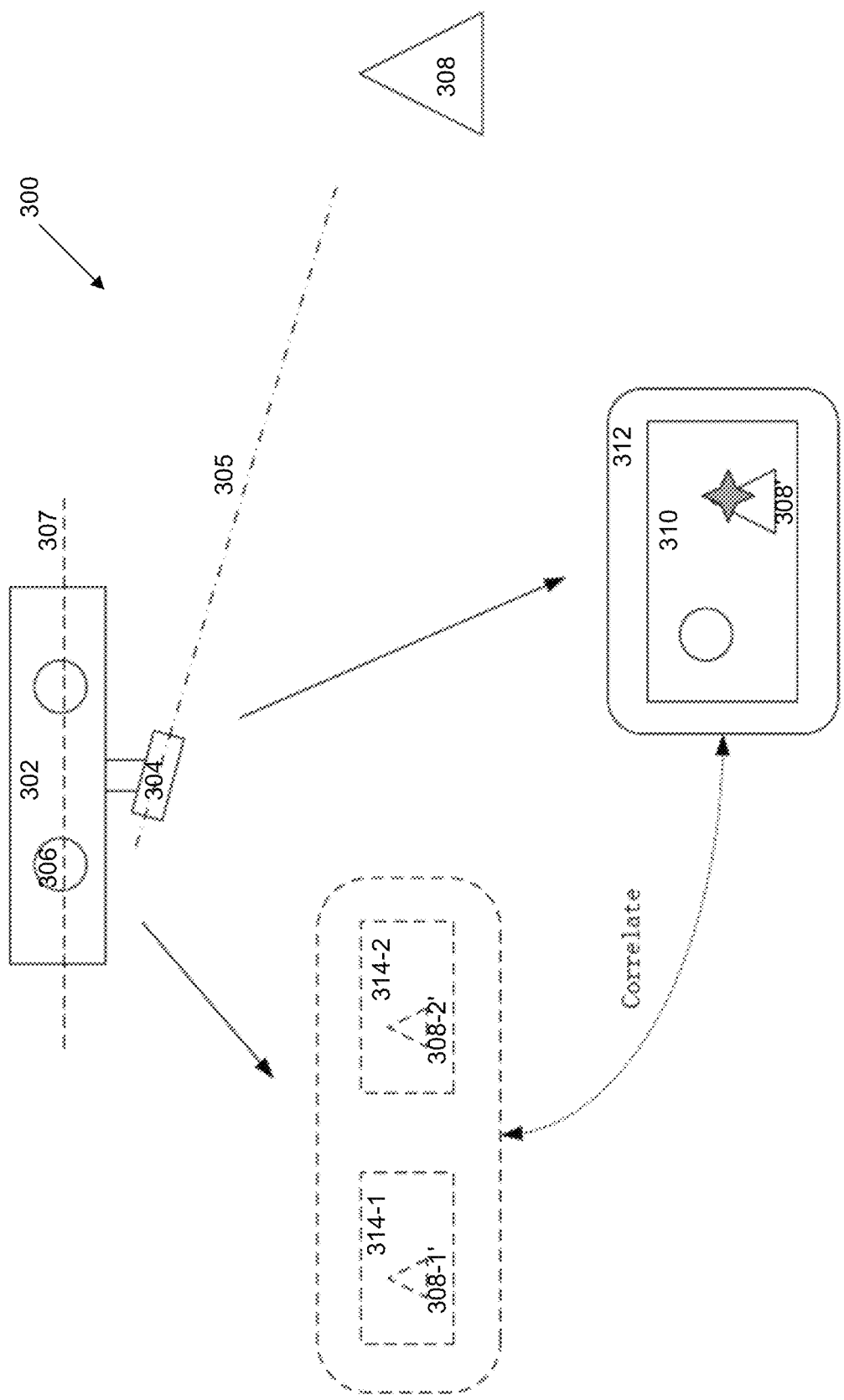
FIG. 3 shows an example in which the position of the target may be determined using a plurality of imaging devices, in accordance with some embodiments.

In some other embodiments, the position of the target may be determined using a plurality of imaging devices. FIG. 3 shows an example in which the position of the target may be determined using a plurality of imaging devices. A first imaging device 304 and a second imaging device 306 may be provided. The first imaging device and the second imaging device may be disposed at different locations. For example, the first imaging device may be a payload carried by a movable object 302, and the second imaging device may be located on or within the movable object. In some embodiments, the first imaging device may be a camera and the second imaging device may be a binocular vision sensor. In some embodiments, the first imaging device and the second imaging device may be part of a same binocular camera. A first IMU may be disposed on the payload, for example on the first imaging device itself, or on a carrier that couples the payload to the movable object. A second IMU may be located within a body of the movable object. The first imaging device and the second imaging device may have different optical axes. For example, the first imaging device may have a first optical axis 305 and the second imaging device may have a second optical axis 307. The first imaging device and the second imaging device may belong to different inertial reference frames that move independently of each other. Alternatively the first imaging device and the second imaging device may belong to a same inertial reference frame. The first imaging device may be configured to capture an image 310 that is displayed on an output device of a user terminal. The second imaging device may be configured to capture a binocular image 314 comprising a left-eye image 314-1 and a right-eye image 314-2. As shown in FIG. 3, the first imaging device and the second imaging device may capture images of a target 308. However, the position of the target in the captured images may be different since the first imaging device and the second imaging device are at different locations. For example, in FIG. 3, the position 308' of the target in the image 310 may be located on a bottom right corner of the image. In contrast, the position 308-1' of the target in the left-eye image 314-1 and the position 308-2' of the target in the right-eye image 314-2 may be located in a left portion of the respective left and right eye images. The positions 308-1' and 308-2' in the left and right eye images may also be slightly different due to the binocular vision.

A positional difference between the first imaging device and the second imaging device may be determined based on real-time positional information obtained from the first IMU and the second IMU. The real-time positional information from the first IMU may be indicative of the actual position of the first imaging device since the first IMU is mounted on the payload. Likewise, the real-time positional information from the second IMU may be indicative of the actual position of the second imaging device since the second IMU is located at the second imaging device on the body of the movable object. In some instances, the flight controller may adjust an attitude of the movable object and/or the payload based on the calculated positional difference. The image analyzer may be configured to correlate or map the images obtained by the second imaging device to the images obtained by the first imaging device, based on the calculated positional difference. The position of the target may be determined based on the correlation of the images between the first and second imaging devices, and the positional difference of the first and second imaging devices at different time instances.

In some embodiments, the actual position of the target need not be known. The tracking may be based primarily from the size and/or position of the target in the image. For example, the movable object may be configured to move towards the target until a size of the target in the image reaches a predetermined threshold. Alternatively the imaging device of the movable object may zoom in onto the target without the movable object moving, until a size of the target in the image reaches a predetermined threshold. Optionally the imaging device may zoom in and the movable object may move towards the target object simultaneously, until a size of the target in the image reaches a predetermined threshold. In some embodiments, the actual position of the target may be known. The size of the target in the image may include a characteristic length of the target in the image. The characteristic length of the target in the image may be based on a most significant dimensional scale of the target. The most significant dimensional scale of the target may be represented by a length, width, height, thickness, arc, and/or circumference of a substantial portion of the target. The predetermined threshold may be defined based on a width of the image. In some embodiments, the movable object may be configured to move towards the target and/or the imaging device may be actuated until the target in the image is displayed in a target region. The target region may be a central portion of the image, and any other potion of the image. Actuation of the imaging device in n degrees of freedom may be achieved using a carrier (e.g., a gimbal).

The movable object may be configured to move along the path from the first location to the second location. For many real world applications, knowing merely the positions of a target and the movable object may not be sufficient for real-time tracking. For example, the surrounding environment may include obstacles in the path between the movable object and the target. These obstacles may be stationary, capable of movement, or in motion. As such, information about the external environment may be necessary for the movable object to avoid such obstacles by re-planning its path in real-time. In some embodiments, information about the external environment may be provided in a 3D map based on one or more images captured by one or more imaging devices. The flight path for the movable object may be generated by using the 3D map.

Figure 4:
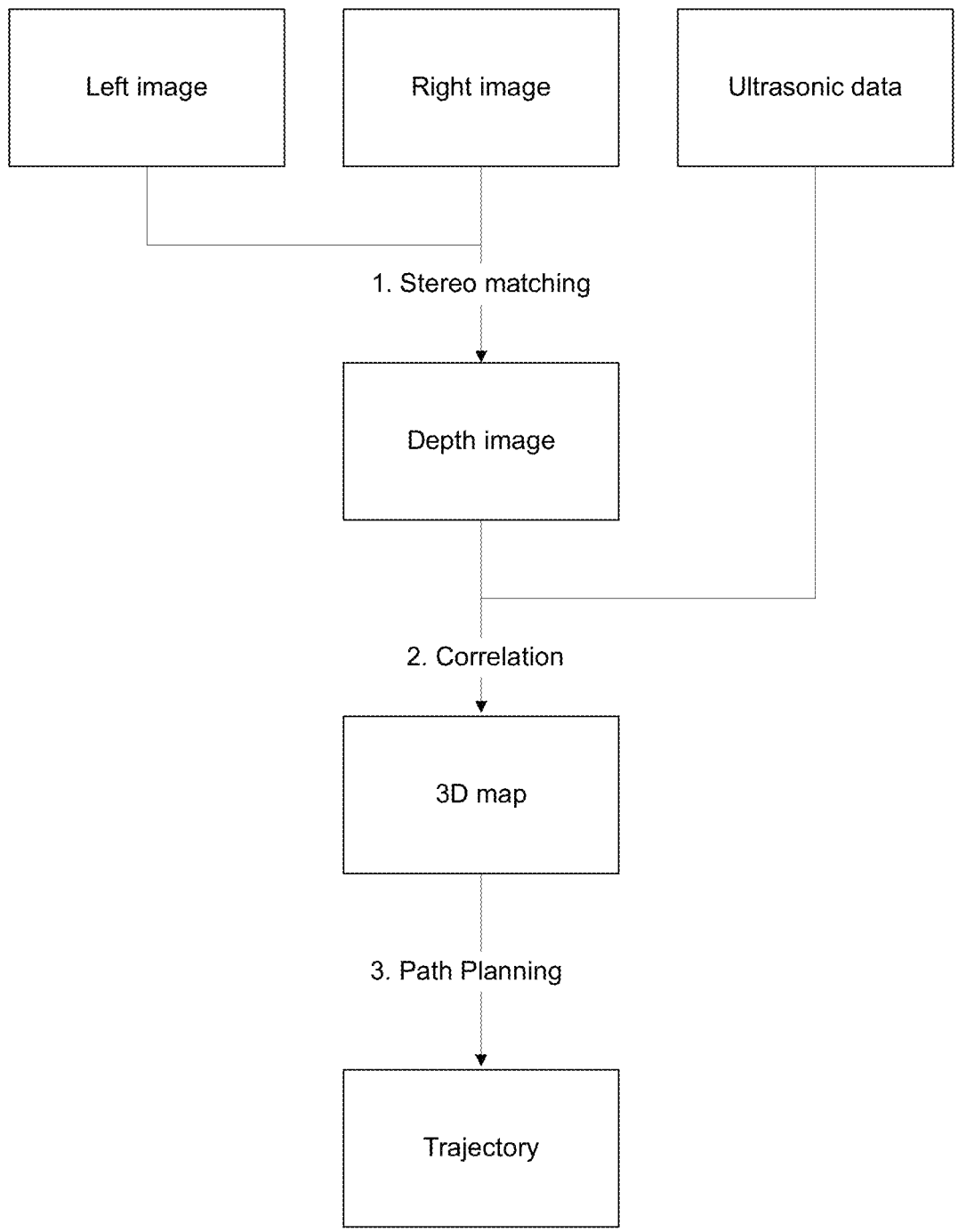
FIG. 4 shows an exemplary method for generating a flight path using a 3D map and avoiding obstacles, in accordance with some embodiments.

FIG. 4 shows an exemplary method for generating a flight path using a 3D map and avoiding obstacles in accordance with some embodiments. First, an image may be captured by an imaging device. The imaging device may be a binocular vision sensor on the movable object. The image may be a binocular image comprising a left-eye image and a right-eye image. As previously mentioned, the binocular image may be correlated/calibrated with the image captured by another camera (payload). A depth map may be generated using the binocular image, by stereo matching of the left-eye image and the right-eye image. The left-eye image and right-eye image may be matched to obtain a depth image in which the position of obstacles/objects in the environment can be detected. In some embodiments, a depth map may be generated using multiple cameras disposed at a plurality of locations. The stereo matching may be performed using real-time block matching (BM) or semi-global block matching (SGBM) algorithms implemented using one or more processors. In some embodiments, ultrasonic data from an ultrasonic sensor may be additionally used to detect the position/distance of an object having no obvious texture (e.g., a binocular vision sensor may not be capable of detecting the position of a white-colored wall, or a glass wall).

A 3D map of the external environment may be generated by correlating the binocular image or any image to the depth map. For example, the left-eye image and/or the right-eye image may be mapped to the depth map. In some cases, the image captured by the other camera (payload) may be mapped to the depth map. The depth map may comprise a plurality of pixel points. A valid pixel point may correspond to an obstacle in the external environment. The relationship between pixel points and obstacles may be one-to-many or many-to-one. For example, a valid pixel point may correspond to a plurality of obstacles. Alternatively, a plurality of valid pixel points may correspond to an obstacle. In some cases, a group of valid pixel points may correspond to a group of obstacles. A valid pixel point has a value that is greater than 0. Conversely, an invalid pixel point is a point that is unidentifiable from the mapped image. An invalid pixel point has a value that is equal to or less than 0. Objects that have no obvious texture or are transparent may show up invalid pixel points in the image. In some embodiments, ultrasonic data from ultrasonic imaging may be used to supplement the visual correlation to identify those invalid pixel points. The ultrasonic imaging may be performed, for example using a lidar sensor located on the movable object. Ultrasonic data from the ultrasonic sensor can be used to detect the position/distance of an object having no obvious texture or that is transparent.

Next, 3D spatial points corresponding to the pixel points in the depth map may be generated. A 3D spatial point corresponding to a pixel point in the depth map may be given by:

$$\begin{pmatrix} X \\ Y \\ Z \end{pmatrix} = \begin{pmatrix} d(x-c_x)/f \\ d(y-c_y)/f \\ d \end{pmatrix}, \text{ if } d > 0.$$

where d is a depth in the depth map, f is a focal length of the imaging device, (cx, cy) is an offset from a central point (centroid) of the movable object, and (x, y) is the pixel point on the depth map. A plurality of 3D spatial points may be distributed into a plurality of cells of an occupancy grid. The position of the movable object may be located at the center of the occupancy grid. In some cases, the position of the movable object may be located another portion (e.g., edge) of the occupancy grid. The occupancy grid may be used to define a 3D map of the spatial environment surrounding the movable object.

The occupancy grid may have plurality of cells. The occupancy grid may have a size of $n_x \times n_y \times n_z$, where $n_x$ is the number of cells along an x-axis, $n_y$ is the number of cells along a y-axis, and $n_z$ is the number of cells along a z-axis. $n_x$, $n_y$, and $n_z$ may be any integer, and may be the same or different. In some embodiments, $n_x = n_y = 80$ and $n_z = 40$. In some embodiments, $n_x$ and $n_y$ may be less than 80 or greater than 80. In some embodiments, $n_z$ may be less than 40 or greater than 40. Each cell in the occupancy grid may have a size of m×m×m, where m may be any dimension. In some embodiments, m may be less than or equal to 0.1 meters, 0.2 meters, 0.3 meters, 0.4 meters, 0.5 meters, or 1 meter. In some embodiments, m may be greater than 1 meter, 1.1 meter, 1.2 meter, 1.3 meter, 1.4 meter, 1.5 meter, or 2 meters.

The occupancy grid may have i number of cells, where i=nx×n y×nz. Each cell may be denoted as an i-th cell. For example, 1=1 may denote a first cell, and 1=10 may denote a tenth cell. For each i-th cell, the number of 3D spatial points falling into the cell may be determined. A 3D map of the environment may be generated by determining, for each i-th cell, whether a number of 3D spatial points falling within the i-th cell is greater than a predetermined threshold value τ. Each i-th cell may have a binary state $C_i$. When the number of 3D spatial points falling within the i-th cell is greater than the predetermined threshold value τ, then $C_i=1$. When the number of 3D spatial points falling within the i-th cell is equal to or less than the predetermined threshold value τ, then $C_i=0$. The predetermined threshold value τ may be determined based on a sampling frequency of the captured images, and an accuracy of the 3D spatial point as obtained from the depth map. The predetermined threshold value τ may increase when the sampling frequency increases and when the number of 3D spatial points falling within the cell increases. The predetermined threshold value τ may decrease when the accuracy of the 3D spatial point increases. The predetermined threshold value τ may have a range of values. For example, the predetermined threshold value may range from about 5 to about 30. In some cases, the predetermined threshold value may range from less than 5 to more than 30.

As previously mentioned, ultrasonic data may be used to supplement the visual correlation to identify invalid pixel points. When a valid ultrasonic reading $d_s$ is detected, the state $C_i$ of all cells having a distance of &within the sonar range may be set to 1.

Figure 5:
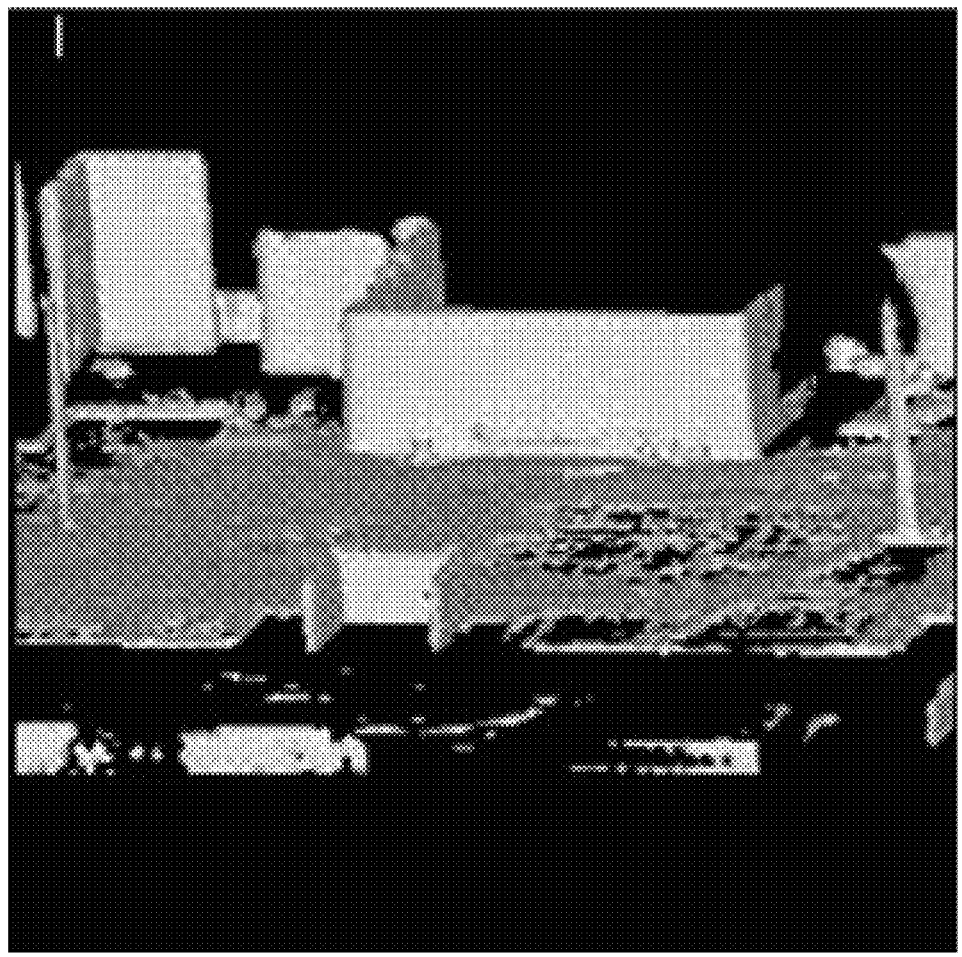
FIG. 5 shows an example of an occupancy grid in accordance with some embodiments.

FIG. 5 shows an example of an occupancy grid. Although cells are not shown, it may be understood that the occupancy grid may include i number of cells, and that the cells may be arranged in a 3D configuration. Each i-th cell may have a binary state $C_i$ (0 or 1). As such, the occupancy grid may include regions with two different grayscale levels. A cell state of 0 may be represented by a grayscale value of 255, and a cell state of 1 may be represented by a grayscale value that is substantially less than 255, in order to distinguish the different cells.

As shown in FIG. 4, the path may be generated based on the 3D map. For example, the path may be generated based on the 3D map, a current position of the movable object, and a position of the target. The path may be generated by taking into account obstacles surrounding the movable object, or that lie between the movable object and the target, or that lie in the vicinity of the movable object and/or the target. For example, the flight controller may be configured to generate a path passing through passable (open) space within the 3D map.

In some embodiments, the path may be generated using a Rapidly-Exploring Random Tree (RRT) algorithm. The RRT algorithm may include connecting a plurality of lines in X, Y, and Z directions (or other directions) between the current position of the movable object and the position of the target, and applying a polynomial smooth process to the plurality of lines to generate the path. The smoothening of the lines in each direction (X, Y, or Z) may be independently processed of the other directions. The RRT algorithm may further include discretizing the path into a plurality of control points. The movable object may be configured to move from one point to the next point along the path.

For the smoothening of the lines in each direction (X, Y, or Z), a number of n-order polynomials may be resolved to ensure that the location, velocity and acceleration are continuous at the starting point and ending point of the path, by taking the following known values: (1) the location of starting point, (2) the location of ending point, (3) the velocity, and (4) the acceleration. For example, in the X direction, the location, the velocity and the acceleration at the starting point are known values corresponding to $x_0$, $\dot{x}_0$, $\ddot{x}_0$ respectively at time t=0. The location, the velocity and the acceleration at the ending point are known values corresponding to $x_1$, $\dot{x}_1$, $\ddot{x}_1$ respectively at time t=T. T is the time that the movable object takes to travel from the starting point to the ending point, and is an adjustable parameter. A smaller T results a sharper curve in the path, and a larger T results in a more gradual curve. The following $5^{th}$-order polynomial equation may be solved:

$$x(t)=a_5 t^5+a_4 t^4+a_3 t^3+a_2 t^2+a_1 t+a_0$$

to obtain a time series of control points in the X direction. A similar method may be applied to each of the Y direction and the Z direction.

Figure 6:
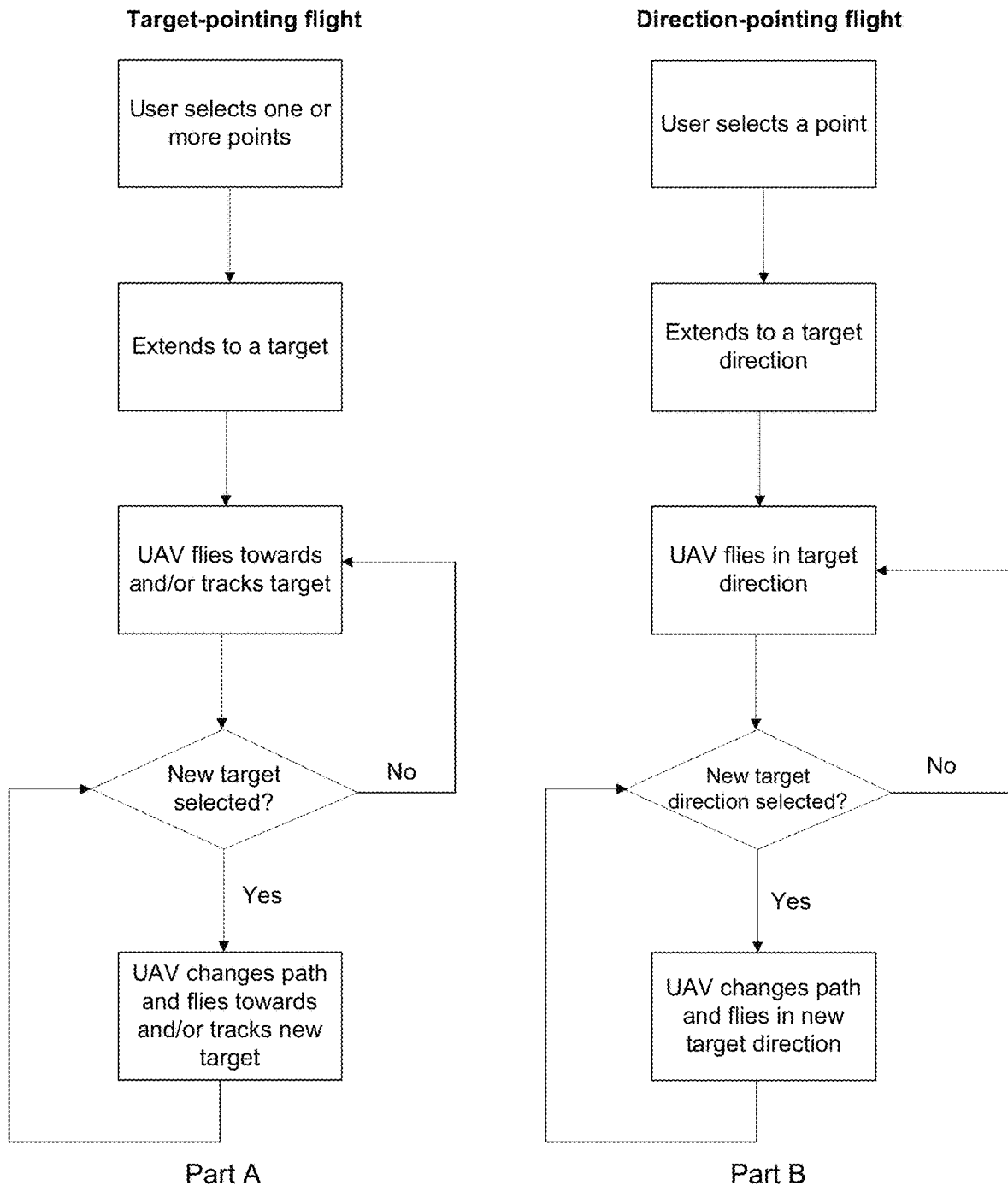
FIG. 6 illustrates flowcharts of different flight modes in which a UAV can operate, in accordance with some embodiments.

FIG. 6 illustrates flowcharts of different flight modes in which a movable object (such as a UAV) can operate, in accordance with some embodiments.

A method for controlling a UAV may be implemented using the system of FIG. 2. The method may include receiving, at the user terminal, an input indicative of a selected mode. For example, a user may select a mode from a plurality of modes. The plurality of modes may include at least a target mode ("target-pointing flight") and a directional mode ("direction-pointing flight"). The flight controller may effect movement of the UAV based on the selected mode. For example, the UAV may move towards and/or follow a selected target when the selected mode is the target mode. The UAV position and/or imaging device position may be adjusted when the selected mode is the target mode. The UAV may move in a selected direction when the selected mode is the directional mode. The target may be selected based on one or more selected points in at least one image that is captured by the movable object (for example, an imaging device carried by the movable object). The different modes may be selected one at a time. Optionally the different modes may be selectable simultaneously. The modes may be selected via a user input. Optionally the modes may be selected based on the external environment, the locations of the UAV and a target, and/or a direction.

Part A of FIG. 6 shows a flowchart of a method for implementing target-pointing flight. A user may select one or more points on an image. The image may be provided in a GUI rendered on the output device of the user terminal. When the user selects the one or more points, the selection may extend to a target associated with that point. In some cases, the selection may extend to a portion of the target. The point may be located on or proximate to the target in the image. The UAV may then fly towards and/or track the target. For example, the UAV may fly to a predetermined distance, position, and/or orientation relative to the target. In some instances, the UAV may track the target by following it at the predetermined distance, position, and/or orientation. The UAV may continue to move towards the target, track the target, or hover at the predetermined distance, position, and/or orientation to the target, until a new target instruction is received at the user terminal. A new target instruction may be received when the user selects another different one or more points on the image. When the user selects the different one or more points, the target selection may switch from the original target to a new target that is associated with the new one or more points. The UAV may then change its flight path and fly towards and/or track the new target.

Part B of FIG. 6 shows a flowchart of a method for implementing direction-pointing flight. A user may select a point on an image. The image may be provided in a GUI rendered on the output device of the user terminal. When the user selects the point, the selection may extend to a target direction associated with that point. The UAV may then fly in the direction. The UAV may continue to move in the direction until a countermanding condition is detected. For instance, the UAV may fly in the target direction until a new target direction instruction is received at the user terminal. A new target direction instruction may be received when the user selects another different point on the image. When the user selects a different point, the target direction selection may switch from the original direction to a new target direction that is associated with the new point. The UAV may then change its flight path and fly in the new target direction.

In some embodiments, the image analyzer may further determine whether the target is stationary or moving based on a plurality of captured images. The target mode may comprise a fly-to mode and a tracking mode. The UAV may be configured to fly towards the target when the UAV is in the fly-to mode. The UAV may be configured to track the target when the UAV is in the tracking mode. When in the tracking mode, the UAV may maintain a predetermined distance to the target or maintain the target in its field of view, and may or may not fly towards the target.

The motion state of the target may determine which mode of the target mode will be selected. For example, the fly-to mode may be selected when the target is determined to be stationary. The fly-to mode may be selected when a relatively direct path exists between the UAV and the target. When the relatively direct path exists, the UAV may be configured to move in a substantially straight line along the path. In some cases, the path may be established by a clear line of sight between the UAV and the target.

The fly-to mode may also be selected when no obstacles are determined to be present as the UAV is moving towards the selected target. In some cases, the fly-to mode may be selected when fewer than a predetermined number and/or type of obstacles are determined to be present as the UAV is moving towards the selected target.

The UAV may be configured to move towards the stationary target when the selected mode is the fly-to mode. The UAV may be configured to move to a predetermined distance from the stationary target. In some cases, one or more motion characteristics of the UAV may be adjusted when the UAV is moving towards the stationary object. The one or more motion characteristics of the UAV may be adjusted when one or more obstacles appear in a path between the UAV and the stationary target.

As described above, the motion state of the target may determine which mode of the target mode will be selected. For example, the tracking mode may be selected when the target is determined to be moving. The tracking mode may be selected when a relatively complicated flight path exists between the UAV and the target. The complicated flight path may require the movable object to move in a zigzag manner, in different directions, and/or at different altitudes along the path. In such cases, a clear line of sight may often be absent between the movable object and the target.

In some embodiments, the tracking mode may be selected when at least one obstacle is determined to be present as the UAV is moving towards the selected target. The tracking mode may be selected when greater than a predetermined number and/or type of obstacles are determined to be present as the UAV is moving towards the selected target.

The UAV may be configured to follow the moving target when the selected mode is the tracking mode. The UAV may be configured to follow the moving target at a predetermined distance. In some cases, one or more motion characteristics of the UAV may be adjusted when the UAV is following the moving target. The one or more motion characteristics of the UAV may be adjusted when one or more obstacles appear in a path between the UAV and the moving target.

In some embodiments, the flight controller and/or the user terminal may automatically toggle/switch between the fly-to mode or the tracking mode based on whether the target is determined to be stationary or moving. In some cases, automatically toggling/switching between the fly-to mode or the tracking mode may take place depending on a number and/or type of obstacles that are present as the UAV is moving towards the selected target. For example, the selected mode may be switched to the fly-to mode when no obstacles are determined to be present as the UAV is moving towards the selected target. The selected mode may be switched to the fly-to mode when fewer than a predetermined number and/or type of obstacles are determined to be present as the UAV is moving towards the selected target. In some cases, the selected mode may be switched to the tracking mode when at least one obstacle is determined to be present as the UAV is moving towards the selected target. In other cases, the selected mode may be switched to the tracking mode when greater than a predetermined number and/or type of obstacles are determined to be present as the UAV is moving towards the selected target.

In some embodiments, the target mode may encompass simultaneous operation of the both the fly-to mode and the tracking mode. For example, the UAV may be configured to fly to the target while simultaneously tracking the target. The UAV may also track the target regardless of the motion state of the target (e.g., regardless whether the target is stationary or moving).

As previously mentioned, the UAV may be configured to move in a selected direction when the selected mode is the directional mode. The direction may be selected based on one or more selected points in at least one image that is captured by the movable object (for example, an imaging device carried by the movable object).

In some cases, one or more motion characteristics of the UAV may be adjusted when the UAV is moving in the selected direction. For example, the one or more motion characteristics of the UAV may be adjusted when one or more obstacles appear in the selected direction that the UAV is moving.

The UAV may be configured to switch course from one direction to another direction depending on which point in the image is being selected. The UAV may be configured to move in a first direction when a first point is selected, and to move in a second direction when a second point selected. The selection of the second point may replace the selection of the first point. The first point and the second point are located at different portions of the image. The second direction may be different from the first direction. An attitude and/or orientation of the UAV may be changed when the UAV is switching course from one direction to another direction.

In some embodiments, the flight controller may be configured to generate a transition path that allows the UAV to switch course from one direction to another direction in a curvilinear manner. Switching course in the curvilinear manner may provide certain benefits, such as reduction in power consumption of the UAV and/or improvement in flight stability of the UAV.

The UAV may be configured to move in a path when the selected mode is either in the target mode or the directional mode. In some cases, the flight controller may generate a detour from the path when one or more obstacles are detected in the path. The one or more obstacles may be stationary, capable of movement, or in motion. The UAV may be configured to automatically avoid the one or more obstacles by moving along the detour. The detour may exit the path at a first point and rejoin the path at a second point. In some instances, the original flight path may be substantially replaced by the detour. The detour may be shaped around, above, and/or underneath the one or more obstacles. The detour may be in a lateral and/or vertical direction, or any direction in 3-dimensional space. The detour may be a straight line, a curve, curvilinear path, or any combination thereof. In some embodiments, an orientation of the UAV and/or an imaging device located thereon may be changed during the detour, such that the target remains in a field-of-view of the imaging device.

Figure 7:
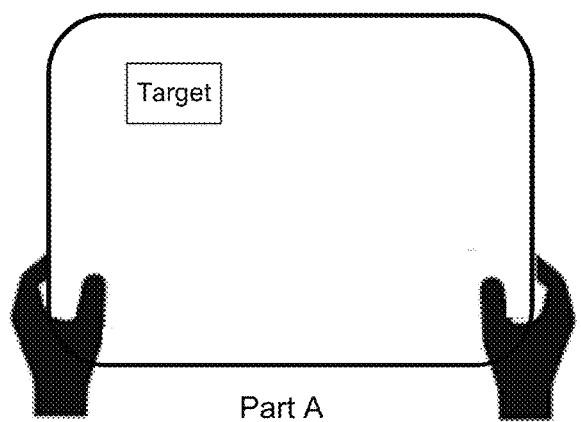
FIG. 7 shows an example of a user interface (UI) through which a user may select a target and cause the UAV to move towards the target, in accordance with some embodiments.
Figure 7:
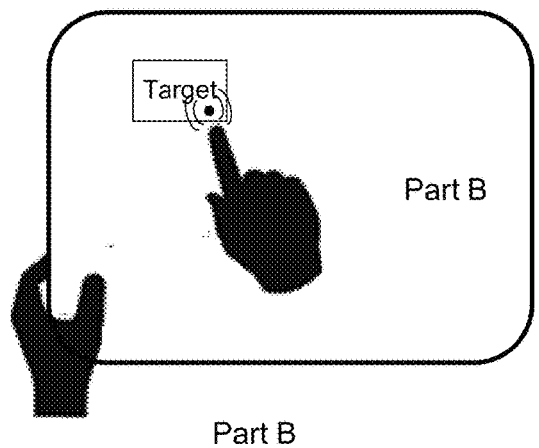
Figure 7:
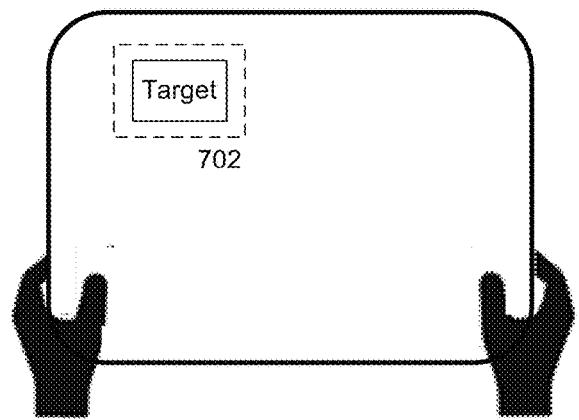
Figure 7:
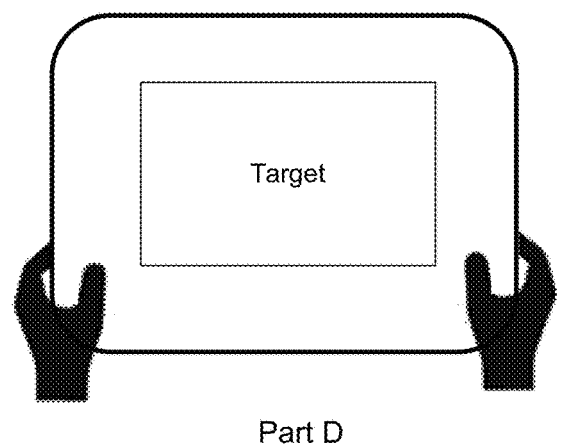

FIG. 7 shows an example of a user interface (UI) through which a user may select a target and cause the UAV to move towards the target. Part A shows an initial display of an environment comprising the target. Part B shows a user selecting the target within the initial display. Part C shows a box indicating the selected target. Part D shows an image of the target after the UAV has moved towards the target and is at a distance from the target.

Part A shows an initial display of an environment comprising the target. A FPV may be provided as illustrated. The FPV may include a live streaming image from an imaging device. The imaging device may be a payload of the UAV. The imaging device may be mounted on a body of the UAV. In some instances, the imaging device may be located remotely from the UAV at a different location. In some instances, the imaging may be located on another UAV. The FPV may alternatively be a graphical depiction or representation of the image from the imaging device. The target lies within the field of view of the imaging device. In some cases, the target may be a stand-alone object. In other cases, the target may be surrounded by or proximate to one or more other objects. The target may be stationary and/or capable of movement. The UAV may be stationary or moving while the initial display of the environment is occurring.

While a FPV is illustrated, other types of views may be presented in alternative or in conjunction with the FPV. For instance, in some embodiments, a map view may be provided. The map view may include a 2D map, such as an overhead map. The map view may include a 3D map. The 3D map may be alterable to view the 3D environment from various angles. Solid renderings, wireframes, or other types of imaging may be shown, as described previously herein.

The display may be shown on a user terminal. The user may optionally hold the user terminal. The user may interact with the display by selecting different points or objects in the FPV.

Part B shows a user selecting a target within the initial display. The user may select a portion of the image to select the target. The image may include a FPV and/or a map. The map may be a 2D map or a 3D map. The image optionally include a plurality of FPVs. The user may select a portion of the FPV or the map to select the target. The portion of the image selected by the user may optionally be a point. The point may be located on the target as shown on the display. In some embodiments, the point may be located proximate to the target as shown on the display. The target may be automatically selected when the user selects the point. In some cases, the target may be marked using one or more types of marking schemes (e.g., shading, coloring, highlighted, etc.) to indicate that the target has been selected. In some cases, a pop-up window may appear at the target on the display requesting confirmation from the user whether the user wishes to select the target. In some embodiments, a plurality of bounding boxes may be generated in the vicinity of the selected point. Each bounding box may be associated with a different target. A user may be presented with the option to select a target by selecting the respective bounding box. In some instances, a user may select more than one target. In those instances, the UAV may be configured to fly first to a nearer target and then to a target that is further away.

The target may be identified from a 2D image or a 3D map.

Identification of a target from a 3D map may be based on spatial information of objects/features obtained from, for example the 3D map described in FIG. 4 and/or an occupancy grid similar to that shown in FIG. 5.

Identification of a target by selecting a point on the image may be performed using a category-independent segmentation algorithm. For example, when a user selects a point on or in the vicinity of the target on the image, the target may be segmented from adjacent or surrounding objects. The segmentation may proceed without knowing which object category the target may fall into. In some cases, the segmentation algorithm may generate a plurality of seed regions in the image(s) and ranks each region, such that top-ranked regions are likely to be good segmentations of different objects (i.e., correspond to different objects).

In some cases, the target may be selected based on moving target detection. In those instances, the UAV and the surrounding environment are assumed to be static/stationary, and the target to be tracked may be the only moving object in the image. The target can be identified and selected through background subtraction.

Identification of a target from a 2D image may be based on feature point recognition. A feature point can be a portion of an image (e.g., an edge, corner, interest point, blob, ridge, etc.) that is uniquely distinguishable from the remaining portions of the image and/or other feature points in the image. Optionally, a feature point may be relatively invariant to transformations of the imaged object (e.g., translation, rotation, scaling) and/or changes in the characteristics of the image (e.g., brightness, exposure). A feature point may be detected in portions of an image that is rich in terms of informational content (e.g., significant 2D texture). A feature point may be detected in portions of an image that are stable under perturbations (e.g., when varying illumination and brightness of an image).

Feature points can be detected using various algorithms (e.g., texture detection algorithm) which may extract one or more feature points from image data. The algorithms may additionally make various calculations regarding the feature points. For example, the algorithms may calculate a total number of feature points, or "feature point number." The algorithms may also calculate a distribution of feature points. For example, the feature points may be widely distributed within an image (e.g., image data) or a subsection of the image. For example, the feature points may be narrowly distributed within an image (e.g., image data) or a subsection of the image. The algorithms may also calculate a quality of the feature points. In some instances, the quality of feature points may be determined or evaluated based on a value calculated by algorithms mentioned herein (e.g., FAST, Corner detector, Harris, etc).

The algorithm may be an edge detection algorithm, a corner detection algorithm, a blob detection algorithm, or a ridge detection algorithm. In some embodiments, the corner detection algorithm may be a "Features from accelerated segment test" (FAST). In some embodiments, the feature detector may extract feature points and make calculations regarding feature points using FAST. In some embodiments, the feature detector can be a Canny edge detector, Sobel operator, Harris & Stephens/Plessy/Shi-Tomasi corner detection algorithm, the SUSAN corner detector, Level curve curvature approach, Laplacian of Gaussian, Difference of Gaussians, Determinant of Hessian, MSER, PCBR, or Grey-level blobs, ORB, FREAK, or suitable combinations thereof.

In some embodiments, a feature point may comprise one or more non-salient features. As used herein, non-salient features may refer to non-salient regions or non-distinct (e.g., non-recognizable) objects within an image. Non-salient features may refer to elements within an image that are unlikely to stand out or catch attention of a human observer. Examples of non-salient features may include individual pixels or groups of pixels that are non-distinct or non-identifiable to a viewer, when viewed outside of the context of their surrounding pixels.

In some alternative embodiments, a feature point may comprise one or more salient features. Salient features may refer to salient regions or distinct (e.g., recognizable) objects within an image. As used herein, salient features may refer to salient regions or distinct (e.g., recognizable) objects within an image. Salient features may refer to elements within an image that are likely to stand out or catch attention of a human observer. A salient feature may have semantic meaning. Salient features may refer to elements that may be identified consistently under computer vision processes. A salient feature may refer to animate objects, inanimate objects, landmarks, marks, logos, obstacles, and the like within an image. A salient feature may be persistently observed under differing conditions. For example, a salient feature may be persistently identified (e.g., by a human observer or by computer programs) in images acquired from different points of view, during different times of the day, under different lighting conditions, under different weather conditions, under different image acquisition settings (e.g., different gain, exposure, etc), and the like. For example, salient features may include humans, animals, faces, bodies, structures, buildings, vehicles, planes, signs, and the like.

Salient features may be identified or determined using any existing saliency calculating methods. For example, salient features may be identified by contrast based filtering (e.g., color, intensity, orientation, size, motion, depth based, etc), using a spectral residual approach, via frequency-tuned salient region detection, via a binarized normed gradients for objectness estimation, using a context-aware top down approach, by measuring visual saliency by site entropy rate, and the like. For example, salient features may be identified in a saliency map that is generated by subjecting one or more images to contrast based filtering (e.g., color, intensity, orientation, etc). A saliency map may represent areas with feature contrasts. A saliency map may be a predictor where people will look. A saliency map may comprise a spatial heat map representation of features or fixations. For example, in a saliency map, salient regions may have a higher luminance contrast, color contrast, edge content, intensities, etc than non-salient regions. In some embodiments, salient features may be identified using object recognition algorithms (e.g., feature based methods, appearance based methods, etc). Optionally, one or more objects or types of patterns, objects, figures, colors, logos, outlines, etc may be pre-stored as possible salient features. An image may be analyzed to identify salient features that are pre-stored (e.g., an object or types of objects). The pre-stored salient features may be updated. Alternatively, salient features may not need to be pre-stored. Salient features may be recognized on a real time basis independent to pre-stored information.

The precision to which the user may specify a point may be on the order of 0.01 degrees or less, 0.05 degrees or less, 0.1 degrees or less, 0.5 degrees or less, 1 degree or less 2 degrees or less, 3 degrees or less, 5 degrees or less, 7 degrees or less, 10 degrees or less, 15 degrees or less, 20 degrees or less, or 30 degrees or less.

The UAV may travel towards the target that is indicated by the selected point. A flight path for the UAV may be defined from the current location of the UAV to the location of the target. The flight path may be denoted by a vector between the current location of the UAV to the location of the target.

When a user selects a portion of the image to specify a target, a flight path to the selected target may or may not be visually indicated on the screen. For instance, a visual marker may be provided within the image indicative of the flight path to the target object. The visual marker may be a point, region, icon, line, or vector. For instance, the line or vector may be indicative of a direction of the flight path towards the target. In another example, the line or vector may be indicative of the direction that the UAV is heading.

In some embodiments, a user may specify that the UAV is in a target mode. When the UAV is in a target mode, the portion of the image selected by the user may determine the target towards which the UAV will travel until it encounters obstacles, or when another different target is selected, or when the UAV encounters flight restrictions. The UAV may travel towards the target object until it encounters a stop or change criteria, such as a target change, flight restriction, flight mode change, low power supply or obstacle. The user may specify that the UAV is in a target mode by selecting the target mode from one or more available modes, such as a directional mode as previously mentioned.

Any other user interface tools or techniques may be provided that may allow a user to specify a target object using the user interface.

After the target has been selected, a marking or identification scheme may be used in the display to indicate that the target has been selected. For example, part C of FIG. 7 shows a box 702 surrounding the selected target on the display. The box may be in any shape, for example an n-sided polygon where n may be any integer greater than 2. In FIG. 7, the box is a 4-sided polygon (quadrilateral-shaped). The box may serve as a visual indicator to the user, to distinguish the selected target from adjacent objects. In some embodiments, a prompt window (not shown) may appear in or near the box, requesting confirmation from the user on whether the selected target corresponds to an intended target of the user. A user may confirm the selected target by clicking on the box.

Part D of FIG. 7 shows an image of the target object after the UAV has moved towards the target. For instance, from a FPV, when a UAV is traveling towards the target, an object that was once further away may become closer up. From a map view, a distance between the UAV and the target is reduced after the UAV has moved closer towards the target.

The UAV may move towards the target until it is offset from the target by a predetermined distance. The predetermined distance may include a horizontal distance component and/or a vertical distance component. The UAV may stay at the predetermined distance from the target. In some cases, the UAV may remain outside of the predetermined distance to the target. The predetermined distance may be determined based on a size of the target and an initial distance from the UAV to the target. The predetermined distance may be automatically generated, or optionally adjustable by a user. For example, if a user desires to move the UAV closer to the target, the user may select (e.g., "click") the target in the image multiple times to adjust the predetermined distance. Adjustment of the distance may optionally depend on a length of time which the user selects (e.g., touches) the target in the image. In some embodiments, the predetermined distance may be dynamically calculated based on factors such as a size of the target and an initial distance of the UAV from the target.

A user may control flight of the UAV by interacting with the GUI of the display in a number of different configurations. For example, when a user selects a point on the target in the image, the UAV may fly towards the target. Optionally, when the user selects a point located below the target in the image, the UAV may fly backward along its original flight path and away from the target. Alternatively, selecting a point above the target in the image may cause the UAV to fly forward. In some cases, double-clicking (or touching) the target in the image multiple times may cause the UAV to fly closer to the target. It is noted that any form of interaction of the user with the user terminal/output device to control various functions of the UAV flight may be contemplated.

In some instances, when a user specifies a target, the UAV may travel towards the target at a fixed velocity or a variable velocity. A standard target travel velocity may be provided. A variable target travel velocity may also be provided. Alternatively, the user may specify the velocity and/or acceleration at which the UAV may be traveling towards the target. Any description herein of affecting the velocity of the UAV may also apply to affecting acceleration of the UAV when moving towards the target. In some instances, the user may affect the velocity at the same time at which the user is specifying the target. For instance, when a user selects a target, the number of clicks or touches that a user touches the target may affect the velocity of the UAV. For instance, if a user touches a point indicative of a target a single time, the UAV may travel at a first velocity, and if the user touches the point multiple times, the UAV may travel at a second velocity. The second velocity may be greater than the first velocity. The velocity of the UAV travel may correspond to the number of touches or selections of the point indicative of the target. A positive proportional relationship may be provided between the number of selections and the velocity of the UAV. In some instances, a linear relationship may be provided between the number of selections and the velocity of the UAV. For instance, if a user clicks on the point/target N times, the velocity of the UAV may be X+N*Y, where X is a velocity value, Y is a velocity multiplier, and N is the number of times the target was selected. Any other mathematical relation may be provided. The user may make a selection a first time to get a first velocity, and then make the selection again to speed up the UAV. The user may keep making the selection to keep speeding up the UAV.

In another example, when a user selects a target, a length of time associated with the selection of the target may affect the velocity of the UAV. For instance, if a user touches a point indicative of a target for a first period of time, the UAV may travel at a first velocity, and if the user touches for a second period of time greater than the first period of time, the UAV may travel a second velocity. The second velocity may be greater than the first velocity. The velocity of the UAV travel may correspond to the length of the touch or selection of the point indicative of the target. A positive proportional relationship may be provided between the length of the selection and the velocity of the UAV. In some instances, a linear relationship may be provided between the length of the selection and the velocity of the UAV.

Various other types of user interactions may affect the velocity of the UAV traveling towards the target. In some examples, swiping motions (e.g., speed of swipe, length of swipes, number of swipes) may affect the velocity of the UAV. In other examples, different regions may be touched to affect the velocity of the UAV. In another example, a separate control may be provided for velocity control. For instance, a user may adjust a velocity using a manual control while the UAV is traveling towards the target. The velocity may be adjusted in accordance with the manual control in real-time. In another example, a user may enter a numerical value for the desired velocity, or select the velocity from a plurality of pre-selected options.

Figure 8:
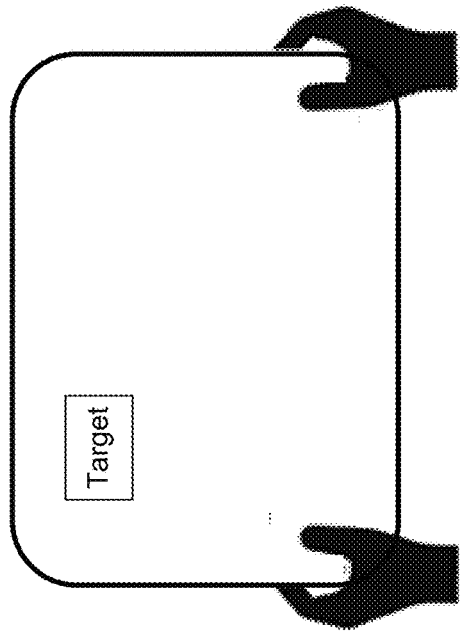
FIG. 8 shows an example of a user interface (UI) through which a user may select a target by selecting different points and cause the UAV to move towards the target, in accordance with some embodiments.
Figure 8:
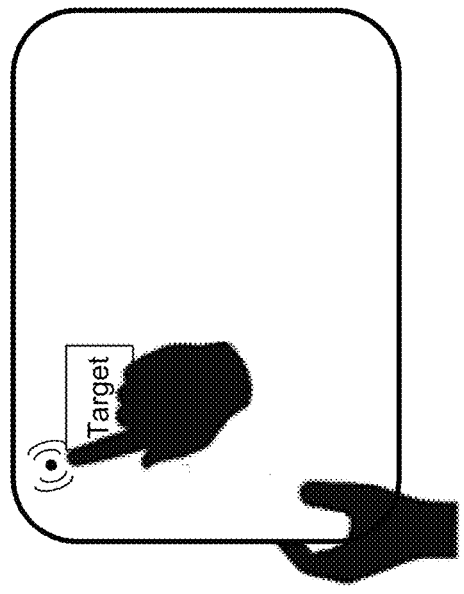
Figure 8:
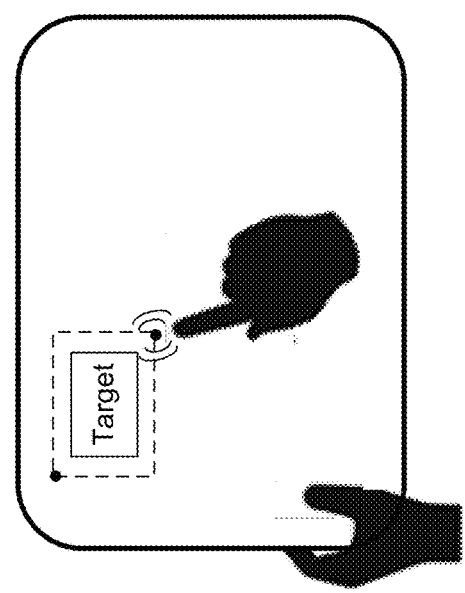
Figure 8:
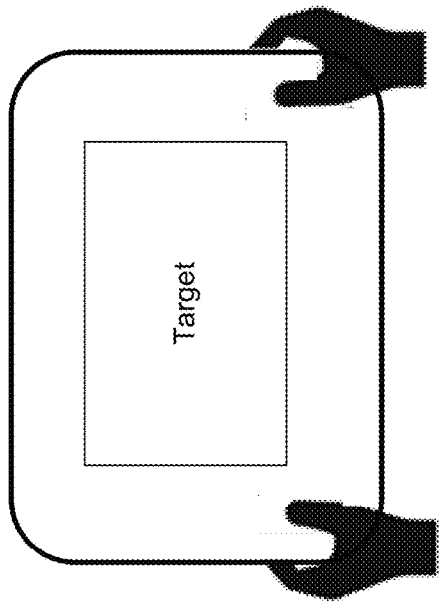

FIG. 8 shows an example of a user interface (UI) through which a user may select a target by selecting different points and cause the UAV to move towards the target. FIG. 8 is similar to FIG. 7 except for the following difference. In FIG. 8, a user may select a target by touching a plurality of points on the image to generate a box containing the target. Part A shows an initial display of an environment comprising the target. Part B shows a user selecting a first point proximate to the target within the initial display. Part C shows a user selecting a second point proximate to the target within the initial display. Part D shows an image of the target after the UAV has moved towards the target and is at a distance from the target.

Referring to parts B and C of FIG. 8, when the user touches the first point and the second point on the image, a box may be generated to contain the target therein. The box may be in any shape, for example an n-sided polygon where n may be any integer greater than 2. In FIG. 8, the box is a 4-sided polygon (quadrilateral-shaped). The target may be selected when the target substantially lies within the box in the image.

Figure 9:
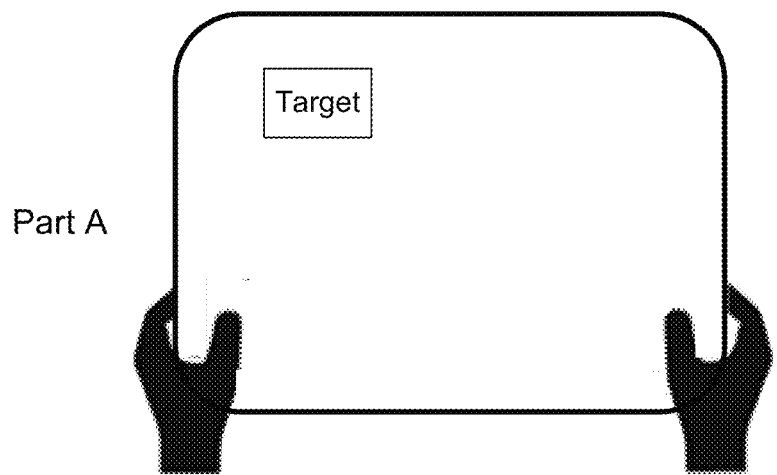
FIG. 9 shows an example of a user interface (UI) through which a user may select a target by drawing a shape around the target and cause the UAV to move towards the target, in accordance with some embodiments.
Figure 9:
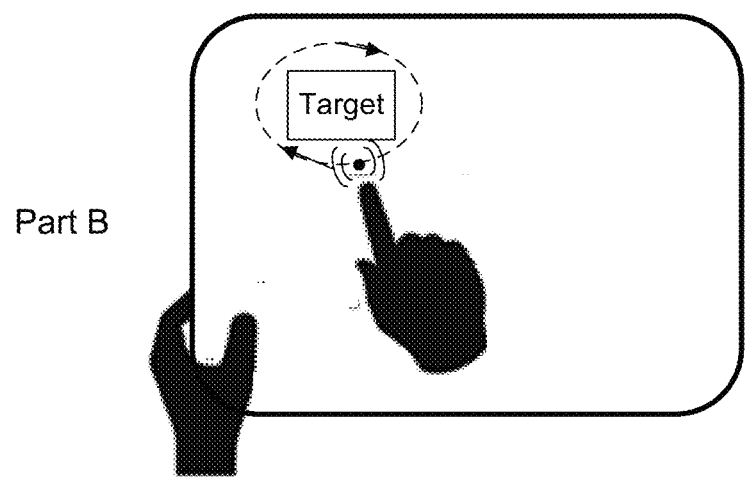
Figure 9:
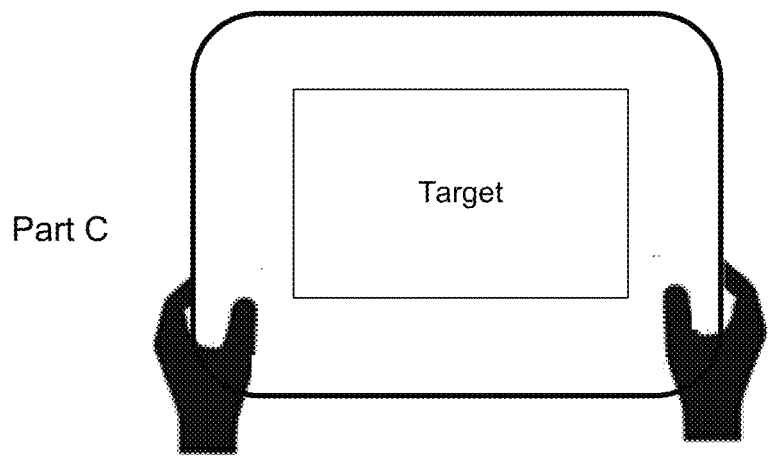

FIG. 9 shows an example of a user interface (UI) through which a user may select a target by drawing a shape around the target and cause the UAV to move towards the target. FIG. 9 is similar to FIG. 8 except for the following difference. In FIG. 9, a user may select a target by drawing a box around the target. Part A shows an initial display of an environment comprising the target. Part B shows a user drawing a box around the target within the initial display. Part C shows an image of the target after the UAV has moved towards the target and is at a distance from the target.

Referring to part B of FIG. 9, a user may draw a box around the target on the image by touching the display in a circular manner around the target. The box may contain the target therein. The box may be in any shape, for example an n-sided polygon, an ellipse, an irregular shape, etc. In FIG. 9, the box may be an ellipse. The target may be selected when the target substantially lies within the ellipse in the image. Alternatively the box may be generated when a user touches a point on or near the target on the image. The box may indicate that the target displayed therein has been selected.

Figure 10:
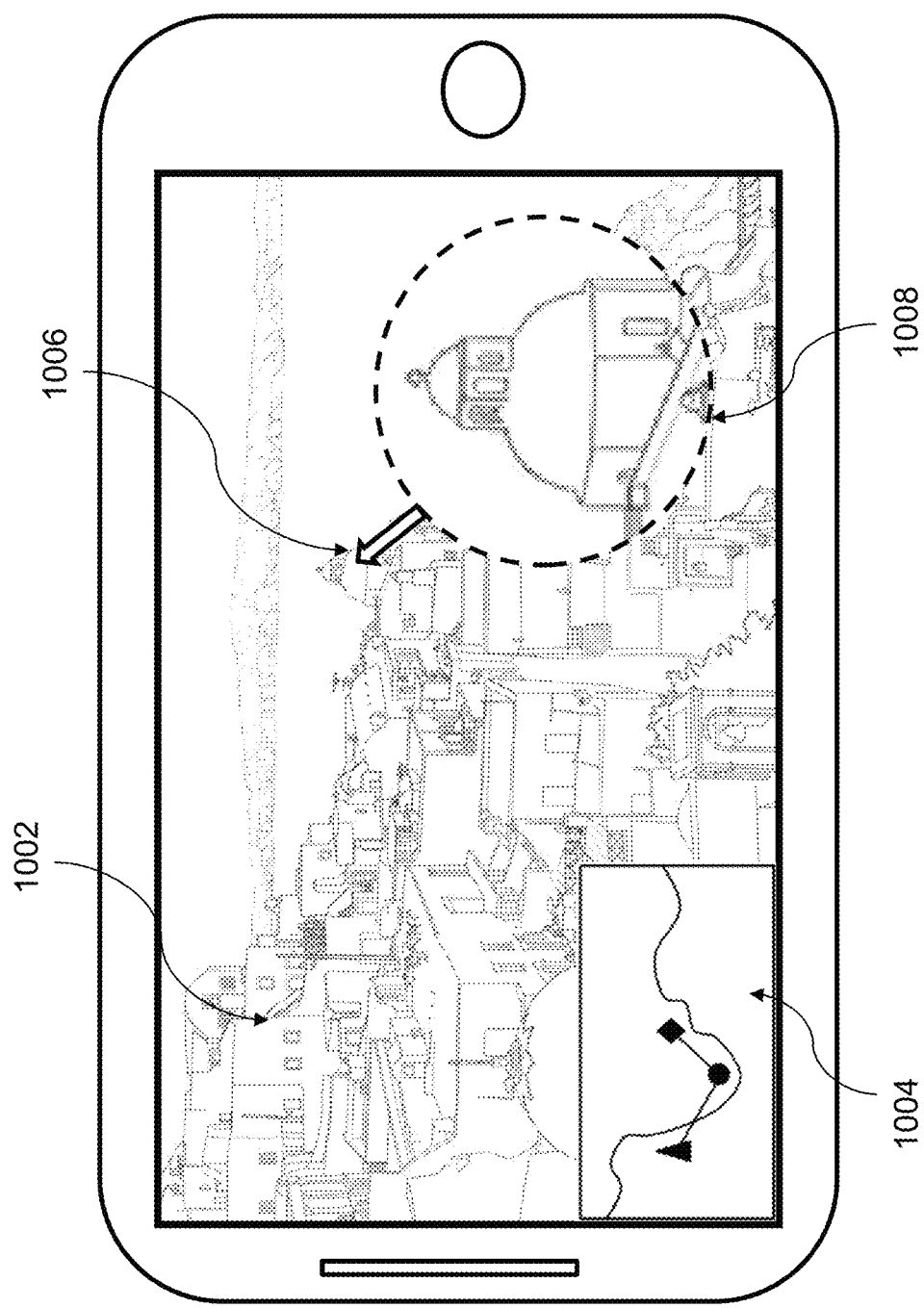
FIG. 10 shows an example of a user interface (UI) comprising a first person view (FPV) photographic/video image and a 2D map through which a user may select a target and cause the UAV to move towards the target, in accordance with some embodiments.

FIG. 10 shows an example of a user interface (UI) comprising a first person view (FPV) photographic/video image and a 2D map through which a user may select a target and cause the UAV to move towards the target. The UI may include a FPV 1002 substantially occupying the bulk of the display, and a 2D map 1004 (such as an overhead map) located on a portion (e.g., bottom left corner) of the display. The FPV may include an image captured by an imaging device on the UAV. A user may select a target by touching a point 1006 on the image. In some embodiments, a balloon 1008 may be generated to display a magnified view of the target. In FIG. 10, the target corresponds to a portion of a building, as shown in the balloon. In some embodiments, a user may further refine the target selection by selecting one or more points, or a region, within the balloon. For example, the user may click on a particular feature within the balloon.

Alternatively, the user may draw a shape to enclose a region within the balloon. Additionally, the user may zoom in or zoom out of the view that is displayed within the balloon. The user may also navigate in any direction within the view that is displayed within the balloon. In some embodiments, the user may move the balloon around within the image to display magnified views of different parts of the image. As the user is moving the balloon around within the image, the user may notice features or points of interest, and select those features or points of interest as the target. In some embodiments, a prompt window (not shown) may appear next to the selected point, requesting confirmation from the user on whether the selected point corresponds to an intended target of the user. Once the user confirms the target, the positions of the target and the UAV may be displayed in the 2D map 1004 on the bottom left corner of the display. The UAV may move towards the target. For example, the UAV may move towards the buildings shown in balloon 1008. The size of the image in the image increases as the UAV moves towards the target. The positions of the target and the UAV may also be updated in real-time on the 2D map. For example, as the UAV moves towards the target, a distance between the UAV and target on the 2D map starts to decrease. In some embodiments, a user may select the target from the balloon pre-flight (i.e., prior to operation of the UAV or when the UAV is hovering at a fixed point). Alternatively, in other embodiments, a user may refine the selection of the target during flight. In some cases, a user may select a new target by selecting a different point in the displayed image, e.g. from the balloon. Here, the displayed image may include more details about (and also around) the original target, when the UAV is flying towards and/or tracking the target. A user may refine his target selection based on the additional details about (and also around) the original target, when the UAV is flying towards and/or tracking the target. For example, the user may select a different point or select a different region to refine his target selection. When the target selection is refined, the UAV may modify its course slightly and fly towards and/or track the refined target. Additionally, a user may select an entirely new target by moving the balloon to another location on the image, during UAV flight. When a new target is selected, the UAV may change course and fly towards and/or track the new target.

Although an FPV is illustrated in FIG. 10, other types of views may be presented in alternative or in conjunction with the FPV. For instance, in some embodiments, the map view may include a 3D map instead of a 2D map. The 3D map may be alterable to view the 3D environment from various angles. In some embodiments, the 3D environment may comprise a plurality of virtual objects. The virtual objects may be graphical solid objects or graphical wireframes. The virtual objects may comprise points or objects that may be of interest to a user. Points or objects that may be of less interest to the user may be omitted from the 3D virtual environment to reduce object clutter and to more clearly delineate points/objects of interest. The reduced clutter makes it easier for the user to select or identify a desired point or object of interest from the 3D virtual environment.

Figure 11:
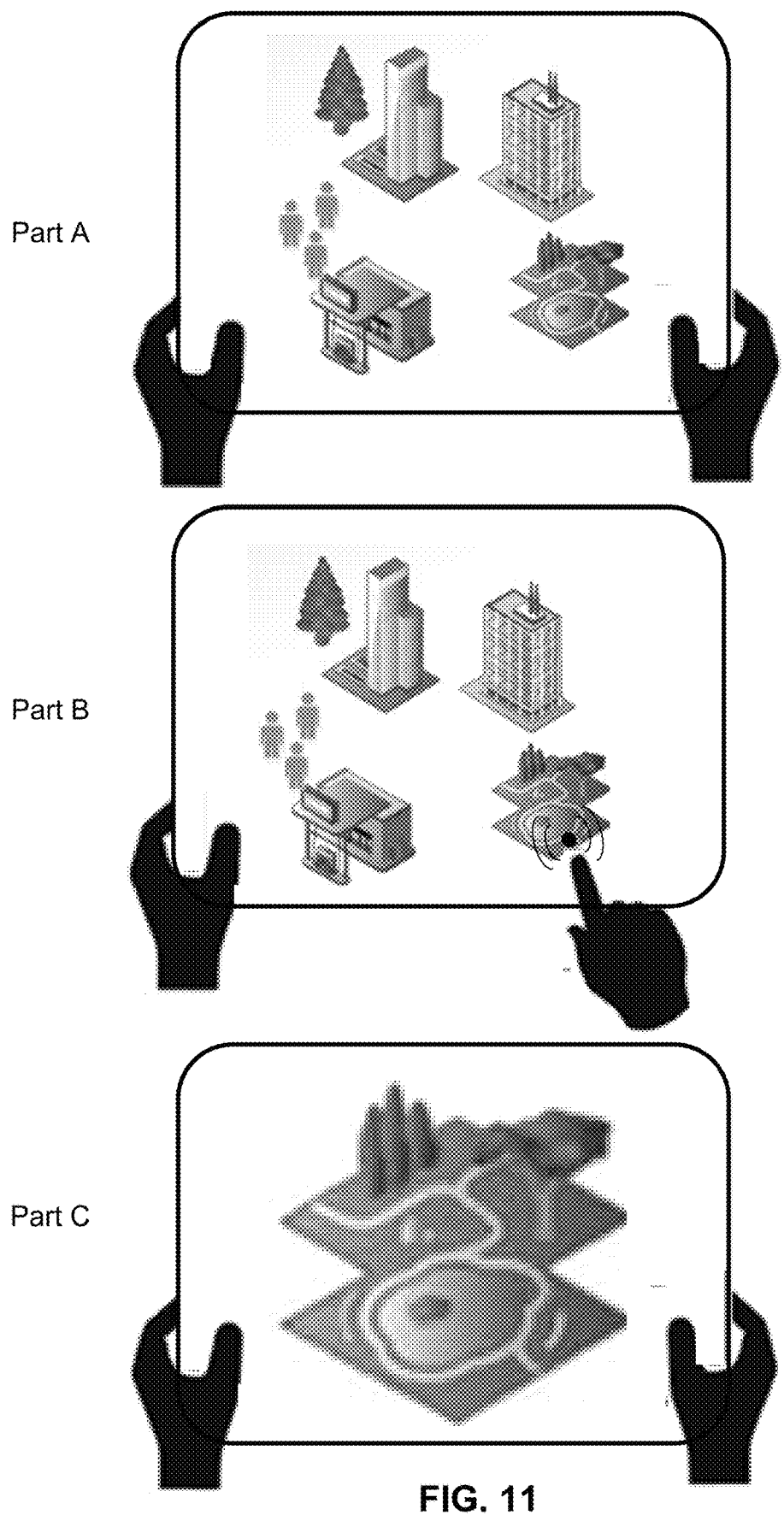
FIG. 11 shows an example of a user interface (UI) through which a user may select a target from among a plurality of objects and cause the UAV to move towards the target, in accordance with some embodiments.

FIG. 11 shows an example of a user interface (UI) through which a user may select a target and cause the UAV to move towards the target. Part A shows an initial display of an environment comprising a plurality of objects. The objects may comprise stationary objects (e.g., buildings, trees, golf course, gas station, etc.) and objects that are capable of movement (e.g., a group of people). Part B shows a user selecting the target within the initial display. Part C shows an image of the target after the UAV has moved towards the target and is at a distance from the target.

As shown in part B of FIG. 11, a user may select a point on the image. The point may be at or proximate to a golf course. Selection of the point may cause the golf course to be selected as the target. The UAV may move towards the golf course. As shown in part C, the size of the golf course has now increased since the UAV is now closer to the golf course (target).

Figure 12:
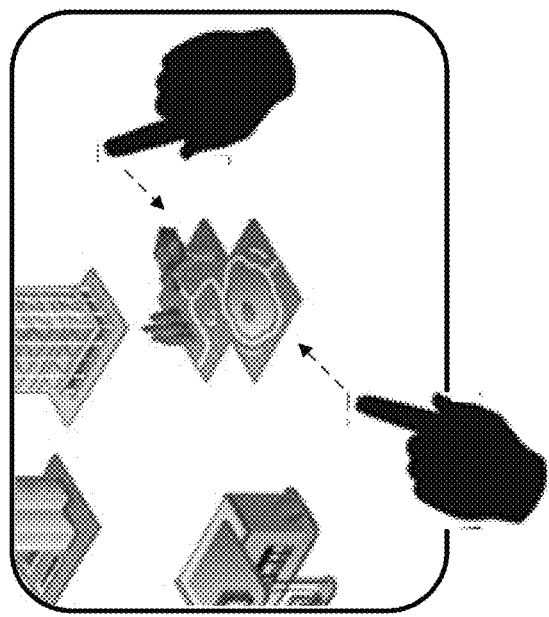
FIG. 12 shows an example of a user interface (UI) through which a user may select a new target and cause the UAV to move towards the new target, in accordance with some embodiments.
Figure 12:
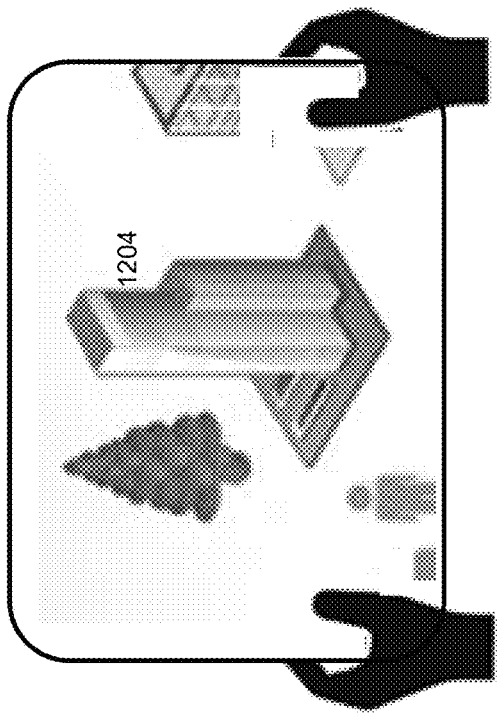
Figure 12:
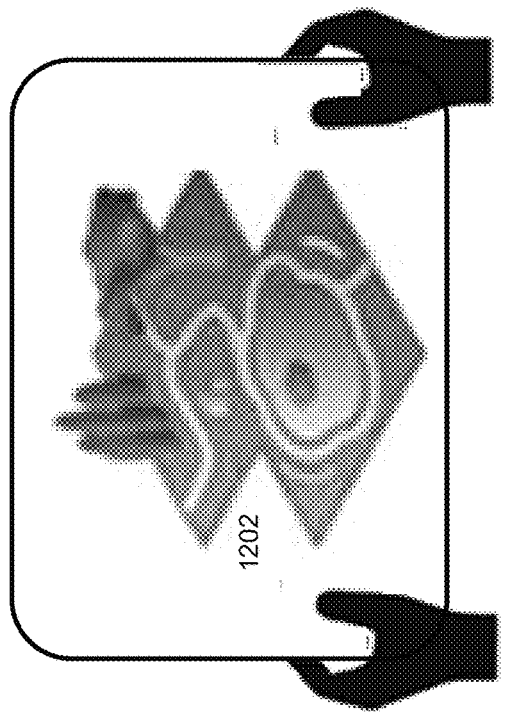
Figure 12:
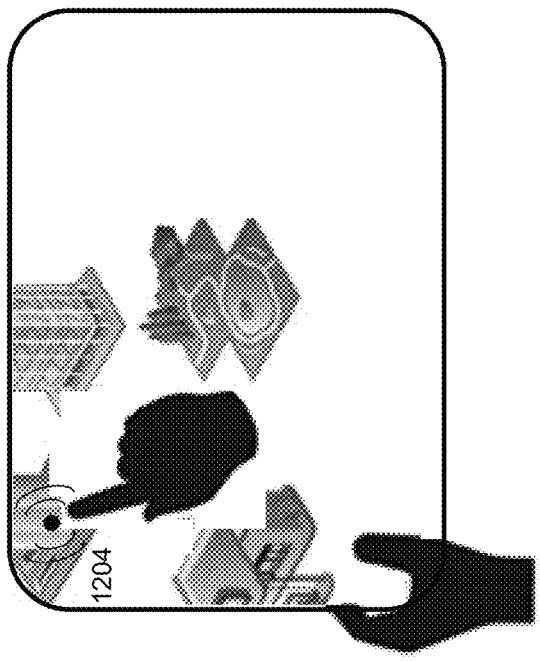

FIG. 12 shows an example of a user interface (UI) through which a user may select a new target and cause the UAV to move towards the new target. Part A of FIG. 12 shows an initial display corresponding to part C of FIG. 11. Part B shows a user manipulating the image to increase a field of view to generate an updated display. Part C shows a user selecting a new target within the updated display. Part D shows an image of the new target after the UAV has moved towards the new target and is at a distance from the new target.

Part A of FIG. 12 shows an image of a currently selected target 1202. In part B of FIG. 12, a user may increase a field-of-view by manipulating the image. For example, the user may perform a "pinching" motion on the touch display to increase the field of view, which allows more objects to be displayed in the image. In part C of FIG. 12, the user may select a new point in the updated display. The new point may be associated with a different target object 1204 (e.g., a building). Selection of the new point may cause the building to be selected as the new target 1204. The UAV may move towards the building. As shown in part D of FIG. 12, the size of the building has now increased since the UAV is now closer to the building (new target).

Figure 13:
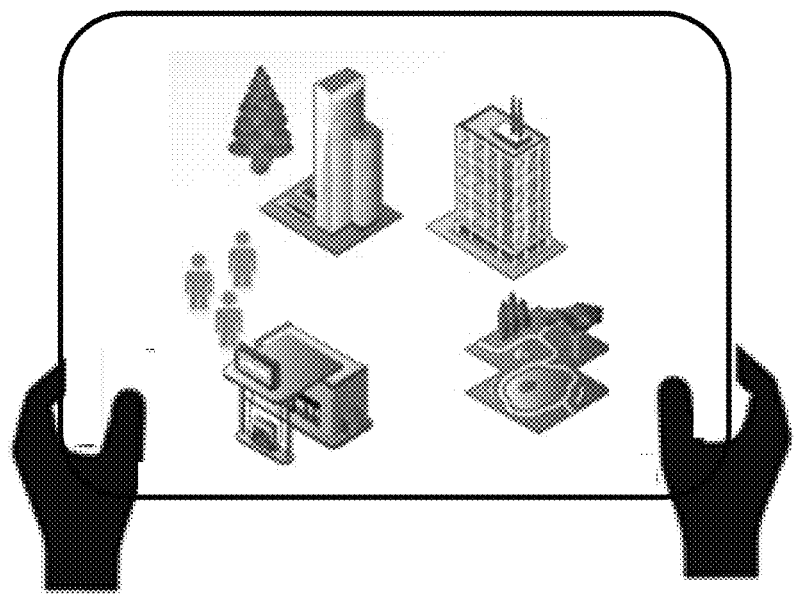
FIGS. 13 and 14 show an example of a user interface (UI) through which a user may select a moving target and cause the UAV to track the moving target, in accordance with some embodiments.
Figure 13:
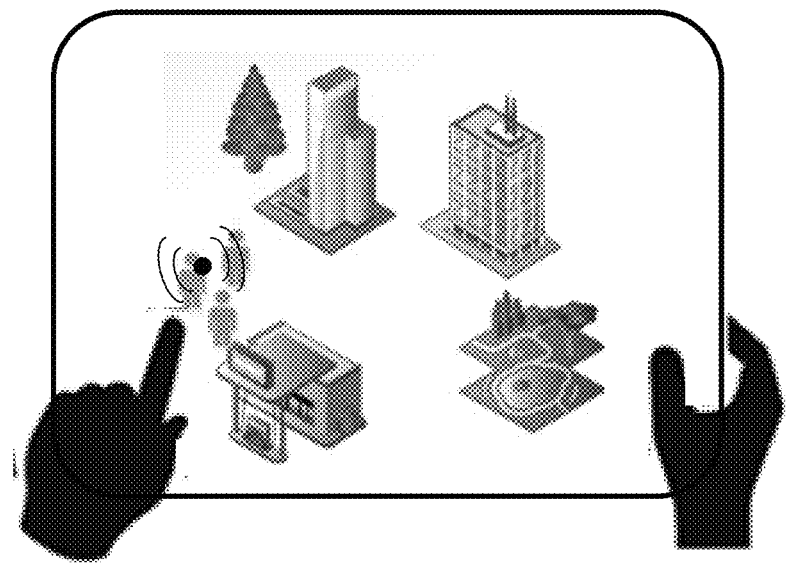
Figure 14:
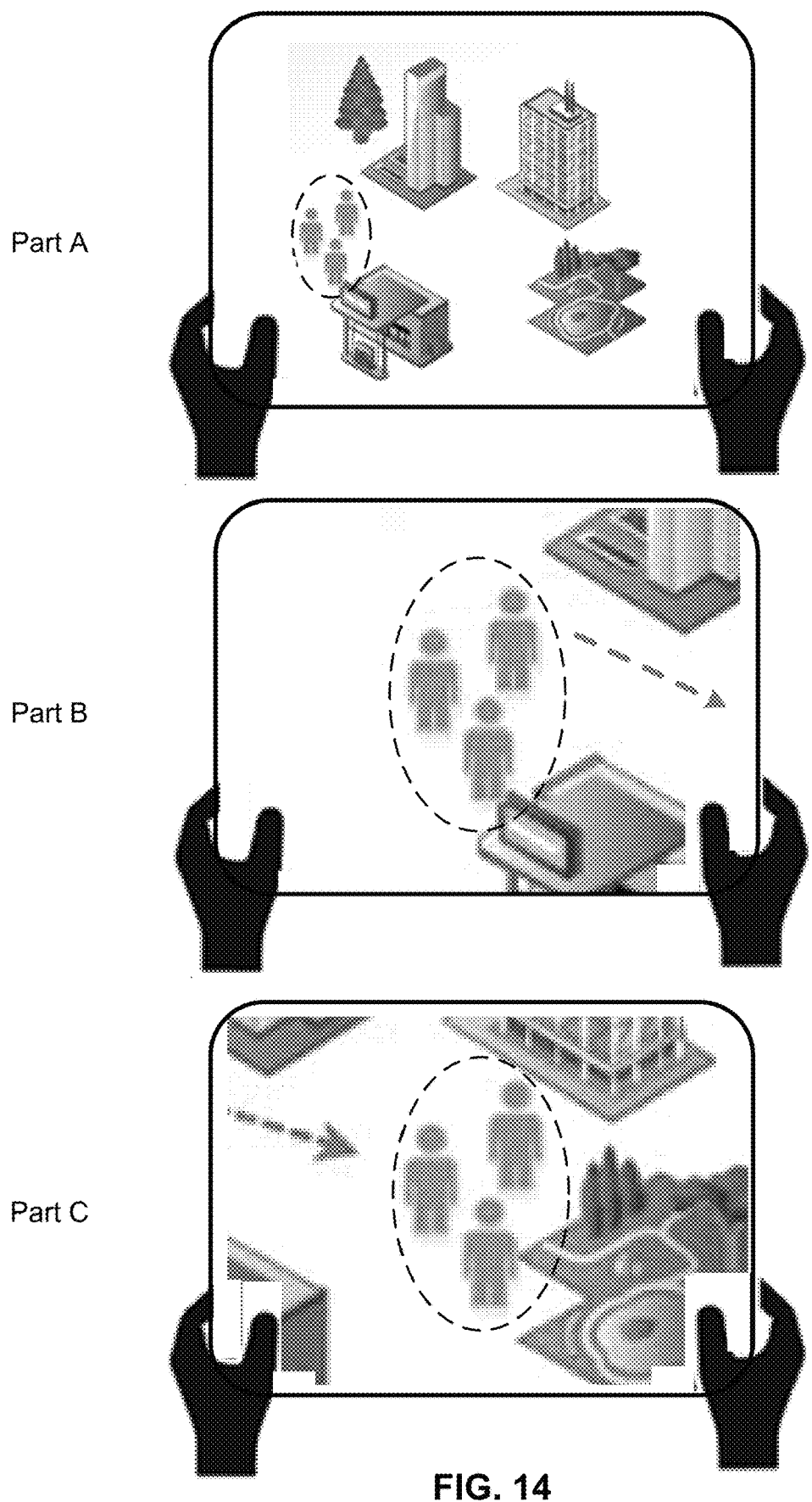

FIGS. 13 and 14 show an example of a user interface (UI) through which a user may select a target and cause the UAV to track the target. Part A of FIG. 13 shows an initial display of an environment comprising a plurality of objects. The objects may comprise stationary objects (e.g., buildings, trees, golf course, gas station, etc.) and objects that are capable of movement (e.g., a group of people). Part B of FIG. 13 shows a user selecting the target within the initial display. Part A of FIG. 14 shows an image of the selected target. Part B of FIG. 14 shows an image of the target after the UAV has moved towards the target and is at a distance from the target. Part C of FIG. 14 shows an image of the target as it is being tracked by the UAV.

As shown in part B of FIG. 13, a user may select a point on the image. The point may be at or proximate to a group of people. Selection of the point may cause the group of people to be selected as the target. The UAV may move towards and/or track the group of people. The group of people may be stationary and/or moving at different points in time. As shown in parts B and C of FIG. 14, the image may continually update as the UAV is tracking the target.

In some instances, the group of people may disperse after some time. The UAV may be configured to track a person that has a position closest to the selected point. In some cases, the UAV may track a substantial portion of the group that remains.

Figure 15:
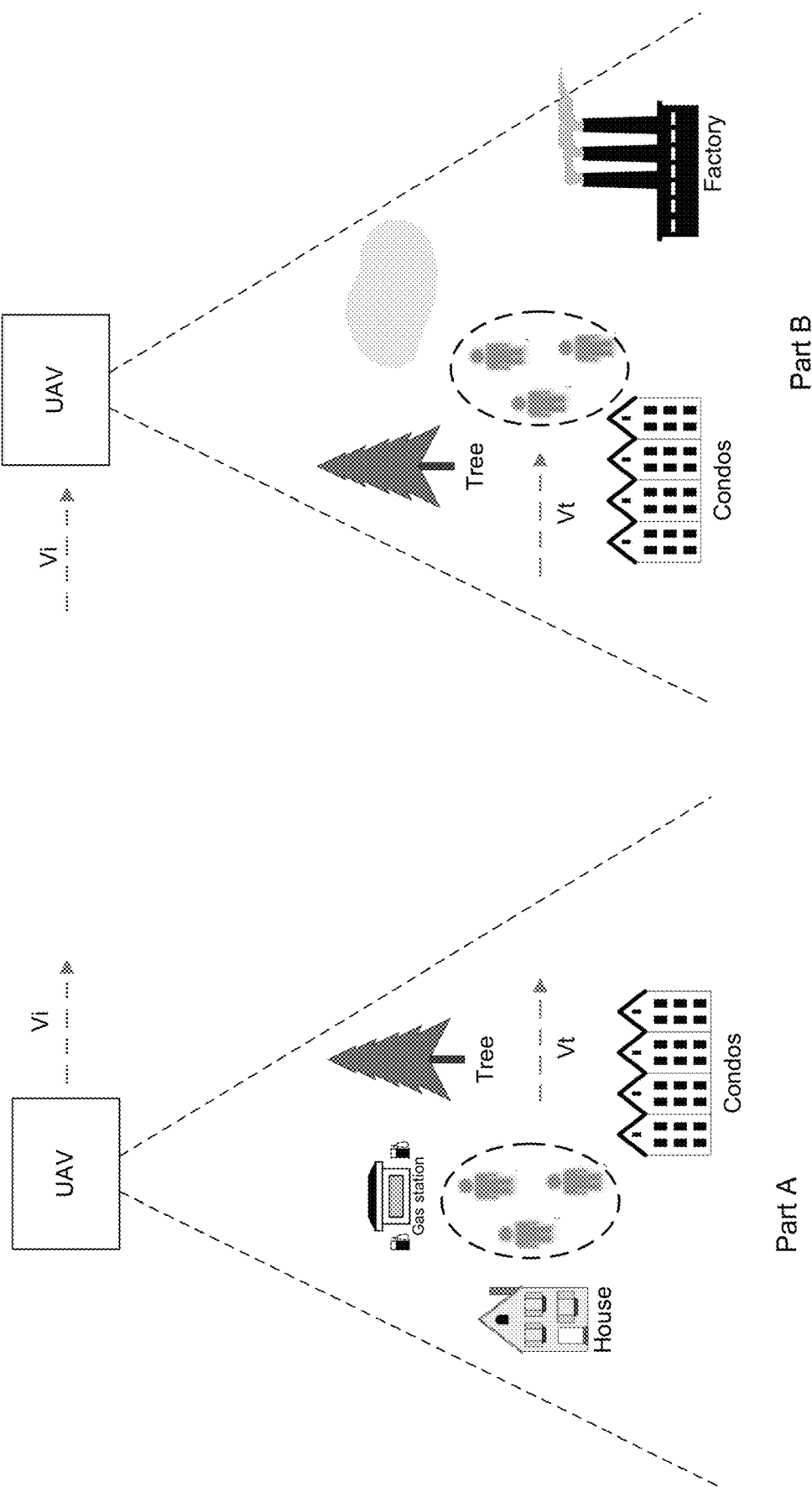
FIG. 15 illustrates UAV tracking of a moving target, in accordance with some embodiments.

FIG. 15 illustrates UAV tracking of a target. For example, as described in FIGS. 13 and 14, a user may select a target on a display. The target may be a group of people. The UAV may move at a velocity Vi and the target may move at a velocity Vt during the tracking. The velocities Vi and Vt may be substantially the same. In some cases, the velocities Vi and Vt may be different. For example, Vi<Vt such that the UAV is moving slower than the target, or Vi>Vt such that the UAV is moving faster than the target.

In some embodiments, a method for controlling a UAV may be implemented using the system of FIG. 2. The method may include acquiring, when the UAV is at a first location, a target from one or more images captured by an imaging device that is carried by the UAV; and controlling the UAV to track the acquired target. The target may be acquired based on a selected point in the one or more images. The images may be captured by an imaging device on the movable object at the first location.

The selected point in the one or more images may be associated with a set of image coordinates. The target may be positioned at a second location that is associated with a set of world coordinates. A transformation may be generated from the set of image coordinates to the set of world coordinates. A direction vector from the first location to the second location may be calculated based on the transformation. A path may be generated for the UAV to track the acquired target based on the direction vector.

In some embodiments, a selected point in an initialization image may be received from a user. The initialization image may be included in the one or more images. A plurality of object candidates may be provided for the user to select, whereby each object candidate may be denoted using a bounding box. A selected object candidate may be received as the target when the user selects the bounding box associated with the selected object candidate.

In some embodiments, a projective transformation of the target may be obtained in the one or more images, based on state information of the imaging device. The state information of the imaging device may be determined based on position and attitude information of the UAV and attitude information of the imaging device.

In some embodiments, a selected point in an initialization image may be received from a user. The initialization image may be included in the one or more images. A target direction may be determined for the UAV to move in based on the selected point. In some embodiments, the target direction may be dynamically adjusted so that the UAV avoids one or more obstacles lying in the target direction. An attitude of the imaging device and/or the UAV may be adjusted to maintain the target in the field of view of the imaging device when the UAV is avoiding the one or more obstacles. For example, a yaw angle movement and a translational movement of the UAV may be controlled to maintain the target in the field of view.

In some embodiments, a tracking failure may be determined to have occurred when the target is no longer in the one or more images and/or the field-of-view of the imaging device. In such instances, the position and attitude of the movable object and/or the attitude of the imaging device may be adjusted in order to recapture the target in one or more subsequent images. The one or more subsequent images may be analyzed to detect the target, and the target may be tracked once it is detected.

In some embodiments, a distance and/or a velocity of the target may be obtained relative to the UAV. The target may be tracked based on the distance and/or the velocity of the target relative to the UAV.

In some embodiments, the path may be an optimized route between the first location (associated with UAV) and the second location (associated with target). The path may be optimized based on one or more parameters including flight distance, flight time, energy consumption, altitude, weather effects including wind directions and speed, and/or tracking of the target (such as speed and direction of target). The path may also be optimized for the UAV to avoid one or more obstacles between the first location and the second location. The path may include straight lines and/or curvilinear lines.

For example, the path may be configured to minimize an energy consumption of the UAV as the UAV is moving from the first location to the second location. The path may be configured to minimize effects of weather on the movement of the UAV. The path may be configured based on a wind speed and direction. The path may be configured to reduce movement of the UAV into a headwind. The path may be configured to account for changes in altitude and pressure as the UAV moves towards the target. The path may be configured based on the surrounding landscape between the first location and the second location. For example, the path may be configured to account for man-made structures and natural terrain that are present in the surrounding landscape. The path may be configured to navigate around/over/underneath obstacles such as man-made structures and natural terrain in the path between the first location and the second location.

In some embodiments, a 3-D model of the surrounding landscape may be obtained based on: (1) one or more images captured by one or more imaging devices on the movable object, and (2) geographical maps obtained from global positioning system (GPS) data. The GPS data may be provided from a server to the user terminal that is used to control the UAV. The path may be configured such that a point of interest maintains in a field-of-view of an imaging device on the UAV as the UAV is moving from the first location to the second location, whereby the point of interest may be the target and/or other objects.

Figure 16:
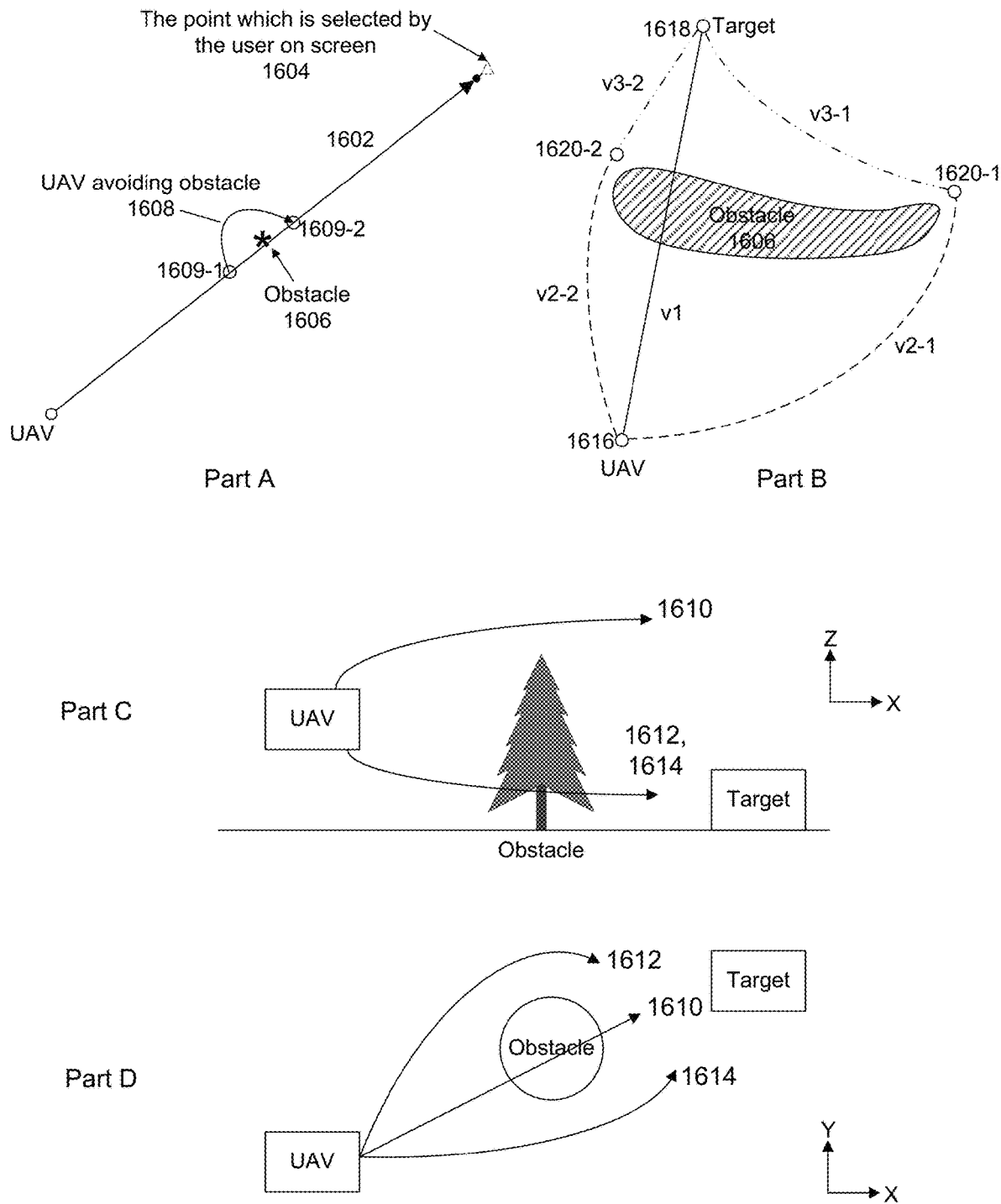
FIG. 16 shows the avoidance of obstacles as the UAV is moving towards and/or tracking a target, in accordance with some embodiments.

FIG. 16 shows the avoidance of obstacles as the UAV is moving towards and/or tracking a target. Referring to part A of FIG. 16, a UAV may be configured to fly in a path 1602 towards a target 1604. The target may be associated with a point in an image on a display that is selected by a user. The target may be a stationary target, a moving target, or a direction. An obstacle 1606 may be detected in the flight path 1602. A detour 1608 from the path may be generated for the UAV to avoid the obstacle. The UAV may be configured to automatically avoid the obstacle by moving along the detour. The detour may exit the path at a first point 1609-1 and rejoin the path at a second point 1609-2.

Part B of FIG. 16 shows different configurations for generating (for example, re-planning) a path after the UAV has successfully navigated around an obstacle 1606. The UAV may be initially at a first location 1616 and the target may be at a second location 1618. A vector v1 may be defined between the first location and the second location. The vector v1 may be associated with an initial path from the UAV to the target. When an obstacle 1606 is detected in the initial path, the UAV may make a detour to avoid the obstacle (by flying above, around, or underneath obstacle). The UAV may fly to a third location 1620 after having successfully navigated the obstacle. For example, the UAV fly to a third location 1620-1 located to the right of the obstacle, as shown in part B of FIG. 16. A vector v2-1 may be defined between the first location and the third location. A new path for moving towards and/or tracking the target may be generated for the UAV when the UAV is at the third location 1620-1. The new path may be defined by a vector v3-1. The vector v3-1 may be determined based on the vector v1 and the vector v2-1. In some embodiments, the new path may be generated using a triangulation method based on one or more images obtained at the third location, and one or more images obtained at one or more previously known locations (e.g., the first location and/or the second location). In some other embodiments, the UAV may be controlled to fly back to its initial location (e.g., the first location, or any other location that the UAV has passed) and the new path may be generated from the initial location. In some embodiments, the new path may be generated from the third location to the second location without using the first location, for example using the method previously described in FIG. 6.

In some embodiments, a shortest (or most direct) path for avoiding the obstacle may be determined. For example, the UAV may fly to a fourth location 1620-1 located to the left of the obstacle, as shown in part B of FIG. 16. A distance from the first location to the fourth location may be less than a distance from the first location to the third location. In some instances, the distance from the first location to the fourth location may be indicative of the shortest distance that the UAV travels to circumvent the obstacle. A vector v2-2 may be defined between the first location and the fourth location. A new path for moving towards and/or tracking the target may be generated (for example, re-planned) for the UAV when the UAV is at the fourth location. The new path may be defined by a vector v3-2. The vector v3-2 may be determined based on the vector v1 and the vector v2-2.

In some embodiments, as shown in parts C and D of FIG. 16, the original path between the UAV and the target may be substantially replaced by the detour or a new path. The detour may be shaped around (1612 and 1614), above (1610), and/or underneath the obstacle. The detour may be in a lateral and/or vertical direction.

In some embodiments, an orientation of the UAV and/or an imaging device located thereon may be changed during the detour, such that a position of the target remains in a field-of-view of the imaging device.

Referring back to part A of FIG. 16, the UAV may be initially at a first location and the target may be at a second location. The UAV may be at a third location after having successfully navigated around the obstacle. A new path for the UAV may be generated based on a vector between the first location and the second location, and a vector between the first location and the third location. The new path may be defined by a vector between the third location and the second location. The vector between the first location and the second location may be obtained based on the target information (e.g., from imaging data). The vector between the first location and the third location may be obtained from an IMU of the UAV.

Figure 17:
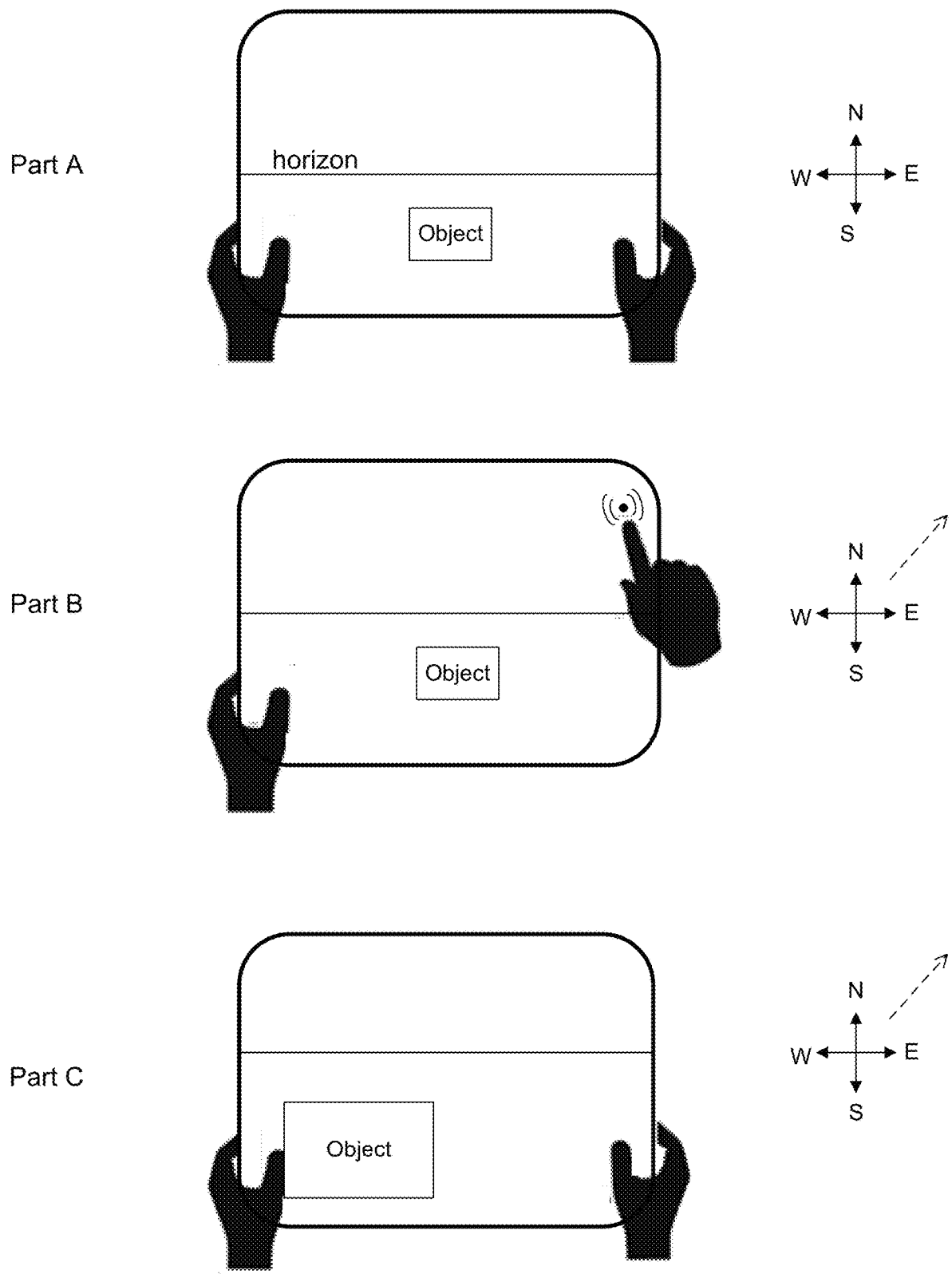
FIG. 17 shows an example of a user interface (UI) through which a user may select a target direction, in accordance with some embodiments.

The target may be selected based on a point in one or more images captured by an imaging device that is carried by the UAV. The one or more images may be provided from a FPV. The UAV may be configured to switch course from moving towards one target to moving towards another target, depending on which point in the one or more images is being selected. The UAV may be configured to move towards a first target when a first point is selected, and to move towards a second target when a second point selected. The selection of the second target may replace the selection of the first target. The first point and the second point may be located at different portions of the image. The second target may be different from the first target. An attitude and/or orientation of the UAV may be changed when the UAV is switching from moving towards one target to moving towards another target. A transition path may be generated that allows the UAV to switch course from one target to another target in a curvilinear manner. Power consumption of the UAV may be reduced by switching course in the curvilinear manner. Also, flight stability of the UAV may be improved by switching course in the curvilinear manner FIG. 17 shows an example of a user interface (UI) through which a user may select a target direction. Part A shows an initial display of an environment. Part B shows a user selecting a target direction within the initial display. Part C shows an image of the movable object traveling in the target direction. Corresponding movements/headings of the UAV are shown in the compasses.

Part A shows an initial display of an environment. A FPV may be provided as illustrated. The FPV may include a live streaming image from an imaging device. The FPV may alternatively be a graphical depiction or representation of the image from the imaging device. In the example presented, a horizon is shown, along with an object within the field of view. The UAV may be stationary or moving while the initial display of the environment is occurring. For example, the corresponding compass shows a stationary UAV.

While a FPV is illustrated, other types of views may be presented in alternative or in conjunction with the FPV. For instance, a map view may be provided. The map view may include a 2D map, such as an overhead map. The map view may include a 3D map. The 3D map may be alterable to view the 3D environment from various angles. Solid renderings, wireframes, or other types of imaging may be shown, as described previously herein.

The display may be shown on a user terminal. The user may optionally hold the user terminal.

Part B shows a user selecting a target direction within the initial display. The user may select a portion of the image to select the target direction. As previously described, the image may include a FPV and/or a map. The user may select a portion of the FPV or the map to select the target direction. The portion of the image selected by the user may optionally be a point. The UAV may travel in the direction indicated by the selected point. A directional heading of the UAV may be determined by a current location of the UAV and an angle that includes the selected point along the trajectory.

In the example presented, the user may select a target direction that is northeast of the current position of the UAV. The corresponding compass shows the UAV may move in a corresponding northeastern direction.

The user selection of a target direction may include a lateral selection of the target direction. In some instances, the target direction may be within a two-dimensional plane. For instance, the user may specify whether the UAV is to move north, south, east, west, or anywhere in between. The UAV may remain at substantially the same altitude while traveling in the specified two-dimensional direction.

In some embodiments, the UAV may encounter flight restrictions that may affect the flight path of the UAV. For instance, some lateral flight restrictions may apply. In one example, the UAV may remain within a certain range of the user terminal. If the UAV is traveling in a target direction, and is about to exceed the range of the user terminal, the UAV may stop and hover, or may return toward the user terminal. In another example, the UAV may remain within a geo-fenced region. If the UAV is traveling in a target direction, and is about to pass outside of the geo-fenced region, the UAV may stop hover, or may return toward the user terminal. An obstacle may be a flight restricted area. Alternatively a flight restricted area may or may not contain any obstacle. Any other type of flight restriction may apply.

Alternatively, the user selection of a target direction may include a three-dimensional selection of the target direction. The target direction may be anywhere within a three-dimensional space. For instance, the user may specify whether the UAV is to move north, south, east, west, up, or down, or anywhere in between. The UAV may be capable of changing altitude while traveling within the specified three-dimensional direction.

In some embodiments, the UAV may encounter flight restrictions that may affect the flight path of the UAV. Lateral flight restrictions, such as those previously described, may be provided. Additional altitude flight restrictions may be provided that may limit altitude change of the UAV. For instance, if the target direction is upwards, the UAV may travel in that target direction indefinitely, all the while increasing the altitude of the UAV. Alternatively, the flight restriction, such as a flight ceiling, may kick in. When the UAV reaches the flight ceiling, the UAV may level out and remain at substantially the same altitude. However, the UAV may continue to travel in the same specified lateral direction. Similarly, if the target direction is downwards, the UAV may travel in that direction indefinitely until it reaches the ground, all the while decreasing the altitude. Alternatively, the flight restriction, such as a flight floor, may kick in. When the UAV reaches the flight floor, the UAV may level out and remain at substantially the same altitude. However, the UAV may continue to travel in the same specified lateral direction.

In some embodiments, visual indicators (such as compass and/or vector) of the selected target may optionally be displayed. Additionally, heading information indicative of flight angles, compass direction, future/target destination, etc. may optionally be displayed on a 2D map and/or a 3D map.

The precision to which the user may specify a direction may be on the order of 0.01 degrees or less, 0.05 degrees or less, 0.1 degrees or less, 0.5 degrees or less, 1 degree or less 2 degrees or less, 3 degrees or less, 5 degrees or less, 7 degrees or less, 10 degrees or less, 15 degrees or less, 20 degrees or less, or 30 degrees or less.

When a user selects a portion of the image to specify a target direction, the selected target direction may or may not be visually indicated on the screen. For instance, a visual marker may be provided within the image indicative of the target direction. The visual marker may be a point, region, icon, line, or vector. For instance, the point may be indicative of a selection of the target direction. In another example, the vector may be indicative of the direction that the UAV is heading.

In some embodiments, a user may specify that the UAV is in a directional mode. When the UAV is in a directional mode, the portion of the image selected by the user may determine the direction at which the UAV will travel until it encounters other directions, or encounters flight restrictions. The UAV may travel indefinitely in that direction until it encounters a stop or change criteria, such as a direction change, flight restriction, flight mode change, low power supply or obstacle. The user may specify that the UAV is in a directional mode by selecting the directional mode from one or more available modes, such as a target tracking mode.

In another example, the UAV may fly in a target direction when a user selects a user-interface tool that indicates that the portion of the image that the user will select will be the target direction. The target direction tool may be a one-use tool (e.g., the user may need to reselect the tool in order to select another target direction), or may be used multiple times (the user can keep specifying target direction without having to re-select the tool unless the user has switched tools).

In other examples, one or more images (e.g., FPV, 2D map and/or 3D map) on the screen may have one or more predetermined regions indicative of flight direction. The regions may be visually distinguishable from other regions. For instance, the regions may include borders, or arrows, or any other type of features that may distinguish the region. In some instances the regions may be provided in a border surrounding the image. In other instances, one or more arrow buttons may be provided that may allow the target direction of the UAV to be adjusted. In additional examples, a user may indicate one or more values or coordinates indicative of the target direction that the UAV is to travel. For instance, angles may provide a target direction for the UAV to head. The angles may be provided for two dimensional or three dimensional direction control. In another example, the values may include spatial coordinates which are along a vector descriptive of the target direction.

Any other user interface tools or techniques may be provided that may allow a user to specify a target direction using the user interface.

Part C shows an image of the movable object traveling in the target direction. For instance, from a FPV, when a UAV is traveling in the specified direction, an object that was once further away may become closer up. From a map view, objects may be shown to be passed by the UAV as the UAV follows the target direction. As shown on the corresponding compass, the UAV may be continuing to travel in the target direction.

In some instances, when a user specifies a target direction, the UAV may travel in that target direction at a fixed velocity or a variable velocity. A standard target travel velocity may be provided. A variable target travel velocity may also be provided. Alternatively, the user may specify the velocity and/or acceleration at which the UAV may be traveling in the target direction. Any description herein of affecting the velocity of the UAV may also apply to affecting acceleration of the UAV in the target direction. In some instances, the user may affect the velocity at the same time at which the user is specifying the target direction. For instance, when a user selects a target direction, the number of clicks or touches that a user touches the target direction may affect the velocity of the UAV. For instance, if a user touches a point indicative of a target direction a single time, the UAV may travel at a first velocity, and if the user touches the point multiple times, the UAV may travel a second velocity. The second velocity may be greater than the first velocity. The velocity of the UAV travel may correspond to the number of touches or selections of the point indicative of the target direction. A positive proportional relationship may be provided between the number of selections and the velocity of the UAV. In some instances, a linear relationship may be provided between the number of selections and the velocity of the UAV. For instance, if a user clicks on the point N times, the velocity of the UAV may be X+N*Y, where X is a velocity value, Y is a velocity multiplier, and N is the number of times the target direction was selected. Any other mathematical relation may be provided. The user may make a selection a first time to get a first velocity, and then make the selection again to speed up the UAV. The user may keep making the selection to keep speeding up the UAV.

In another example, when a user selects a target direction, the length of the selection of the target direction may affect the velocity of the UAV. For instance, if a user touches a point indicative of a target direction for a first period of time, the UAV may travel at a first velocity, and if the user touches a second period of time greater than the first period of time, the UAV may travel a second velocity. The second velocity may be greater than the first velocity. The velocity of the UAV travel may correspond to the length of the touch or selection of the point indicative of the target direction. A positive proportional relationship may be provided between the length of the selection and the velocity of the UAV. In some instances, a linear relationship may be provided between the length of the selection and the velocity of the UAV.

Various other types of user interactions may affect the velocity of the UAV traveling in the target direction. In some examples, swiping motions (e.g., speed of swipe, length of swipes, number of swipes) may affect the velocity of the UAV. In other examples, different regions may be touched to affect the velocity of the UAV. In another example, a separate control may be provided for velocity control. For instance, a user may adjust a velocity using a manual control while the UAV is traveling in the target direction. The velocity may be adjusted in accordance with the manual control in real-time. In another example, a user may enter a numerical value for the desired velocity, or select the velocity from a plurality of pre-selected options.

Figure 18:
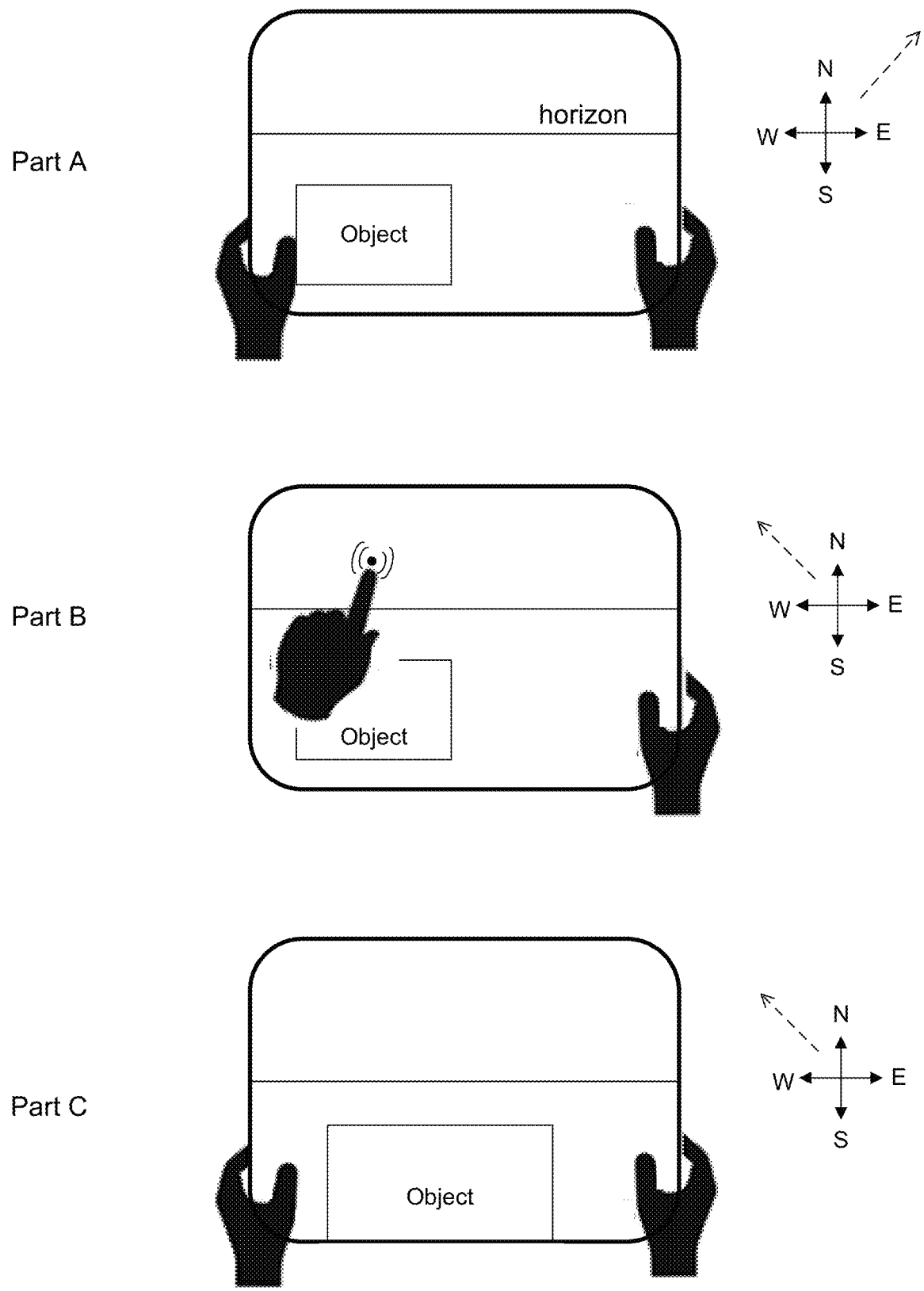
FIG. 18 shows an example of a user interface (UI) through which a user may adjust a target direction, in accordance with some embodiments.

FIG. 18 shows an example of a user interface (UI) through which a user may adjust a target direction. Part A shows a display of an environment while a UAV is heading in a first target direction. Part B shows a user selecting a second target direction different from the first target direction within the display. Part C shows an image of the movable object traveling in the second target direction. Corresponding movements/headings of the UAV are shown in the compasses.

Part A shows a display of an environment while a UAV is heading in a first target direction. The corresponding compass shows that the UAV is traveling in a northeast direction. When a target direction is selected, the UAV may continue along that target direction until it encounters a situation that requires a change in direction, such as those previously described (e.g., a direction change, flight restriction, flight mode change, low power supply or obstacle). The UAV may continue in the target direction along a constant velocity and/or acceleration or a varying velocity and/or acceleration.

Part B shows a user selecting a second target direction different from the first target direction within the display. For instance, the second target direction may be in a northwest direction. The second target direction may be selected in the same manner as the first target direction. The second target direction may be selected while the UAV is traversing the first target direction. The corresponding compass shows that the UAV is now traveling in the northwest direction.

Part C shows an image of the movable object traveling in the second target direction. The UAV may transition from the traveling in the first target direction to traveling in the second target direction. The transition from the first to second target direction may be relatively abrupt or gradual.

As previously described, the image is illustrated as a FPV, but may also be a map in conjunction with or as an alternative to the FPV.

Figure 19:
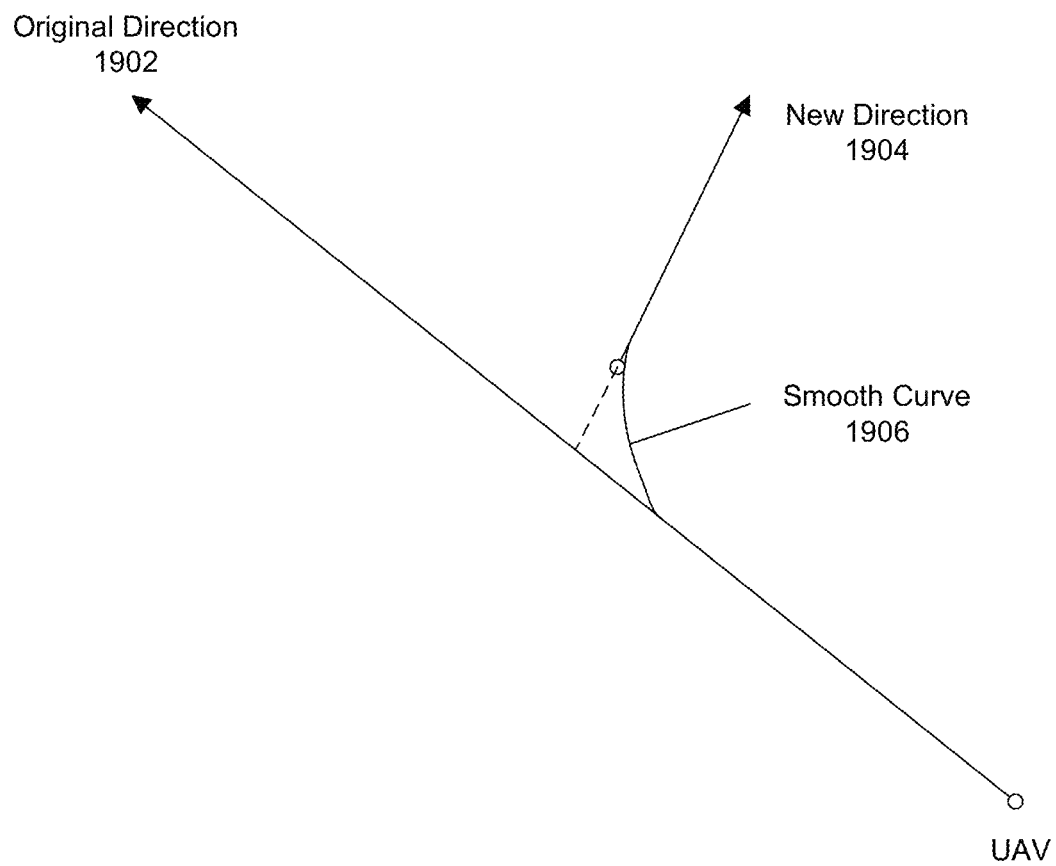
FIG. 19 shows an example of a change in flight path of a UAV when a user adjusts a target direction, in accordance with some embodiments.

FIG. 19 shows an example of a flight path of a UAV. As illustrated, a UAV may be initially traveling in a first target direction (i.e., original direction) illustrated by a first vector 1902. The UAV may receive an instruction to head in a second target direction (i.e., new direction) illustrated by a second vector 1904. The flight path of the UAV may be curved 1906 to transition from the first direction to the second direction.

The curvature of the flight path may depend on one or more factors, such as speed and/or acceleration of the UAV when it receives the instruction to change direction, the degree of directional change, types of propulsion units, configuration of the UAV, specifications by the user of the UAV, or any other factor. In some instances, a standard curvature or gradual change of the flight path may be provided. Alternatively, the curvature may vary in accordance with one or more of the factors described. For instance, if the UAV is traveling very quickly, it may not be able to make as sharp a turn as if it were traveling more slowly. A flight controller may make a calculation to effect change of the direction in the flight path. The flight controller may have any of the characteristics as described elsewhere herein.

Figure 20:
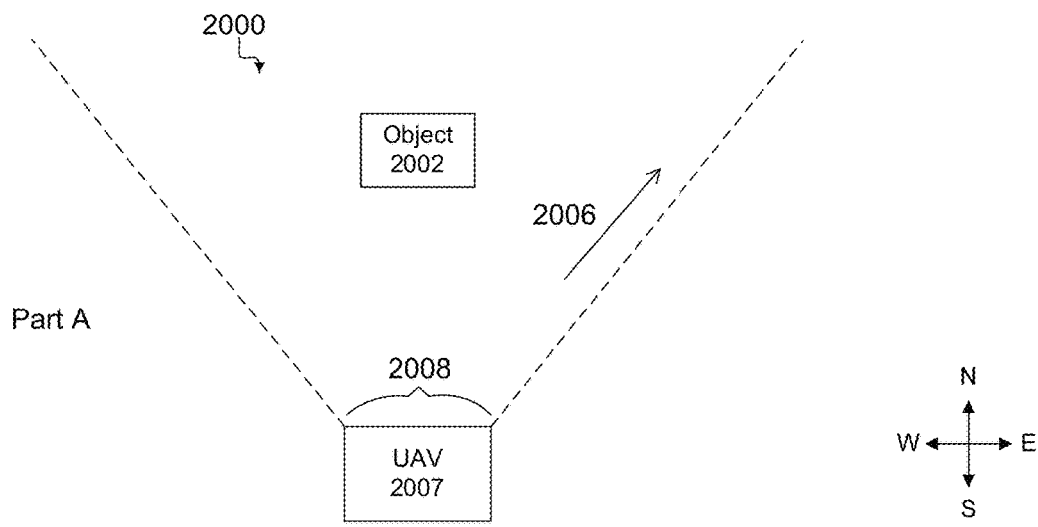
FIG. 20 shows an example of a UAV traveling in a target direction within an environment, in accordance with some embodiments.
Figure 20:
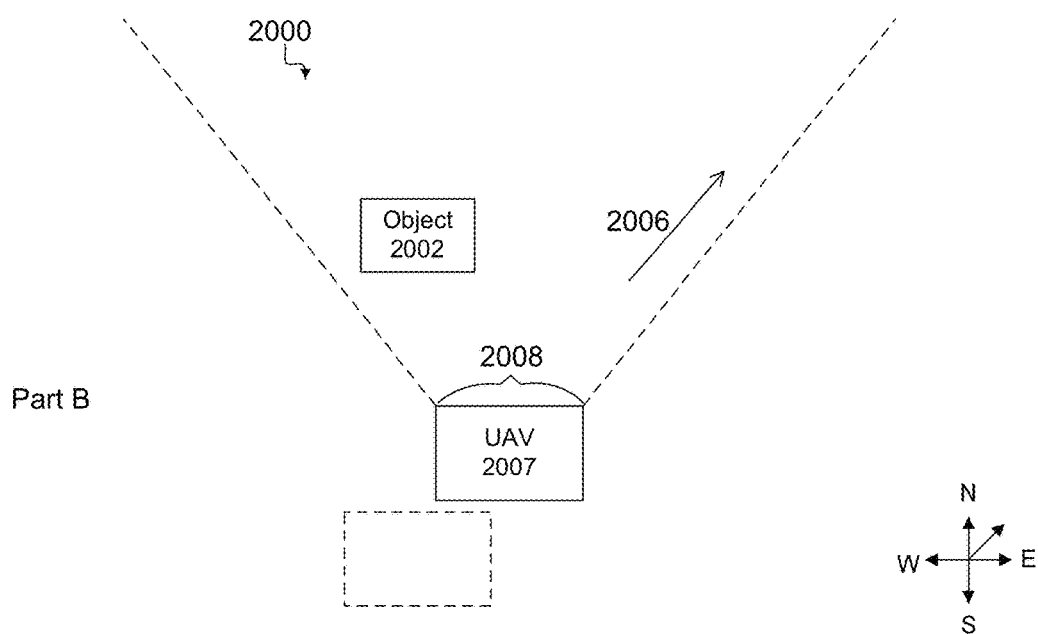

FIG. 20 shows an example of a UAV traveling in a target direction within an environment. The environment 2000 may optionally include one or more objects 2002. A UAV 2004 may be capable of traversing the environment. A field of view of an imaging device of the UAV may be provided 2008. In some instances, one or more objects may be captured within the field of view. A target direction 2006 of the UAV may be selected. The UAV may be capable of traveling in the target direction.

Part A shows an initial position of the UAV 2004 within the environment 2000. A target direction for the UAV may be specified 2006. In some instances, a user may specify a target direction by selecting a portion of an image captured by the imaging device. The target direction may include a point that is within the field of view captured by the imaging device. The target direction may optionally be selected by selecting a portion of an image based on information captured by the imaging device. The image may be an image captured by the imaging device or rendered image based on the image captured by the imaging device. The image may be a FPV or may be a map representative of the environment within which the UAV is traveling. The user may select a target direction from a map view that need not be within the field of view of the imaging device.

Part B shows a subsequent position of the UAV 2004 within the environment 2000 as the UAV travels in the target direction 2006. As illustrated, the UAV may move relative to the environment, such as one or more objects 2002 within the environment.

Optionally, when a UAV is traveling in a target direction, the UAV and/or the imaging device of the UAV may maintain its direction relative to the environment while traveling in the target direction. For instance, if a UAV and/or imaging device of the UAV is initially facing north, the UAV and/or imaging device may remain facing north while traveling in the target direction. In other embodiments, the UAV and/or the imaging device may change orientation.

Figure 21:
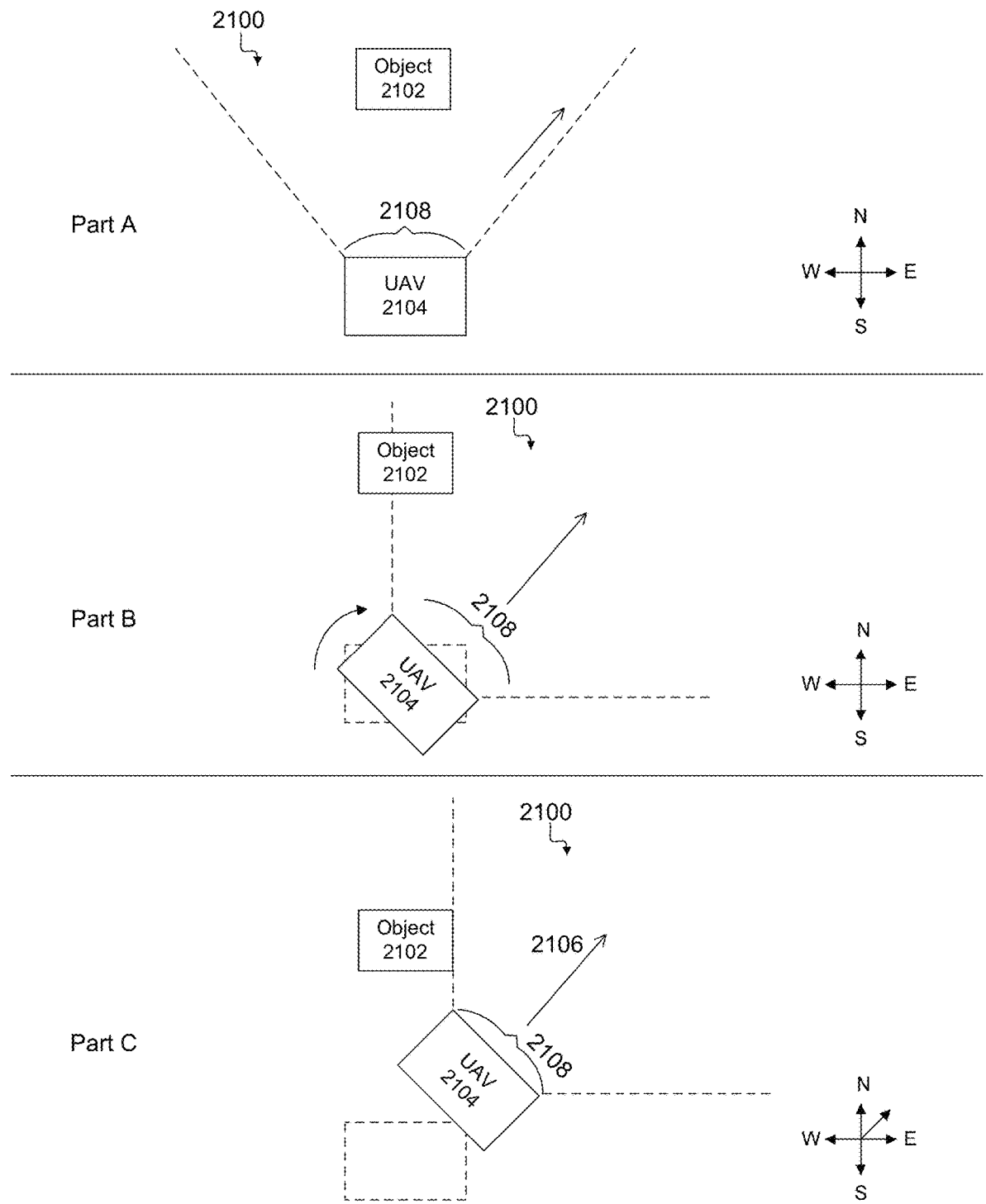
FIG. 21 shows an example of a UAV traveling in a target direction within an environment, where the UAV and/or the imaging device has changed orientation relative to the environment, in accordance with some embodiments.

FIG. 21 shows an example of a UAV traveling in a target direction within an environment, where the UAV and/or the imaging device has changed orientation relative to the environment. The environment 2100 may optionally include one or more objects 2102. A UAV 2104 may be capable of traversing the environment. A field of view of an imaging device of the UAV may be provided 2108. In some instances, one or more objects may be captured within the field of view. A target direction 2106 of the UAV may be selected. The UAV may be capable of traveling in the target direction.

Part A shows an initial position of the UAV 2104 within the environment 2100. A target direction for the UAV may be specified 2106. The target direction may be specified using any technique or user interface as described elsewhere herein.

Part B shows a change in orientation of the UAV 2104 and/or the imaging device in response to the selection of the target direction 2106. In some instances, the field of view 2108 of the imaging device may be adjusted in response to the selection of the target direction. The orientation of the UAV and/or imaging device may be selected based on the target direction. For instance, the orientation of the UAV and/or imaging device may be selected to provide the target direction within a central region of the field of view of the imaging device. The target direction may be at a center point, or along a lateral and/or longitudinal central line of the field of view. In some instances, the orientation of the UAV may be selected to permit easy traversal of the UAV in the target direction (e.g., if the UAV has a 'front' orientation, it may orient the UAV to have the front orientation of the UAV in the target direction). The imaging device may remain stationary with respect to the UAV and/or may change orientation/position with respect to the UAV. In some cases, Part C shows a subsequent position of the UAV 2104 within the environment 2100 as the UAV travels in the target direction 2106. As illustrated, the UAV may move relative to the environment, such as one or more objects 2102 within the environment. In some instances the UAV may travel in the target direction after adjusting the orientation of the UAV and/or the imaging device. Alternatively, the UAV may travel in the target direction while adjusting the orientation of the UAV and/or the imaging device, or prior to adjusting the orientation of the UAV and/or imaging device.

In some embodiments, various types of coordinate systems may be employed in selecting and flying a UAV in a target direction. For instance, one or more coordinate systems may be local to an imaging device, and/or UAV. One or more coordinate systems may include global coordinate systems may be provided relative to an inertial reference frame, such as the environment. A position of the imaging device and/or UAV may be determined in reference to a global coordinate system. In some instances, the position of the imaging device and/or UAV may be determined in reference to a local coordinate. The position of the imaging device and/or UAV may be converted between global and local coordinates.

Optionally, a target direction in an image may be determined in relation to a local coordinate system of the imaging device and/or the image captured within the device. The local coordinate of the target direction may be converted to global coordinates for the target direction. For instance, a vector in a local coordinate system denoting the target direction may be converted to a vector in the global coordinate systems.

Next, a method of calculating/converting a user's selected point on a display screen to a flight direction in a space within which the UAV flies will be described. For example, when a user selects a point in a GUI image, the screen position ($x_{screen}$, $y_{screen}$) on which the user selects may be obtained. The user terminal may convert the coordinate ($x_{screen}$, $y_{screen}$) of the selected point into coordinate ($x_{rawimage}$, $y_{rawimage}$), which is the coordinate of the selected point in the camera raw image, based on a position and a percentage of the current preview image within the camera raw image, and normalize it into ($x_{percentage}$, $y_{percentage}$). The equation for normalizing process is given by:

$$\begin{cases} x_{percentage} = \dfrac{x_{rawimage}}{ImageWidth} \\ y_{percentage} = \dfrac{y_{rawimage}}{ImageHeight} \end{cases}$$

The coordinate ($x_{percentage}$, $y_{percentage}$) may be transmitted to the UAV via a communications system. The controller may receive the transmitted data and calculate a spatial flight direction ($x_{space}$, $y_{space}$, $z_{space}$), and transmit the flight direction ($x_{space}$, $y_{space}$, $z_{space}$) back to user terminal via the communications system.

The user terminal receives the flight direction, and re-projects it onto the image to obtain ($x_{dir}$, $y_{dir}$), and display it.

Step 1 above obtains a user's input coordinate ($x_{screen}$, $y_{screen}$) via an API (e.g., an IOS API or an Android API), and step 2 above obtains a normalized coordinate based on a percentage of the preview image within the camera raw image. Step 3, which is described next, calculates the spatial flight direction from user selected point.

Figure 22:
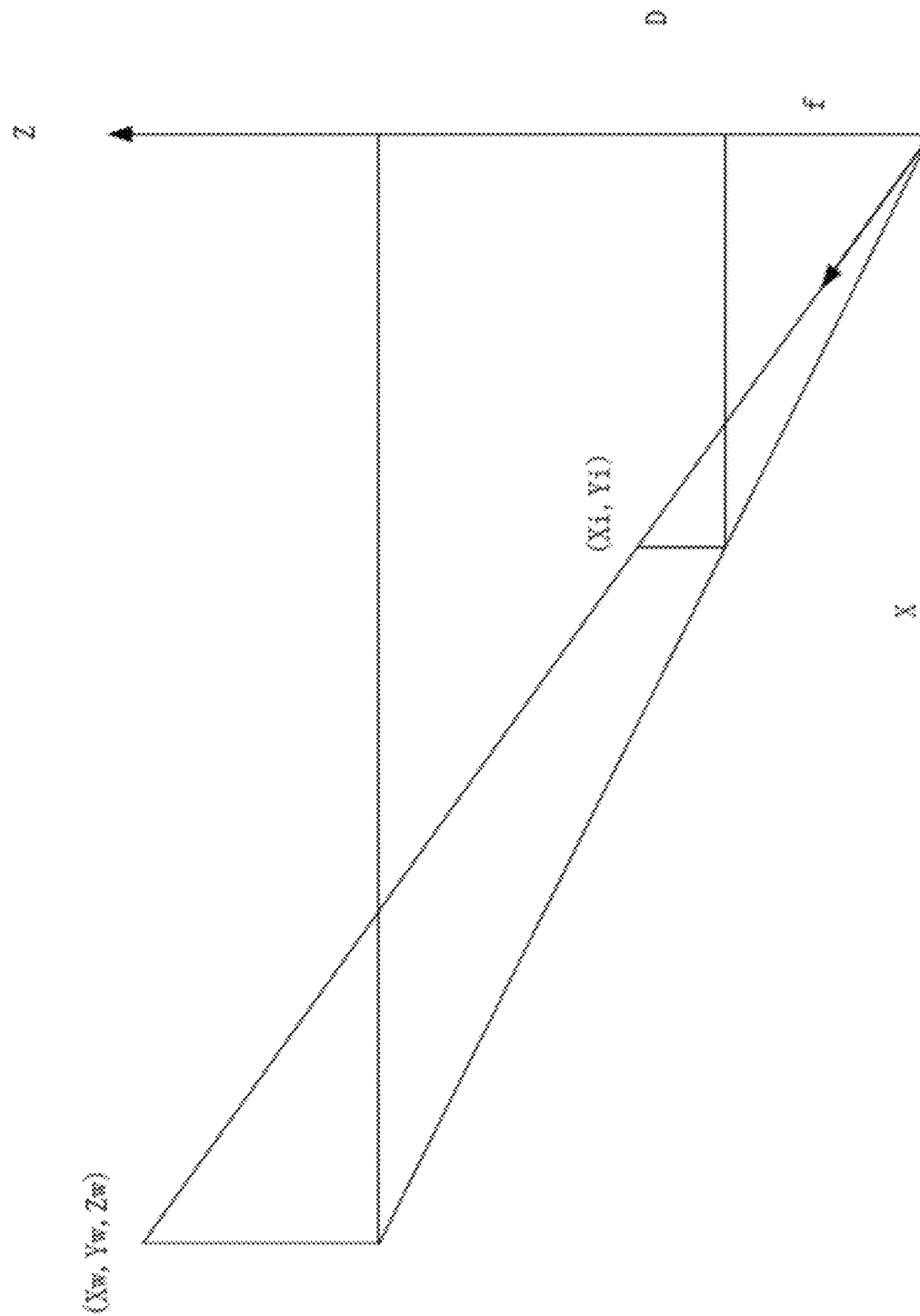
FIG. 22 shows a geometry model of camera imaging whereby the geometry model is used for transforming from camera coordinates to world coordinates, in accordance with some embodiments.

FIG. 22 shows a geometry model of camera imaging (assuming that the optical axis strictly aligns with the center of image). The point ($x_W$, $y_W$, $z_W$) is an arbitrary point under world coordinate system (with respect to point O), D is the depth, and $z_W$=D. The ($x_i$, $y_i$) is the coordinate of the same point under camera coordinate system. The following relation may be obtained:

$$\begin{cases} \dfrac{x_w}{z_w} = \dfrac{x_i}{f} \\ \dfrac{y_w}{z_w} = \dfrac{y_i}{f} \end{cases}$$

The following equation is based on a relation between ($x_{percentage}$, $y_{percentage}$) $x_i$, $y_i$, and (ImageWidth, ImageHeight) of image:

$$\begin{cases} x_i = (x_{percentage} - 1/2) * ImageWidth \\ y_i = \left(\dfrac{1}{2} - y_{percentage}\right) * ImageHeight \end{cases}$$

Based on the following relation between a focal range f and FOV of the image $$\begin{cases} f = \dfrac{ImageWidth}{2\tan(FOV_h/2)} \\ f = \dfrac{ImageHeight}{2\tan(FOV_v/2)} \end{cases}$$

the following may be obtained:

$$\begin{cases} \dfrac{x_i}{f} = \dfrac{\left(x_{percentage} - \dfrac{1}{2}\right) * ImageWidth}{\dfrac{ImageWidth}{2\tan\left(\dfrac{FOV_h}{2}\right)}} = (2 * x_{percentage} - 1) * \tan\left(\dfrac{FOV_h}{2}\right) \\ \dfrac{y_i}{f} = \dfrac{\left(\dfrac{1}{2} - y_{percentage}\right) * ImageHeight}{\dfrac{ImageHeight}{2\tan\left(\dfrac{FOV_v}{2}\right)}} = (1 - 2 * y_{percentage}) * \tan\left(\dfrac{FOV_v}{2}\right) \end{cases}$$

that is, $$\begin{cases} x_w = (2 * x_{percentage} - 1) * \tan\left(\dfrac{FOV_h}{2}\right) * D \\ y_w = (1 - 2 * y_{percentage}) * \tan\left(\dfrac{FOV_v}{2}\right) * D \\ z_w = D \end{cases}$$

As can be seen, the ($x_W$, $y_W$, $z_W$) contains an unknown value D. A normalization may be possible since the selected direction is a direction vector. In the normalized clicked direction $\overrightarrow{OA}=(x_W, y_W, z_W)$, the unknown value D is eliminated. Assuming D=1, the selected direction may be given by:

$$\overrightarrow{OA} = \begin{pmatrix} \frac{x_w}{norm(x_w, y_w, z_w)} \\ \frac{y_w}{norm(x_w, y_w, z_w)} \\ \frac{z_w}{norm(x_w, y_w, z_w)} \end{pmatrix}$$

The direction vector of the selected direction in camera coordinate system has been obtained from the above.

Next, a translation matrix from UAV body to world coordinate system (East, North, Ground) is provided by a gimbal as:

$$\mathcal{M}(\alpha, \beta, \gamma) = \begin{bmatrix} \cos\alpha\cos\gamma - \cos\beta\sin\alpha\sin\gamma & amp; -\cos\beta\cos\gamma\sin\alpha - \cos\alpha\sin\gamma & amp; \sin\alpha\sin\beta \\ \cos\gamma\sin\alpha + \cos\alpha\cos\beta\sin\gamma & amp; \cos\alpha\cos\beta\cos\gamma - \sin\alpha\sin\gamma & amp; -\cos\alpha\sin\beta \\ \sin\beta\sin\gamma & amp; \cos\gamma\sin\beta & amp; \cos\beta \end{bmatrix}$$

The spatial direction vector of the clicked direction in world coordinate system (East, North, Ground) may be given as:

$$\overrightarrow{OA}_{gnd} = \mathcal{M} * \overrightarrow{OA}$$

The re-projecting process of re-projecting the direction vector onto the preview image in next step 4 is a reverse process of step 3. The translation matrix can be obtained by other methods, for example, by providing a sensor on the camera that is capable of measuring attitude.

Figure 23:
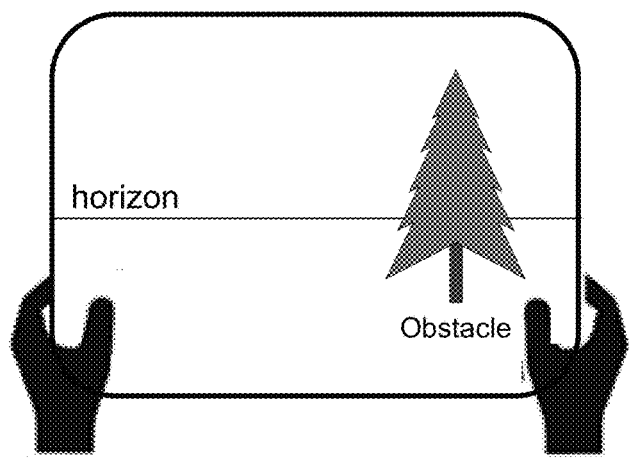
FIG. 23 shows an example of selecting a target direction within an environment where an obstacle may be within the path of the UAV when traveling along the target direction, in accordance with some embodiments.
Figure 23:
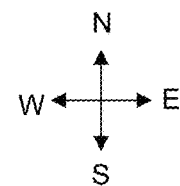
Figure 23:
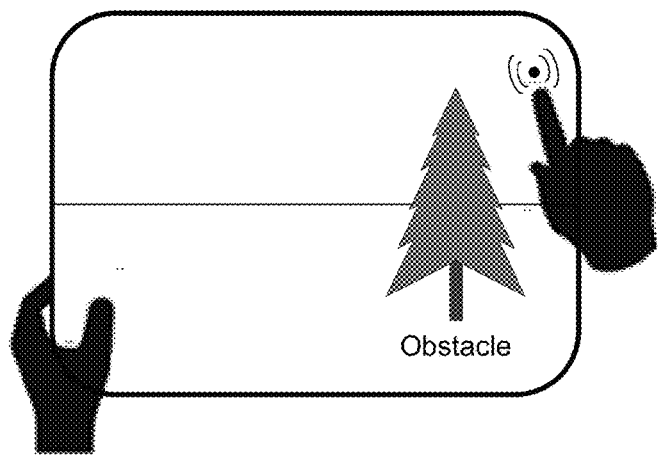
Figure 23:
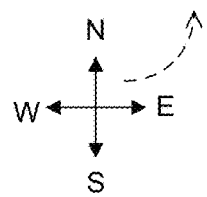
Figure 23:
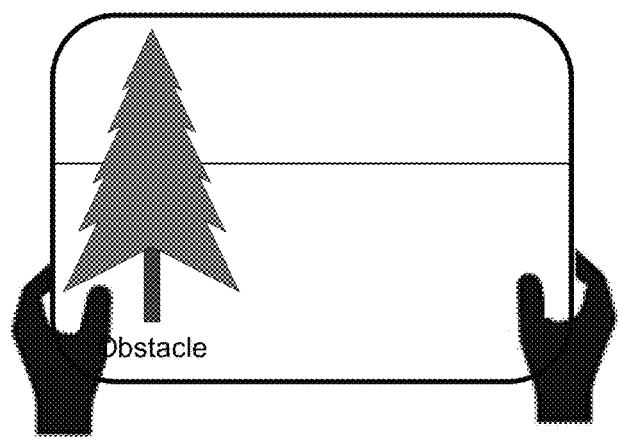
Figure 23:
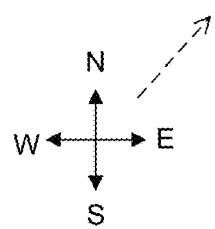

FIG. 23 shows an example of selecting a target direction within an environment where an obstacle may be within the path of the UAV when traveling along the target direction. Part A shows an initial display of an environment. Part B shows a user selecting a target direction within the display, an obstacle may be in the way. Part C shows an image of the movable object traveling in the target direction, having avoided the obstacle. Corresponding movements/headings of the UAV are shown in the compasses.

Part A shows an initial display of an environment. As previously described, the initial display may include an image which may include a FPV, and/or a map view. Initially, an image of the environment may be presented before a user makes a selection for a target direction. One or more objects within the environment may be displayed, such as a tree. The corresponding compass may show that the UAV may optionally not be moving. In alternate embodiments, a UAV may already be moving when a user makes a selection for a target direction.

Part B shows a user selecting a target direction within the display. For instance, the target direction may be in a northeast direction. The target direction may be selected in any manner as described in greater detail elsewhere herein. In some instances, one or more objects may become obstacles when in the UAV's path when the UAV is traveling. For instance, a user may select a target direction in the northeastern direction. A tree may lie in the path in the northeastern direction.

The UAV may automatically adjust the flight path of the UAV to avoid the obstacle presented. The corresponding compass shows that the UAV may go around the obstacle. A flight controller, such as a flight controller described else-where herein, may aid in determining how the UAV is to avoid the obstacle. The UAV may circumnavigate the obstacle laterally and/or may travel above and/or below the obstacle. In some instances, the obstacle may be a stationary obstacle. Alternatively, the obstacle may be a moving obstacle. Any obstacle avoidance technique, such as those described in greater detail elsewhere herein, may be employed.

Part C shows an image of the movable object traveling in the target direction, having avoided the obstacle. For instance, a UAV may fly around a tree that was an obstacle, which permits the UAV to continue on in its original target direction, which may be in the northeast, as shown by the corresponding compass.

Figure 24:
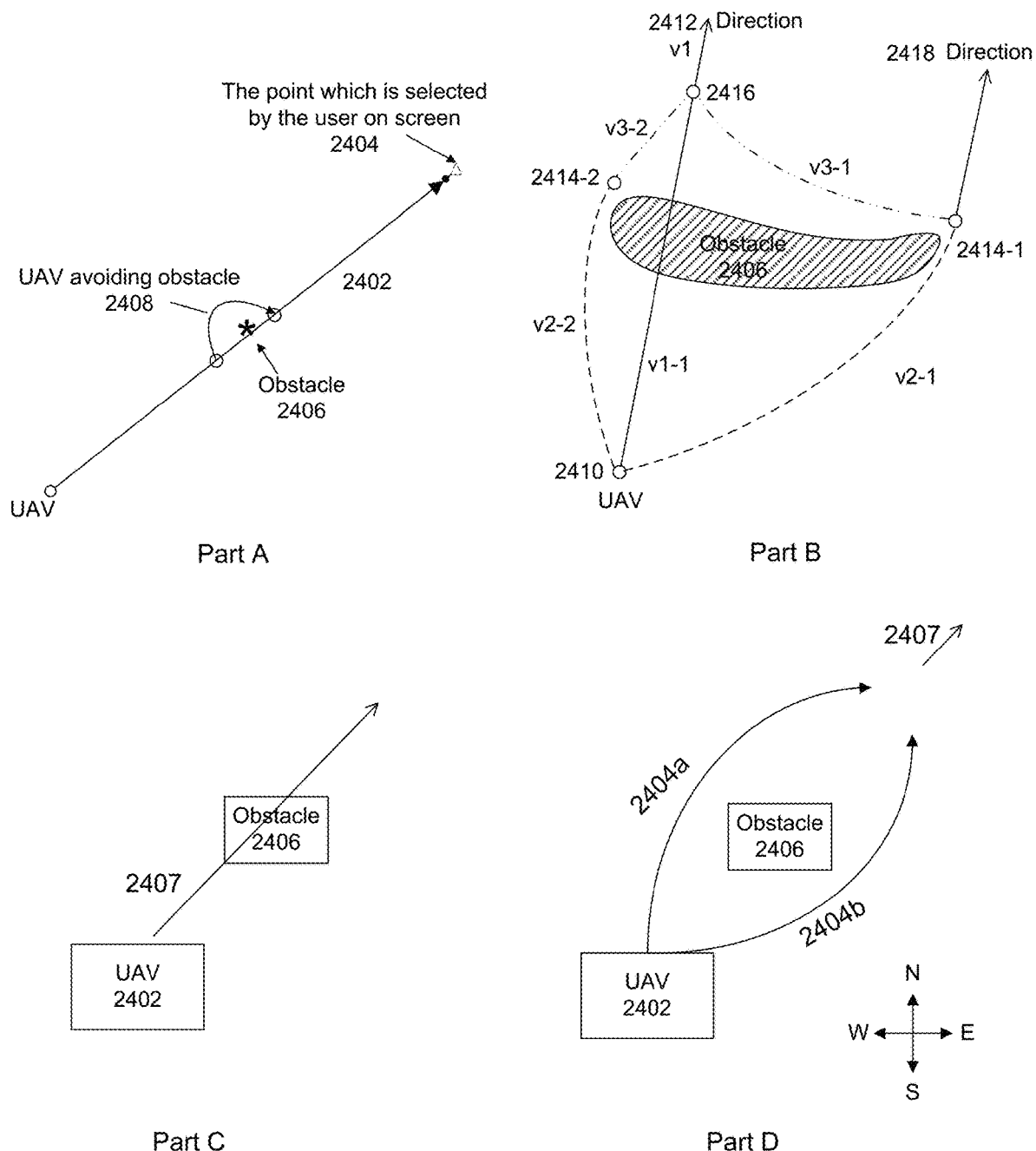
FIG. 24 shows an example of a flight path of a UAV when avoiding an obstacle, in accordance with some embodiments.

FIG. 24 shows an example of a flight path of a UAV when avoiding an obstacle. As illustrated in part A, a UAV may be initially traveling in a target direction (i.e., original direction) illustrated by a vector 2402. The target direction may be determined based on a portion of an image (e.g., point 2404) which is selected by a user on a display. The selected portion may be used to determine an angle or heading of the UAV, which may determine the target direction. The UAV may travel toward the selected point indefinitely. The selected point may be a virtual point indicative of a heading within the image.

The target direction 2402 may intersect an obstacle 2406. The obstacle may be a stationary obstacle. Alternatively, the obstacle may be a moving obstacle. The moving obstacle may be in the target direction, or may be predicted to intersect with the target direction. A flight path of the UAV may be initially along the target direction. The flight path may be altered avoid the obstacle. For instance, a curved portion of the path may be provided to avoid the obstacle. The curved portion of the path may be within a two-dimensional lateral plane, or may be within three-dimensional space. The curved portion of the path may be contained in a single plane or may require multiple planes.

The curvature of the flight path may depend on one or more factors, such as speed and/or acceleration of the UAV when it receives the instruction to avoid the obstacle, the size of the obstacle, the amount of warning regarding the obstacle, the nearness of the obstacle, motion of the obstacle, shape of the obstacle, types of propulsion units, configuration of the UAV, specifications by the user of the UAV, or any other factor. In some instances, a standard curvature or gradual change of the flight path may be provided. Alternatively, the curvature may vary in accordance with one or more of the factors described. For instance, if the UAV is traveling very quickly, it may not be able to make as sharp a turn as if it were traveling more slowly. In one illustration, the flight path may be a relatively tight curved path to avoid the obstacle and quickly return to the original flight path along the target direction. A flight controller may make a calculation to effect change of the direction in the flight path. The flight controller may have any of the characteristics as described elsewhere herein.

Part B of FIG. 24 shows different configurations for generating (for example, re-planning) a path after the UAV has successfully navigated around an obstacle 2406. The UAV may be initially at a first location 2410 and moving towards a target direction 2412. A vector v1 may be defined in the direction 2412. The vector v1 may be associated with a path of the UAV in the target direction. When an obstacle 2406 is detected ahead of the UAV in the target direction, the UAV may make a detour to avoid the obstacle (by flying above, around, or underneath obstacle). The UAV may fly to a second location 2414 after having successfully navigated the obstacle. For example, the UAV fly to a second location 2414-1 located to the right of the obstacle, as shown in part B of FIG. 24. A vector v2-1 may be defined between the first location and the second location. A new path for rejoining the original path to move in the selected direction may be generated for the UAV when the UAV is at the second location 2414-1. For example, the UAV may towards a third location 2416 that is located along the original path. The new path may be defined by a vector v3-1. The vector v3-1 may be determined based on a vector v1-1 between the first location and the third location, and the vector v2-1. The new path may be defined by a vector v3-1. The vector v3-1 may be determined based on the vector v1-1 and the vector v2-1. The new path may be configured such that the UAV flies in a smooth curvilinear manner to rejoin the original path and to proceed in the selected direction. In some instances, the UAV need not rejoin the original path and may proceed on an entirely new path in a direction 2418. The direction 2418 may or may not be parallel to the direction 2412. In some embodiments, the new path may be generated using a triangulation method based on one or more images obtained at the second location, and one or more images obtained at one or more previously known locations (e.g., the first location). In some other embodiments, the UAV may be controlled to fly back to its initial location (e.g., the first location, or any other location that the UAV has passed) and a new target direction may be generated from the initial location. In some embodiments, the new path may be generated from the second location in the target direction without using the first location, for example using the method previously described in FIG. 6.

In some embodiments, a shortest (or most direct) path for avoiding the obstacle may be determined. For example, the UAV may fly to a fourth location 2414-2 located to the left of the obstacle, as shown in part B of FIG. 16. A distance from the first location to the fourth location may be less than a distance from the first location to the third location. In some instances, the distance from the first location to the fourth location may be indicative of the shortest distance that the UAV travels to circumvent the obstacle. A vector v2-2 may be defined between the first location and the fourth location. A new path for moving towards and/or tracking the target may generated for the UAV when the UAV is at the fourth location. The new path may be defined by a vector v3-2. The vector v3-2 may be determined based on the vector v1-1 and the vector v2-2.

Parts C and D of FIG. 24 show an additional example of an obstacle avoidance path. Part C shows a UAV 2402 having a target direction 2404. An obstacle 2406 may intersect a path of the UAV in the target direction.

Part D shows alternative paths 2404a, 2404b that may be taken by the UAV 2402 to avoid the obstacle 2406. After avoiding the obstacle, the UAV may continue in traveling in the target direction 2404. As previously described, the curvature and/or the alternative path may be selected with aid of a flight controller. The alternative path may include a relatively tight curve as shown in part A, or a looser curve as shown in part D. The alternative path may be selected in accordance with any factors, such as those previously listed. Obstacle avoidance algorithms and techniques may be used to calculate the alternative path as described in greater detail elsewhere herein.

In some embodiments, a UAV may track a status of a power supply of the UAV. If the power supply falls beneath a threshold level, an instruction may be provided for a UAV to automatically return to a home reference position. The threshold level may be a predetermined level. In some instances, the threshold level may be determined based on a distance of the UAV from the home reference position. For instance, if the UAV is further from the home reference position, the threshold may be lower. The threshold may be sufficient to ensure that there is sufficient power for the UAV to return to the home reference position. Optionally, the home reference position may be a location of a start of the UAV flight. In another example, the home reference position may be a location of a user terminal. The home reference position may be static, or may be moving. The UAV may travel in a target direction until a condition is detected, such as a low power supply.

Next, systems and methods that can support target tracking and re-detection of a target are described with reference to FIGS. 25, 26, 27, 28, 29, 30, and 31. A controller (e.g., image analyzer and/or flight controller) can obtain a feature model for a target, wherein the feature model represents imagery characteristics of the target. Furthermore, the controller can extract one or more features from one or more images that are captured by an imaging device carried by a movable object, and can apply the feature model on said one or more features to determine similarity. The controller can apply a feature model for a target on an image that is captured for tracking a target to generate a tracking output. The controller can also determine that a tracking failure occurs based on the tracking output, and can check one or more subsequent images to detect the target. Additionally, the controller can obtain a relative distance between the movable object and the target, and can generate one or more control signals to track the target.

Figure 25:
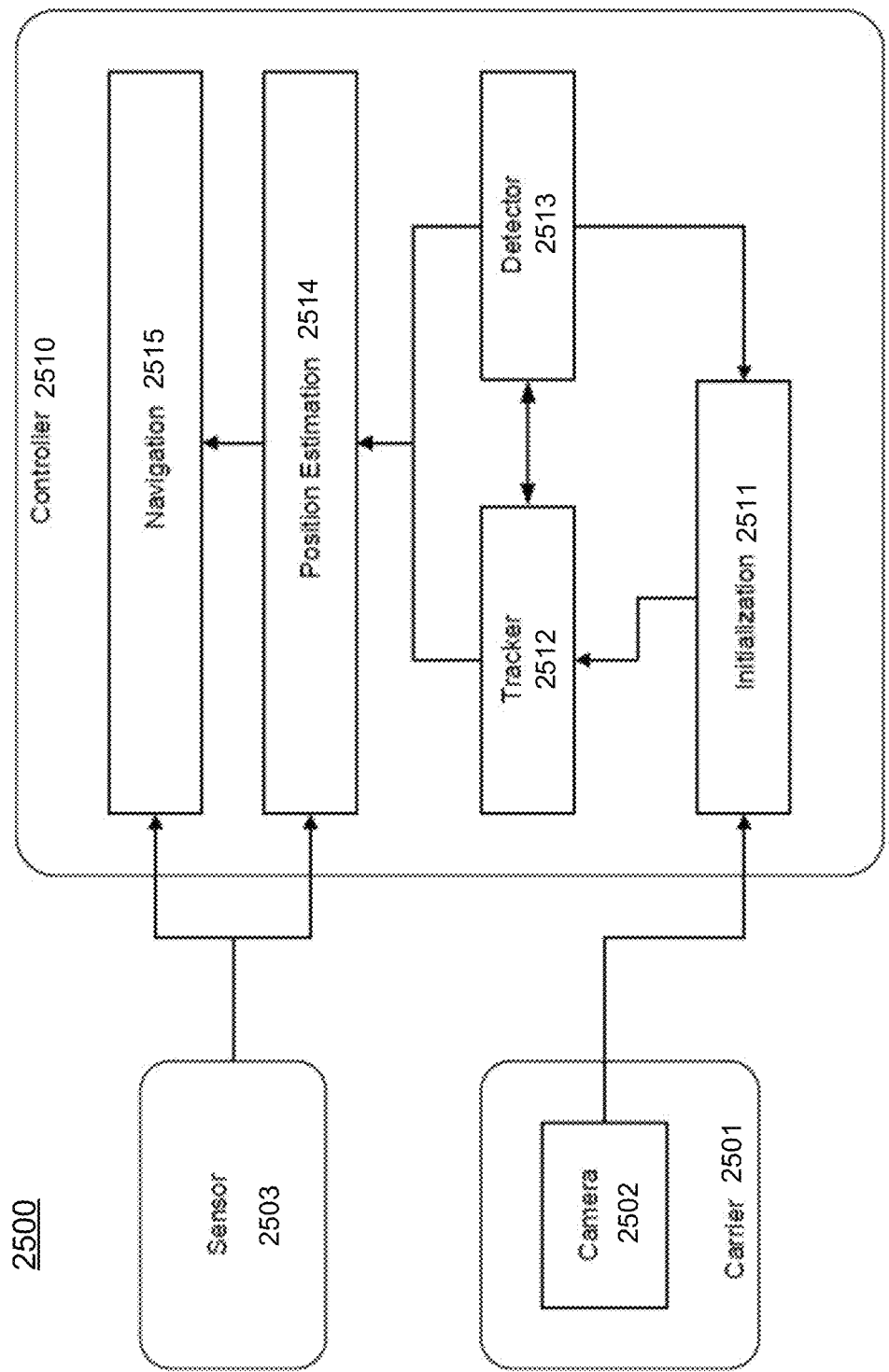
FIG. 25 illustrates an exemplary target tracking system in a movable object environment, in accordance with some embodiments.

FIG. 25 illustrates an exemplary target tracking system in a movable object environment, in accordance with some embodiments. As shown in FIG. 25, a movable object 2500 includes a controller 2510, which can receive various types of information, such as imagery information, from a camera 2502, which is carried by a carrier 2501, and other sensors 2503 on board.

The controller can perform an initialization operation 2511 based on the imagery information received from the camera. Optionally, the controller can use a specialized or general detector 2513 for detecting the target (i.e. the object to be tracked) in an initialization image. Thus, the controller can acquire the target and set up corresponding tracking strategies.

Furthermore, the movable object can use a tracker 2512 for tracking the target. In the case when the tracker losses the target, the system can use the detector for redetecting the lost target to continue the tracking process. Additionally, the controller can perform further operations, such as position estimation 2514 and navigation operations 2515, based on the information received from the sensors 2503.

Figure 26:
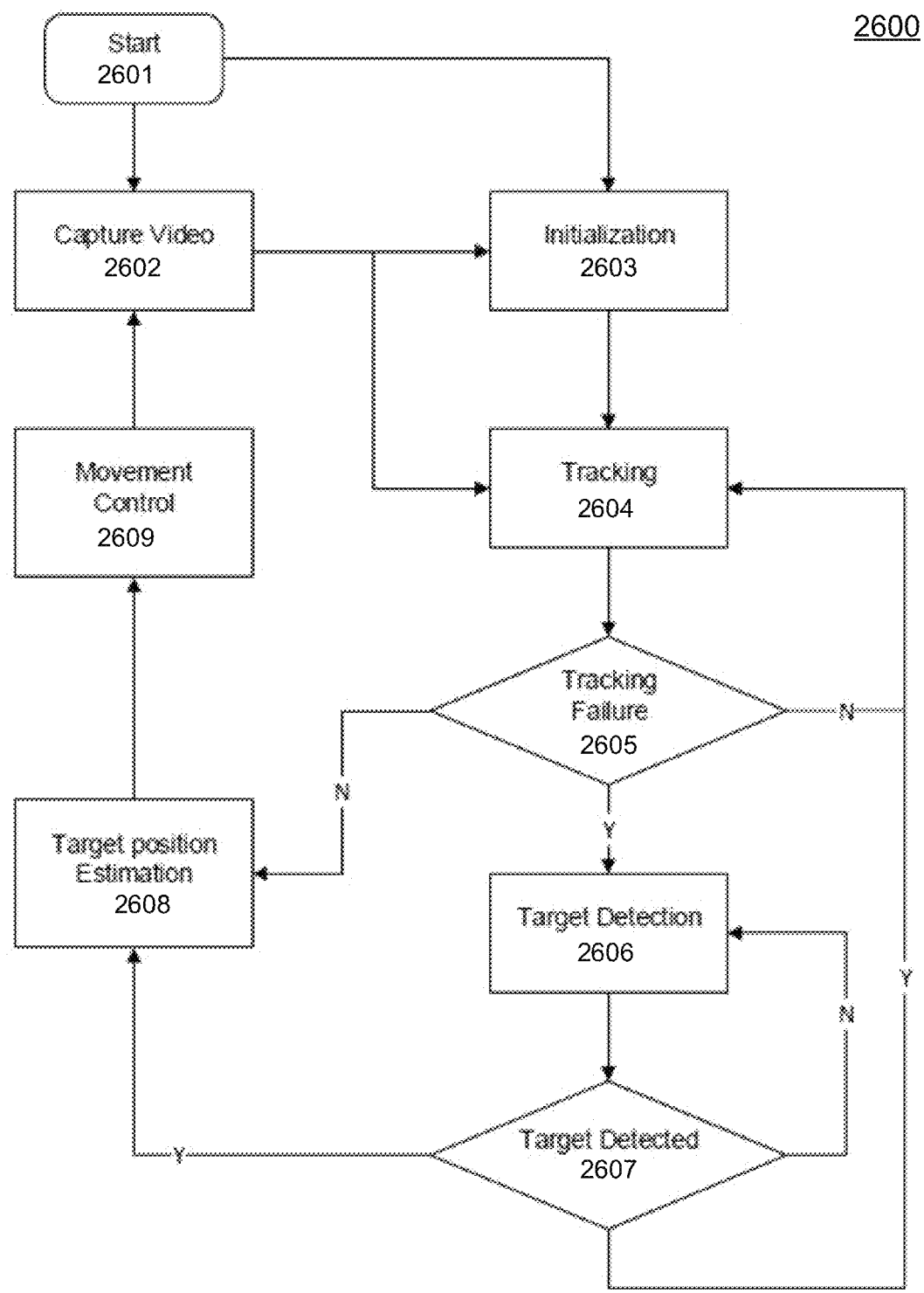
FIG. 26 illustrates supporting target tracking in a movable object environment, in accordance with various embodiments.

FIG. 26 illustrates supporting target tracking in a movable object environment, in accordance with various embodiments. At step 2601, a movable object may start tracking a target. At step 2602, the movable object can capture one or more images, such as videos, in real time. For example, the movable object can take advantage of the camera carried by a gimbal or other image sensors on board of the movable object (such as a UAV). At step 2603, the movable object can perform the initialization operation for acquiring a target. For example, the movable object can acquire a target from an initialization image and obtain a feature model for the target. Furthermore, the movable object may continually perform the initialization operation until the target has been successfully acquired. At step 2604, the movable object can perform the tracking process. For example, the movable object can employ a vision-based tracker for tracking the target. At step 2605, the system can check whether a tracking failure occurs. At step 2606, when a tracking failure occurs, the system can perform the target detection operation. Then, at step 2607 the system can check whether the target is detected. The system can repeatedly perform the target detection operation until the target is redetected. On the other hand, at step 2608, the system can estimate the target position for continuously tracking the target as long as the tracking is successful (i.e. including the cases when the target is redetected). At step 2609, with the aid of the estimated target position, the system can perform the movement control operation, such as flight control for a UAV, which allows the moveable object to capture the images for continuously tracking.

Figure 27:
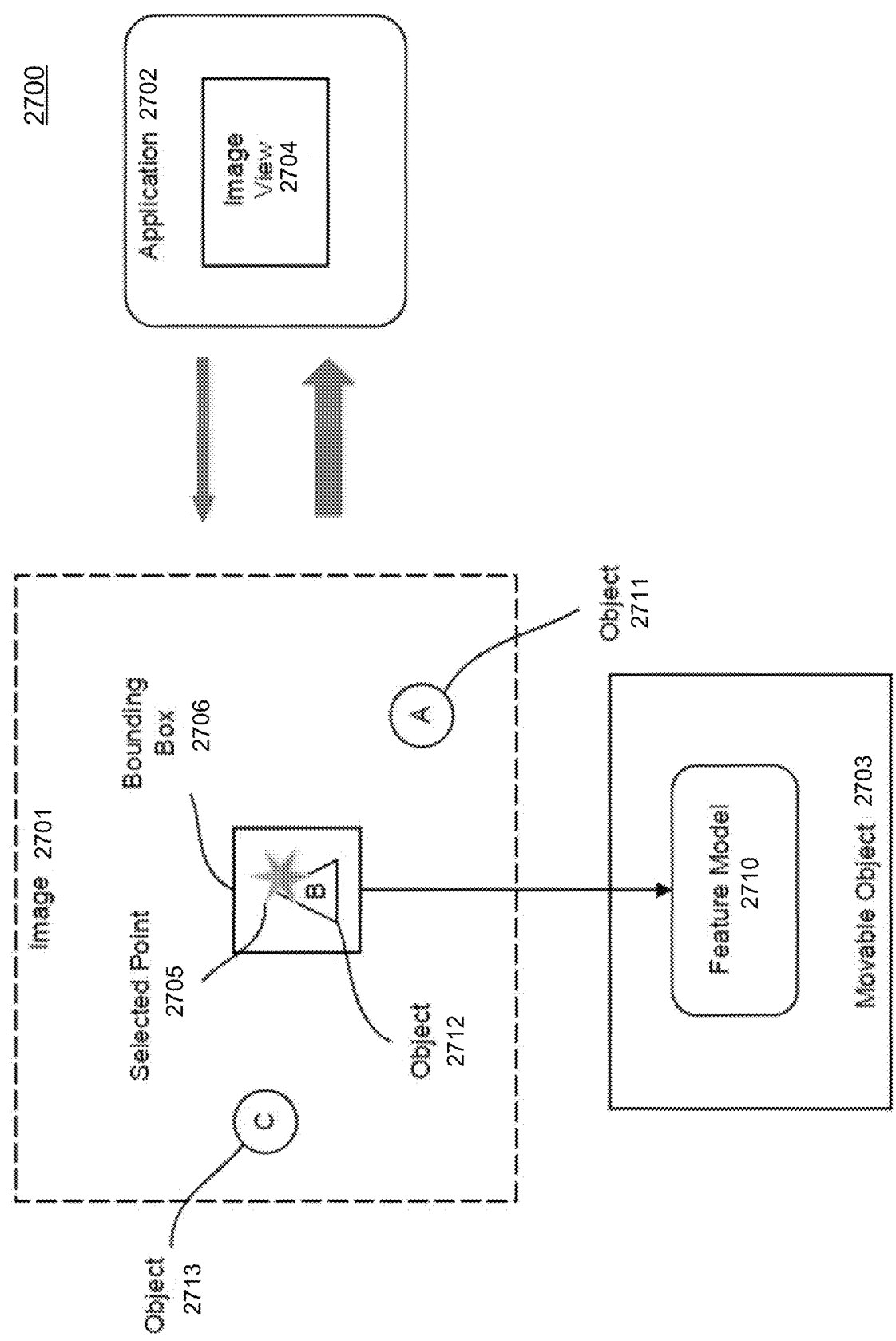
FIG. 27 illustrates initializing target tracking in a movable object environment, in accordance with various embodiments.

FIG. 27 illustrates initializing target tracking in a movable object environment, in accordance with various embodiments. As shown in FIG. 27, a movable object 2703 can capture an image 2701, which can be transmitted to an application 2702 (e.g. on a ground terminal). The application 2702 can use an image view 2704 for displaying the image 2701, which includes one or more features, e.g. the objects A-C 2711-2713.

The movable object 2703 can use different types of object detector for detecting the target (i.e. the object that is desired by the user), e.g. after receiving a user input such as a point on a target and/or a target class to be tracked (e.g. a human being). For example, the movable object 2703 can use an object proposal approach at the initialization stage. As shown in FIG. 27, the system allows a user to select a point 2705 on an interested object, e.g. the object B 2712 in the image 2701. Once receiving the selected point 2705 from the user, the system can use a bounding box 2706 for defining and proposing the object 2712, which may have irregular shapes.

Furthermore, the system may propose multiple object candidates, e.g. using different bounding boxes. In such a case, the user is allowed to make a decision on which object candidate (i.e. bounding box) is desired. Then, the system can generate a feature model 2710 based on the selected object proposal. As shown in FIG. 27, the feature model 2710 can represent the imagery characteristics of the patch of image points within the bounding box 2706. After receiving the selection of the desired object candidate (or bounding box) from the ground station, the movable object 2703 can start tracking the target based on the feature model 2710 for the target.

The feature model 2710 can be constructed based on examining common objects such as human body, cars, and human faces. In such a case, the feature model 2804 can include various discrete objects that are trained offline. Alternatively, the feature model 2804 can be constructed based on analyzing characteristics of the objects, such as the edge/contour and color information. For example, the feature model 2710 can be generated using different methods, such as optical flow and/or correlation filter algorithms. Also, the feature model 2710 may be represented in the spatial domain and/or the frequency domain.

Using such an initialization process, the data to be transmitted from a ground station (i.e. the application 2702) to the movable object 2703 (e.g. a UAV) is limited, since only the position of the selected point 2705 may be needed for initializing the tracking process. Thus, the transmission delay in the initialization step can be minimized. On the other hand, the movable object can continuously transmit image or video data to the application 2702 for user interaction, since the data link from the movable object 2703 (e.g. a UAV) to the ground station (i.e. the application 2702) often have a wider bandwidth and a higher speed than the data link from the movable object 2703 to the ground station (i.e. the application 2702).

Figure 28:
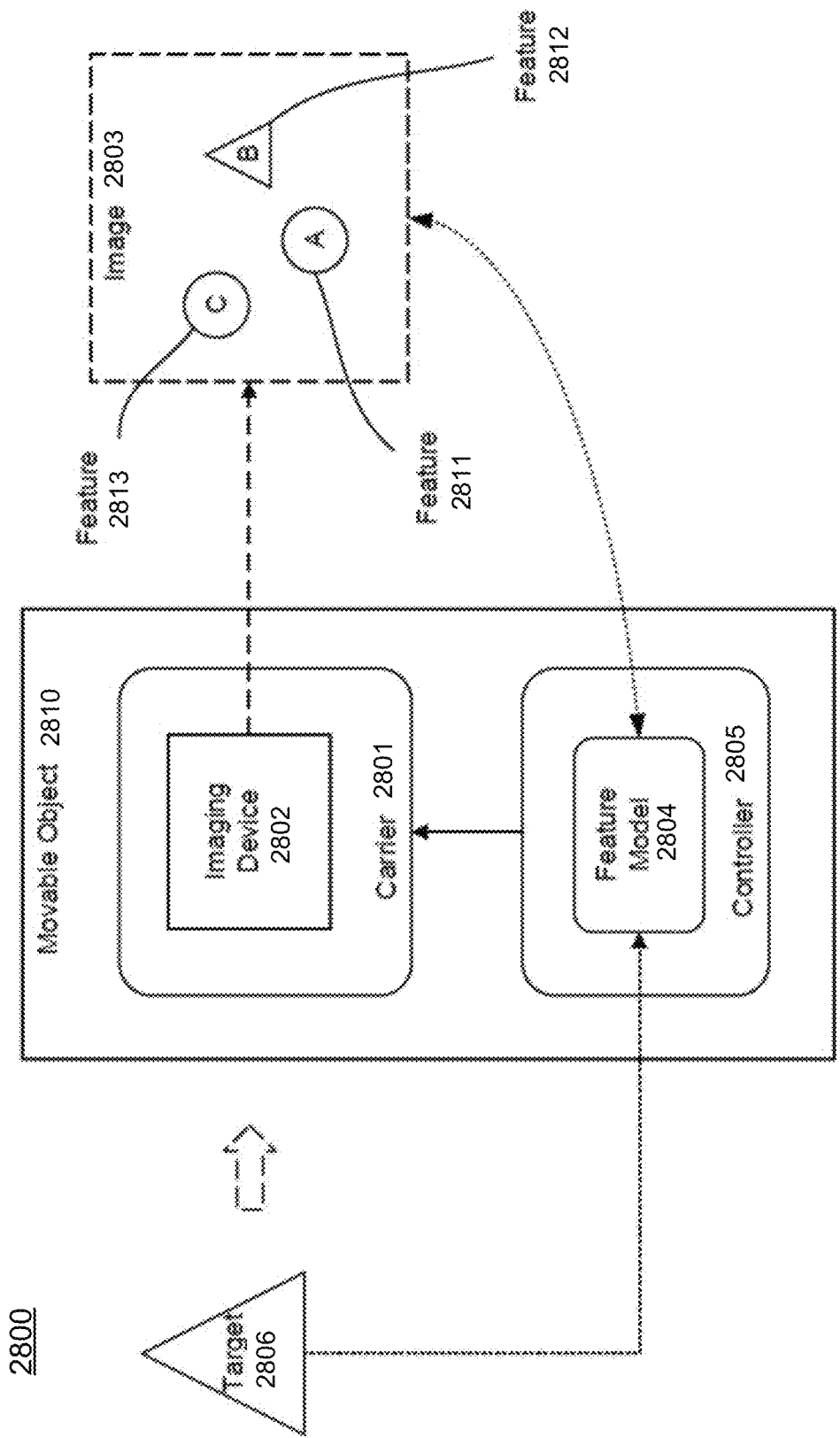
FIG. 28 illustrates tracking a target in a movable object environment, in accordance with various embodiments.

FIG. 28 illustrates tracking a target in a movable object environment, in accordance with various embodiments. As shown in FIG. 28, a movable object 2810 can include a carrier 2801, which carries an imaging device 2802 such as a camera. The imaging device 2802 can capture an image 2803 for the target 2806. Furthermore, the movable object 2810 can include a controller 2805, which can maintain a feature model 2804 for tracking the target 2806 and generates control signals for controlling the movable object 2810.

The system can track a target by following a feature that represents the target 2806. For example, the system can determine the similarity between the various features, such as features A-C 2811-2813 in the image 2803, and the feature model 2804. The similarity may be calculated as a result value (or score) of a function for each feature in the image 2803. Based on the calculated score, the system can determine which feature represents the target 2806. Alternatively, the system can directly compare each feature in the image 2803 with the feature model to determine whether the feature represents the target 2806.

Periodically, the system can determine whether the similarity between the feature and the feature model remains within a tracking process, e.g. by checking whether the result value (or score) of the function remains above a previously determined threshold. The system may consider the target is lost, when the value is below the previously determined threshold. Then, the system can examine every subsequent image and looks for the target. The examination can be based on the original feature model or the last updated feature model, and may be performed by traversing different scales and locations in every subsequent images.

Thus, the system can maintain the tracking accuracy, which is beneficial for long term target tracking since small errors may accumulate and make the whole tracking system unstable. Also, the system can perform failure-detection and target re-detection, which also benefits long term target tracking both in terms of robustness and practicability. For example, the system can maintain the tracking of a target, once the target re-appears after being occluded for a while.

Figure 29:
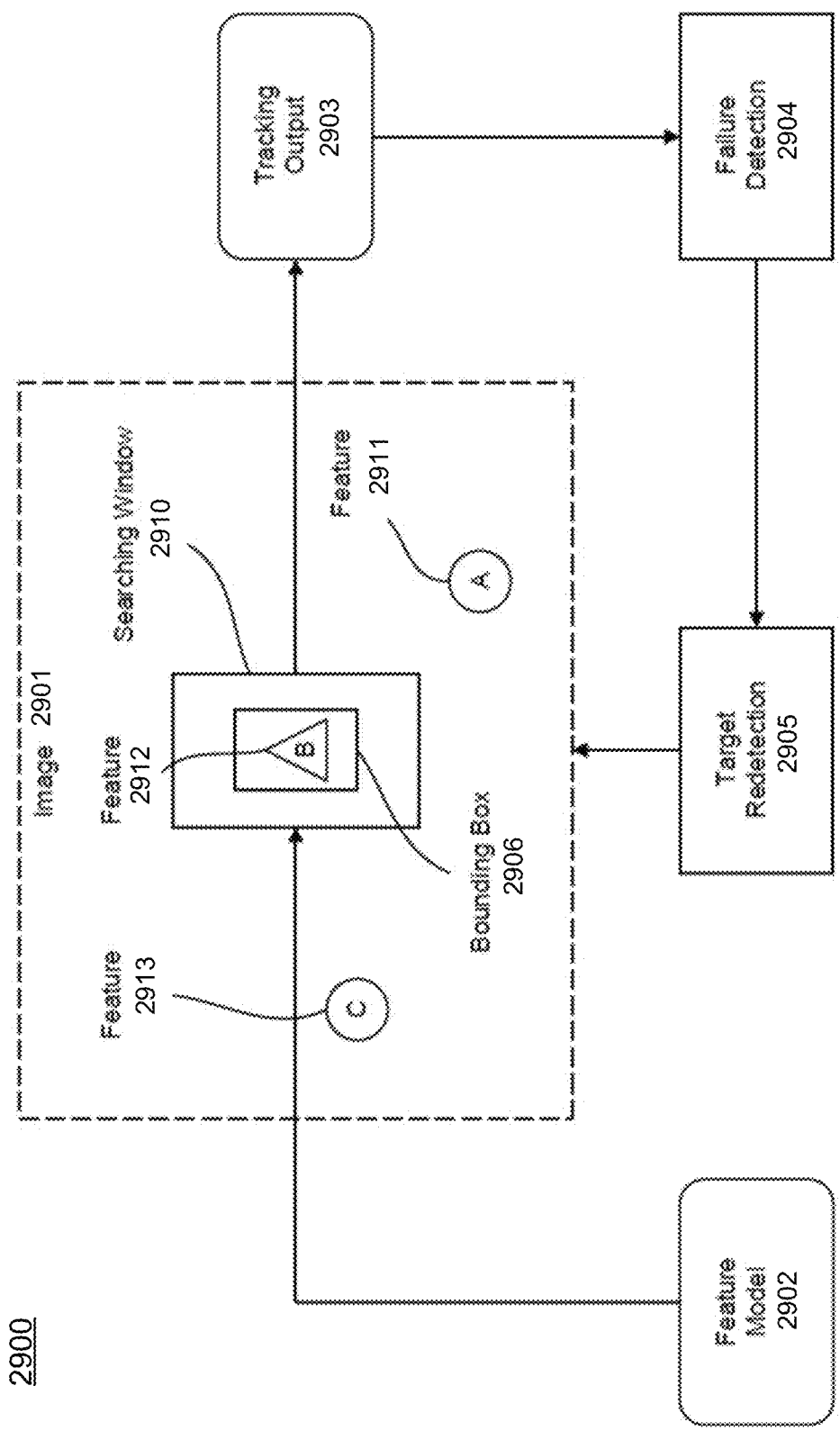
FIG. 29 illustrates supporting target tracking and redetecting in a movable object environment, in accordance with various embodiments.

FIG. 29 illustrates supporting target tracking and redetecting in a movable object environment, in accordance with various embodiments. As shown in FIG. 29, the system can use a vision based tracker for performing target tracking based on a captured image 2901. The vision based tracker can take advantage of different tracking algorithms, such as the optical flow algorithms and/or the correlation filter algorithms. Furthermore, the system can automatically track and detect a target over a long period of time. Additionally, the tracking can be performed by taking advantage of a search window that is a local search range, within which the tracking algorithm can find an optimal position/scale of the target, i.e. the tracking can be performed locally instead of globally for the whole image.

As shown in FIG. 29, a vision based tracker can generate a tracking output 2903 by applying a feature model 2902 on the image 2901, which includes various features such as features A-C 2911-2913, while tracking a target. For example, the tracker can follow the feature B with a bounding box 2906 in the searching window 2910. Furthermore, based on the tracking output 2903, the system can perform failure detection 2904 and target redetection 2905 operations.

The tracking output 2903 can be a feature response map, which is generated for the searching window 2910 in the image 2901. Each point in the feature response map can represent a correlation, or similarity, between one or more features extracted from a patch of image points (i.e. a sliding window) in the searching window 2910 and a feature model 2902 for the target.

For example, the system can move a sliding window around in the searching window 2910 to obtain the whole feature response map in the spatial domain. Alternatively, the system can obtain the feature response map in the frequency domain, e.g. using correlation filter method, without a need for actually moving the sliding window all over the searching window 2910 in the image 2901.

For example, the system can incorporate the target detection with the correlation framework, by taking advantage of both a correlation filter based tracking algorithm and a fast object proposal algorithm. The correlation-based object tracking algorithm is fast and effective, which is beneficial for a movable object such as an unmanned aerial vehicle (UAV) since the movable object often has limited computing capability and power resource. Additionally, the system can redetect the target once the target is lost. Also, the system can calculate the position of tracking object on the fly using a single camera, e.g. estimating the object size using the correlation filter based tracking algorithm, with continuity and stability.

Figure 30:
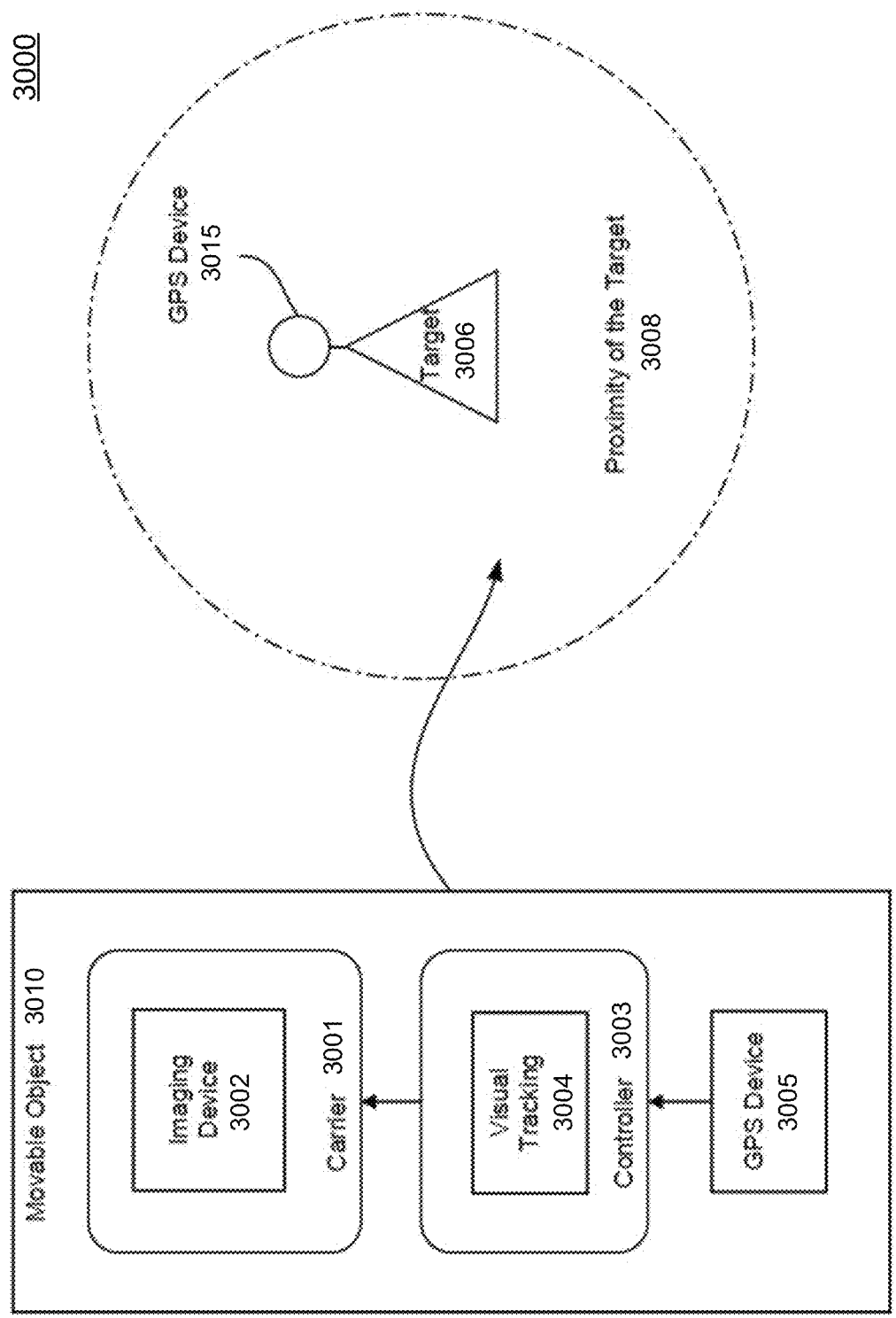
FIG. 30 illustrates using positioning devices for aiding target tracking in a movable object environment, in accordance with various embodiments.

FIG. 30 illustrates using positioning devices for aiding target tracking in a movable object environment, in accordance with various embodiments. As shown in FIG. 30, a movable object 3010 in a movable object environment 3000 can include a carrier 3001, which carries an imaging device such as a camera 3002.

Furthermore, the movable object 3010 can include a positioning device, such as a GPS device 3005. Also, the target 3006 may carry a positioning device, such as a GPS device 3015. For example, the target 3006 can be a person who carries a mobile device with GPS functionality, such as a watch, a band, a hat, and/or a pair of shoes.

In real time, the movable object 3010 (e.g. the controller 3003) can obtain the relative distance and orientation of the target 3006, in order to maintain the target within a proximity 3008 of the target (e.g. a predefined circular range). Furthermore, the system may rely on the positioning devices for maintaining the target 3006 within a proximity 3008 of the target when the system determines that the target is lost.

Additionally, the system, e.g. a controller 3003, can use the vision based tracking system 1204, which can be used for the indoor scenes when the GPS signal is not available. Thus, the system can take advantage of both the vision based tacking technologies and the positioning devices for performing a long term tracking task.

Figure 31:
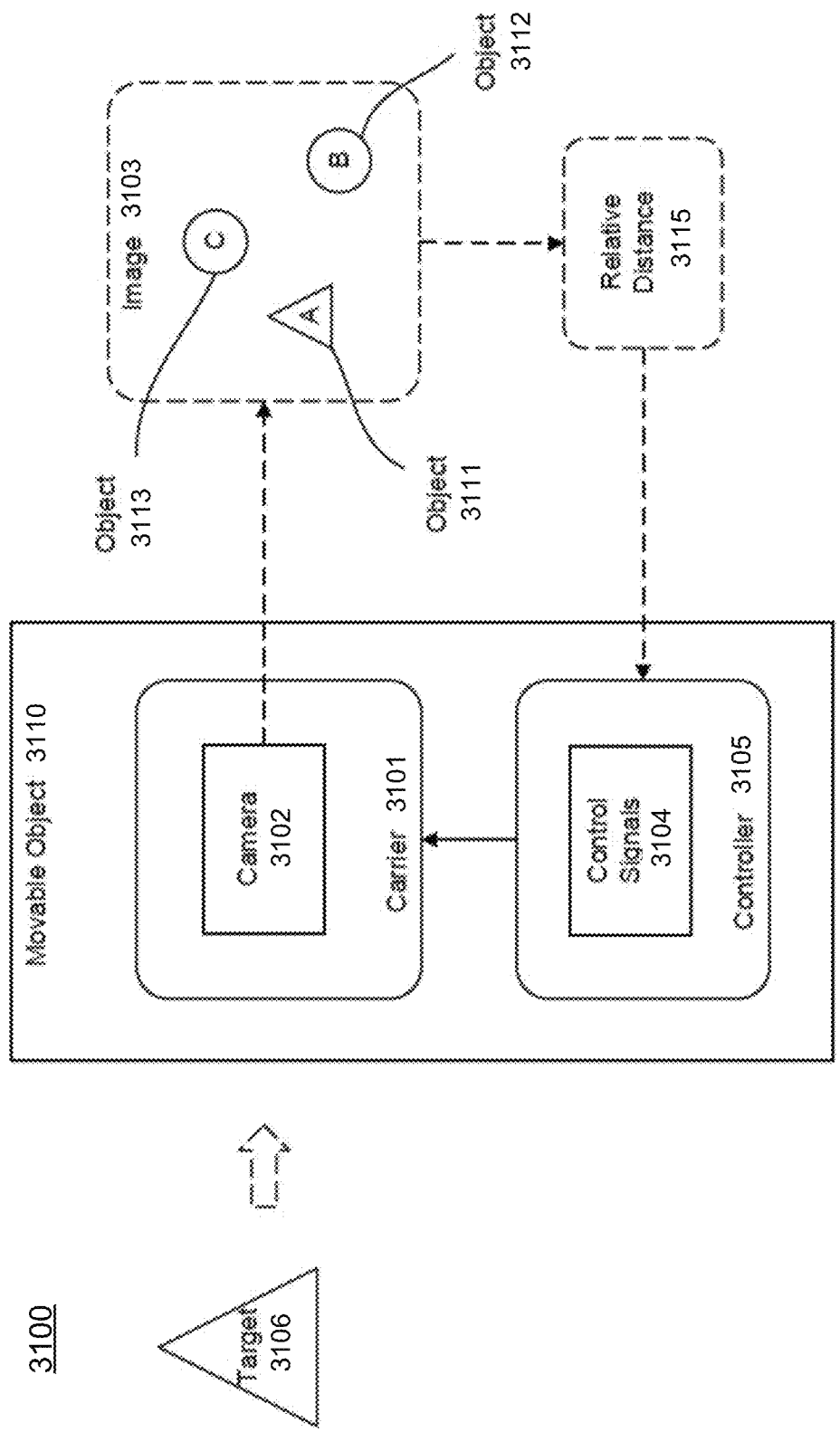
FIG. 31 illustrates tracking a target based on distance measuring in a movable object environment, in accordance with various embodiments.

FIG. 31 illustrates tracking a target based on distance measuring in a movable object environment, in accordance with various embodiments. As shown in FIG. 31, a movable object 3110 in a movable object environment 3100 can include a carrier 3101, which carries an imaging device such as a camera 3102.

The movable object 3101 can acquire a target 3106 from an image 3103, which are captured by the camera 3102. For example, the image 3103 may include multiple features, such as objects A-C 3111-3113, and a user can select the object 3111 as the target to follow (or track).

The system can obtain the (3D) position of the target from the (2D) tracking information. For example, the position of the target 3106, which is important for tracking the target, can be determined based on the direction toward the target 3106 and the relative distance 3115 between the movable object 3110 (e.g. a UAV) and the target 3106. The direction of the object can be obtained by calculating the direction vector from a calibrated camera. Furthermore, the system can estimate the relative distance between the tracking device and the target based on state information associated with the imaging device and the movable object.

The state information includes altitude information of the imaging device carried by the movable object. The altitude information of the imaging device can be received from a control module for the movable object. The state information can include attitude information of the imaging device that is carried by a movable object. The attitude information of the imaging device can be received from a payload stabilization control module, wherein the payload stabilization control module controls a stabilization system, which stabilizes the imaging device on the movable object.

The controller 3105 can obtain a relative distance 3115 between the movable object 3110 and the target 3106 from the image 3103. Also, the controller 3105 can generate one or more flight control signals 3104 to direct the movable object 3110 to track the target 3106. The control signals 3104 can include acceleration/deceleration signals and gimbal attitude adjustment signals. For example, when the movable object 3110 is tracking the target 3106, the controller 3105 can adjust the movable object or the gimbal to rotate about the yaw direction based on the distance between the target and the center point of the image.

Thus, the controller 3105 can maintain a desired tracking distance (which can be a constant distance or dynamically configured distance) from the target 3106. For example, the system can calculate the speed, v target, of the target relative to the movable object 3110, based on the relative distances of the target from the movable object 3110 at different time points. Then, the system can determine the necessary movement change of the movable object 3110 based on the speed of the movable object 3110, v uav, and the current relative distance 3115.

The systems, devices, and methods described herein can be applied to a wide variety of movable objects. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less.

Optionally, a payload of the movable object may have low energy consumption, such as less than about: 5 W/h, 4 W/h, 3 W/h, 2 W/h, 1 W/h, or less.

In some embodiments, a UAV can include a propulsion system having a plurality of rotors. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof.

In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 32:
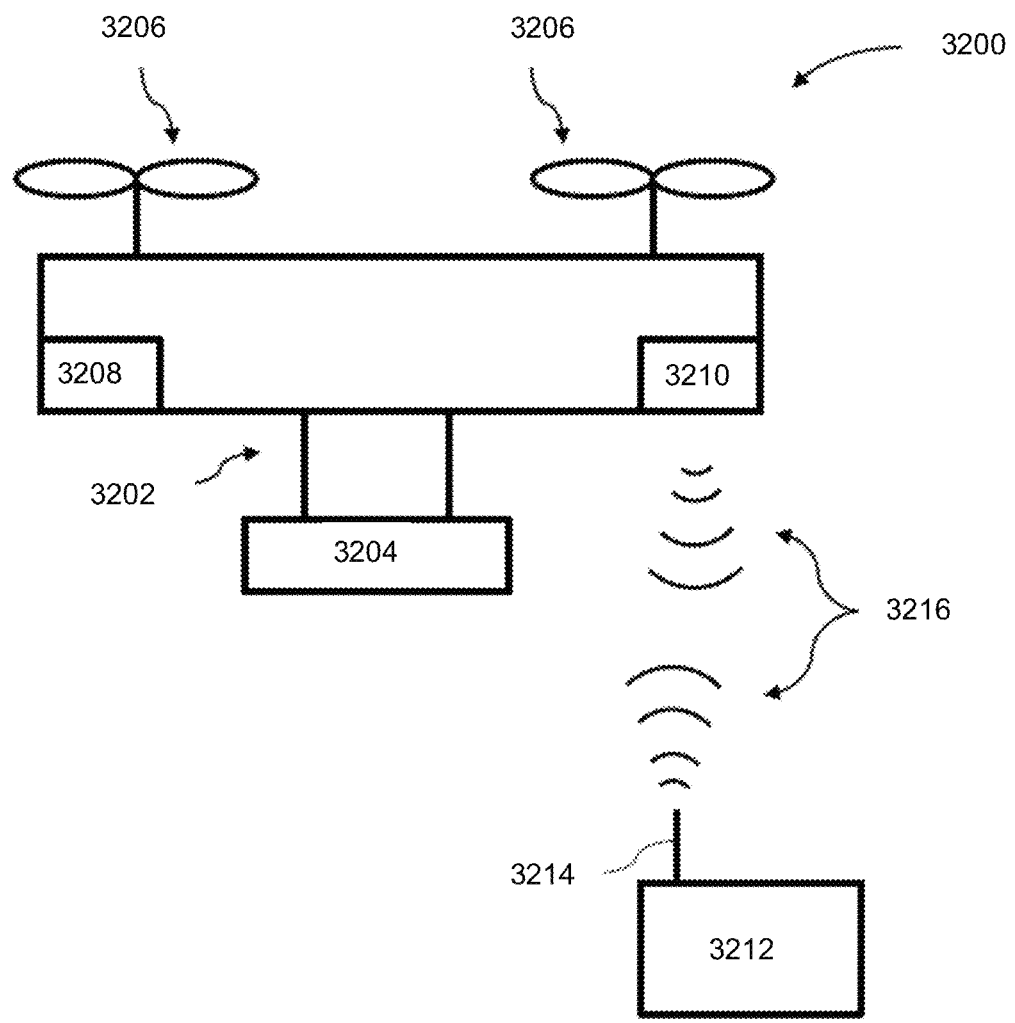
FIG. 32 is a schematic block diagram of a system for controlling a movable object, in accordance with some embodiments.

FIG. 32 illustrates a movable object 3200 including a carrier 3202 and a payload 3204, in accordance with embodiments. Although the movable object 3200 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 3204 may be provided on the movable object 3200 without requiring the carrier 3202. The movable object 3200 may include propulsion mechanisms 3206, a sensing system 3208, and a communication system 3210.

The propulsion mechanisms 3206 can include one or more of rotors, propellers, blades, engines, motors, wheels, axles, magnets, or nozzles, as previously described. For example, the propulsion mechanisms 3206 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 3206 can be mounted on the movable object 3200 using any suitable means, such as a support element (e.g., a drive shaft) as described elsewhere herein. The propulsion mechanisms 3206 can be mounted on any suitable portion of the movable object 3200, such on the top, bottom, front, back, sides, or suitable combinations thereof.

In some embodiments, the propulsion mechanisms 3206 can enable the movable object 3200 to take off vertically from a surface or land vertically on a surface without requiring any horizontal movement of the movable object 3200 (e.g., without traveling down a runway). Optionally, the propulsion mechanisms 3206 can be operable to permit the movable object 3200 to hover in the air at a specified position and/or orientation. One or more of the propulsion mechanisms 3200 may be controlled independently of the other propulsion mechanisms. Alternatively, the propulsion mechanisms 3200 can be configured to be controlled simultaneously. For example, the movable object 3200 can have multiple horizontally oriented rotors that can provide lift and/or thrust to the movable object. The multiple horizontally oriented rotors can be actuated to provide vertical takeoff, vertical landing, and hovering capabilities to the movable object 3200. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 3200 (e.g., with respect to up to three degrees of translation and up to three degrees of rotation).

The sensing system 3208 can include one or more sensors that may sense the spatial disposition, velocity, and/or acceleration of the movable object 3200 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 3208 can be used to control the spatial disposition, velocity, and/or orientation of the movable object 3200 (e.g., using a suitable processing unit and/or control module, as described below). Alternatively, the sensing system 3208 can be used to provide data regarding the environment surrounding the movable object, such as weather conditions, proximity to potential obstacles, location of geographical features, location of manmade structures, and the like.

The communication system 3210 enables communication with terminal 3212 having a communication system 3214 via wireless signals 3216. The communication systems 3210, 3214 may include any number of transmitters, receivers, and/or transceivers suitable for wireless communication. The communication may be one-way communication, such that data can be transmitted in only one direction. For example, one-way communication may involve only the movable object 3200 transmitting data to the terminal 3212, or vice-versa. The data may be transmitted from one or more transmitters of the communication system 3210 to one or more receivers of the communication system 3212, or vice-versa. Alternatively, the communication may be two-way communication, such that data can be transmitted in both directions between the movable object 3200 and the terminal 3212. The two-way communication can involve transmitting data from one or more transmitters of the communication system 3210 to one or more receivers of the communication system 3214, and vice-versa.

In some embodiments, the terminal 3212 can provide control data to one or more of the movable object 3200, carrier 3202, and payload 3204 and receive information from one or more of the movable object 3200, carrier 3202, and payload 3204 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms

3206), or a movement of the payload with respect to the movable object (e.g., via control of the carrier 3202). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 3208 or of the payload 3204). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 3212 can be configured to control a state of one or more of the movable object 3200, carrier 3202, or payload 3204. Alternatively or in combination, the carrier 3202 and payload 3204 can also each include a communication module configured to communicate with terminal 3212, such that the terminal can communicate with and control each of the movable object 3200, carrier 3202, and payload 3204 independently.

In some embodiments, the movable object 3200 can be configured to communicate with another remote device in addition to the terminal 3212, or instead of the terminal 3212. The terminal 3212 may also be configured to communicate with another remote device as well as the movable object 3200. For example, the movable object 3200 and/or terminal 3212 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 3200, receive data from the movable object 3200, transmit data to the terminal 3212, and/or receive data from the terminal 3212. Optionally, the remote device can be connected to the Internet or other telecommunications network, such that data received from the movable object 3200 and/or terminal 3212 can be uploaded to a website or server.

In some embodiments, a system for controlling a movable object may be provided in accordance with embodiments. The system can be used in combination with any suitable embodiment of the systems, devices, and methods disclosed herein. The system can include a sensing module, processing unit, non-transitory computer readable medium, control module, and communication module.

The sensing module can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module can be operatively coupled to a processing unit having a plurality of processors. In some embodiments, the sensing module can be operatively coupled to a transmission module (e.g., a Wi-Fi image transmission module) configured to directly transmit sensing data to a suitable external device or system. For example, the transmission module can be used to transmit images captured by a camera of the sensing module to a remote terminal.

The processing unit can have one or more processors, such as a programmable processor (e.g., a central processing unit (CPU)). The processing unit can be operatively coupled to a non-transitory computer readable medium. The non-transitory computer readable medium can store logic, code, and/or program instructions executable by the processing unit for performing one or more steps. The non-transitory computer readable medium can include one or more memory units (e.g., removable media or external storage such as an SD card or random access memory (RAM)). In some embodiments, data from the sensing module can be directly conveyed to and stored within the memory units of the non-transitory computer readable medium. The memory units of the non-transitory computer readable medium can store logic, code and/or program instructions executable by the processing unit to perform any suitable embodiment of the methods described herein. For example, the processing unit can be configured to execute instructions causing one or more processors of the processing unit to analyze sensing data produced by the sensing module. The memory units can store sensing data from the sensing module to be processed by the processing unit. In some embodiments, the memory units of the non-transitory computer readable medium can be used to store the processing results produced by the processing unit.

In some embodiments, the processing unit can be operatively coupled to a control module configured to control a state of the movable object. For example, the control module can be configured to control the propulsion mechanisms of the movable object to adjust the spatial disposition, velocity, and/or acceleration of the movable object with respect to six degrees of freedom. Alternatively or in combination, the control module can control one or more of a state of a carrier, payload, or sensing module.

The processing unit can be operatively coupled to a communication module configured to transmit and/or receive data from one or more external devices (e.g., a terminal, display device, or other remote controller). Any suitable means of communication can be used, such as wired communication or wireless communication. For example, the communication module can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module can transmit and/or receive one or more of sensing data from the sensing module, processing results produced by the processing unit, predetermined control data, user commands from a terminal or remote controller, and the like.

The components of the system can be arranged in any suitable configuration. For example, one or more of the components of the system can be located on the movable object, carrier, payload, terminal, sensing system, or an additional external device in communication with one or more of the above. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system can occur at one or more of the aforementioned locations.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A method for controlling an unmanned aerial vehicle (UAV), comprising:
   receiving, by a processor of the UAV, a plurality of images captured by an imaging device coupled to the UAV;
   receiving, by the processor of the UAV, an input signal indicating user selection of a point or a portion in at least one image of the plurality of images, the input signal including information of the point or the portion in the at least one image that is associated with a target;
   identifying, by the processor, the target in the at least one image of the plurality of images based on the input signal and feature point recognition;
   determining, by the processor, whether the target is a stationary target or a moving target based on analyzing the plurality of images to track feature points of the identified target in the plurality of images;
   automatically effecting, by the processor, movement of the UAV based on determining the target is the stationary target or the moving target; and
   adjusting motion characteristics of the UAV while tracking the target according to at least one of (1) a number of times a user selects the point or the portion in the at least one image or (2) a time duration when the user selects the point or the portion in the at least one image, wherein the motion characteristics include at least one of a velocity, an acceleration, or an orientation of the UAV.

2. The method of claim 1, wherein the feature point recognition comprises:
   extracting one or more features points from the at least one image using one or more algorithms, wherein the one or more algorithms comprise at least one of texture detection algorithm, algorithm of calculating a total number of the one or more feature points, algorithm of calculating a distribution of the one or more feature points, or algorithm of calculating a quality of the one or more feature points based on at least one of edge detection, corner detection, blob detection, or ridge detection.

3. The method of claim 1, wherein determining whether the target is the stationary target or the moving target comprises:
   determining relative positions or moving directions between the target and the imaging device or between the target and the UAV;
   determining a position of the imaging device or the UAV with respect to an environment;
   determining a position of the target with respect to the environment; or
   determining positional information of the imaging device, the UAV, or the target based on sensing data received from one or more additional sensors coupled to the UAV.

4. The method of claim 1, wherein automatically effecting movement of the UAV comprises:
   automatically switching a mode of the UAV between a plurality of modes based on determining the target is the stationary target or the moving target; and
   effecting movement of the UAV based on the mode.

5. The method of claim 4, wherein the plurality of modes comprise at least a target mode and a directional mode, wherein the UAV is configured to move towards or follow the target when the mode is the target mode and the UAV is configured to move in a specific direction when the mode is the directional mode.

6. The method of claim 5, wherein the target mode comprises a fly-to mode and the method further comprises:
   automatically switching the mode of the UAV to the fly-to mode when the target is determined to be the stationary target or when a relatively direct path exists between the UAV and the target.

7. The method of claim 5, wherein the target mode comprises a tracking mode and the method further comprises:
  automatically switching the mode of the UAV to the tracking mode when the target is determined to be the moving target or when a flight path exists between the UAV and the target that a clear line of sight is absent between the UAV and the target at one or more portions of the flight path.

8. The method of claim 5, wherein the target mode comprises a fly-to mode and the method further comprises:
  automatically switching the mode of the UAV to the fly-to mode when fewer than a predetermined number of obstacles and/or when fewer than a predetermined number of types of obstacles are determined to be present as the UAV is moving toward the target; and
  directing the UAV to move toward the target when the mode of the UAV is the fly-to mode, wherein the UAV is moved to a predetermined distance from the target.

9. The method of claim 5, wherein the target mode comprises a tracking mode and the method further comprises:
  automatically switching the mode of the UAV to the tracking mode when greater than a predetermined number of obstacles and/or when greater than a predetermined number of types of obstacles are determined to be present as the UAV is moving toward the target; and
  directing the UAV to follow the target at a predetermined distance when the mode of the UAV is the tracking mode.

10. A non-transitory computer-readable medium storing instructions that, when executed, cause a computer to perform a method for controlling an unmanned aerial vehicle (UAV), the method comprising:
  receiving, by a processor of the UAV, a plurality of images captured by an imaging device coupled to the UAV;
  receiving, by the processor, an input signal indicating user selection of a point or a portion in at least one image of the plurality of images, the input signal including information of the point or the portion in the at least one image that is associated with a target;
  identifying, by the processor, the target in the at least one image of the plurality of images based on the input signal and feature point recognition;
  determining, by the processor, whether the target is a stationary target or a moving target based on analyzing the plurality of images to track feature points of the identified target in the plurality of images;
  automatically effecting, by the processor, movement of the UAV based on determining the target is the stationary target or the moving target; and
  adjusting motion characteristics of the UAV while tracking the target according to at least one of (1) a number of times a user selects the point or the portion in the at least one image or (2) a time duration when the user selects the point or the portion in the at least one image, wherein the motion characteristics include at least one of a velocity, an acceleration, or an orientation of the UAV.

11. The non-transitory computer-readable medium of claim 10, wherein determining whether the target is the stationary target or the moving target comprises:
  determining relative positions or moving directions between the target and the imaging device or between the target and the UAV;
  determining a position of the imaging device or the UAV with respect to an environment;
  determining a position of the target with respect to the environment; or
  determining positional information of the imaging device, the UAV, or the target based on sensing data received from one or more additional sensors coupled to the UAV.

12. The non-transitory computer-readable medium of claim 10, wherein automatically effecting movement of the UAV comprises:
  automatically switching a mode of the UAV between a plurality of modes based on determining the target is the stationary target or the moving target; and
  effecting movement of the UAV based on the mode.

13. The non-transitory computer-readable medium of claim 12, wherein the plurality of modes comprise at least a target mode and a directional mode, wherein the UAV is configured to move toward or follow the target when the mode is the target mode and the UAV is configured to move in a specific direction when the mode is the directional mode.

14. The non-transitory computer-readable medium of claim 13, wherein the target mode comprises a fly-to mode or a tracking mode, and the method further comprises:
  automatically switching the mode of the UAV to the fly-to mode when the target is determined to be the stationary target or when a relatively direct path exists between the UAV and the target; or
  automatically switching the mode of the UAV to the tracking mode when the target is determined to be the moving target or when a flight path exists between the UAV and the target that a clear line of sight is absent between the UAV and the target at one or more portions of the flight path.

15. An apparatus for controlling an unmanned aerial vehicle (UAV), the apparatus comprising one or more processors that are, individually or collectively, configured to:
  receive a plurality of images captured by an imaging device coupled to the UAV;
  receive an input signal indicating user selection of a point or a portion in at least one image of the plurality of images, the input signal including information of the point or the portion in the at least one image that is associated with a target;
  identify a target in the at least one image of the plurality of images based on the input signal and feature point recognition;
  determine whether the target is a stationary target or a moving target based on analyzing the plurality of images to track feature points of the identified target in the plurality of images;
  automatically effect movement of the UAV based on determining the target is the stationary target or the moving target; and
  adjust motion characteristics of the UAV while tracking the target according to at least one of (1) a number of times a user selects the point or the portion in the at least one image or (2) a time duration when the user selects the point or the portion in the at least one image, wherein the motion characteristics include at least one of a velocity, an acceleration, or an orientation of the UAV.

16. The apparatus of claim 15, wherein the one or more processors, individually or collectively, are configured to:
  determine relative positions or moving directions between the target and the imaging device or between the target and the UAV;

determine a position of the imaging device or the UAV with respect to an environment;

determine a position of the target with respect to the environment; or determine positional information of the imaging device, the UAV, or the target based on sensing data received from one or more additional sensors coupled to the UAV.

17. The apparatus of claim 15, wherein the one or more processors, individually or collectively, are configured to:

automatically switch a mode of the UAV between a plurality of modes based on determining the target is the stationary target or the moving target; and effect movement of the UAV based on the mode.

18. The apparatus of claim 17, wherein the plurality of modes comprise at least a target mode and a directional mode, wherein the UAV is configured to move towards or follow the target when the mode is the target mode and the UAV is configured to move in a specific direction when the mode is the directional mode.

19. The apparatus of claim 18, wherein the target mode comprises a fly-to mode or a tracking mode, and the one or more processors, individually or collectively, are configured to:

automatically switch the mode of the UAV to the fly-to mode when the target is determined to be the stationary target or when a relatively direct path exists between the UAV and the target; or automatically switch the mode of the UAV to the tracking mode when the target is determined to be the moving target or when a flight path exists between the UAV and the target that a clear line of sight is absent between the UAV and the target at one or more portions of the flight path.

20. The method of claim 1, further comprising:

adjusting a distance between the UAV and the target based on the time duration when the user selects the point or the portion in the at least one image.

* * * * *